Nov. 13, 1934.  C. F. PYM ET AL  1,980,435
MACHINE FOR SHAPING UPPERS OVER LASTS
Filed March 24, 1932  19 Sheets—Sheet 1

INVENTORS_
Charles F. Pym
Arthur F. Pym
By their Attorney
Harlow M. Davis

Nov. 13, 1934.  C. F. PYM ET AL  1,980,435
MACHINE FOR SHAPING UPPERS OVER LASTS
Filed March 24, 1932  19 Sheets-Sheet 2

INVENTORS
Charles F. Pym
Arthur F. Pym
By their Attorney
Harlow M. Davis

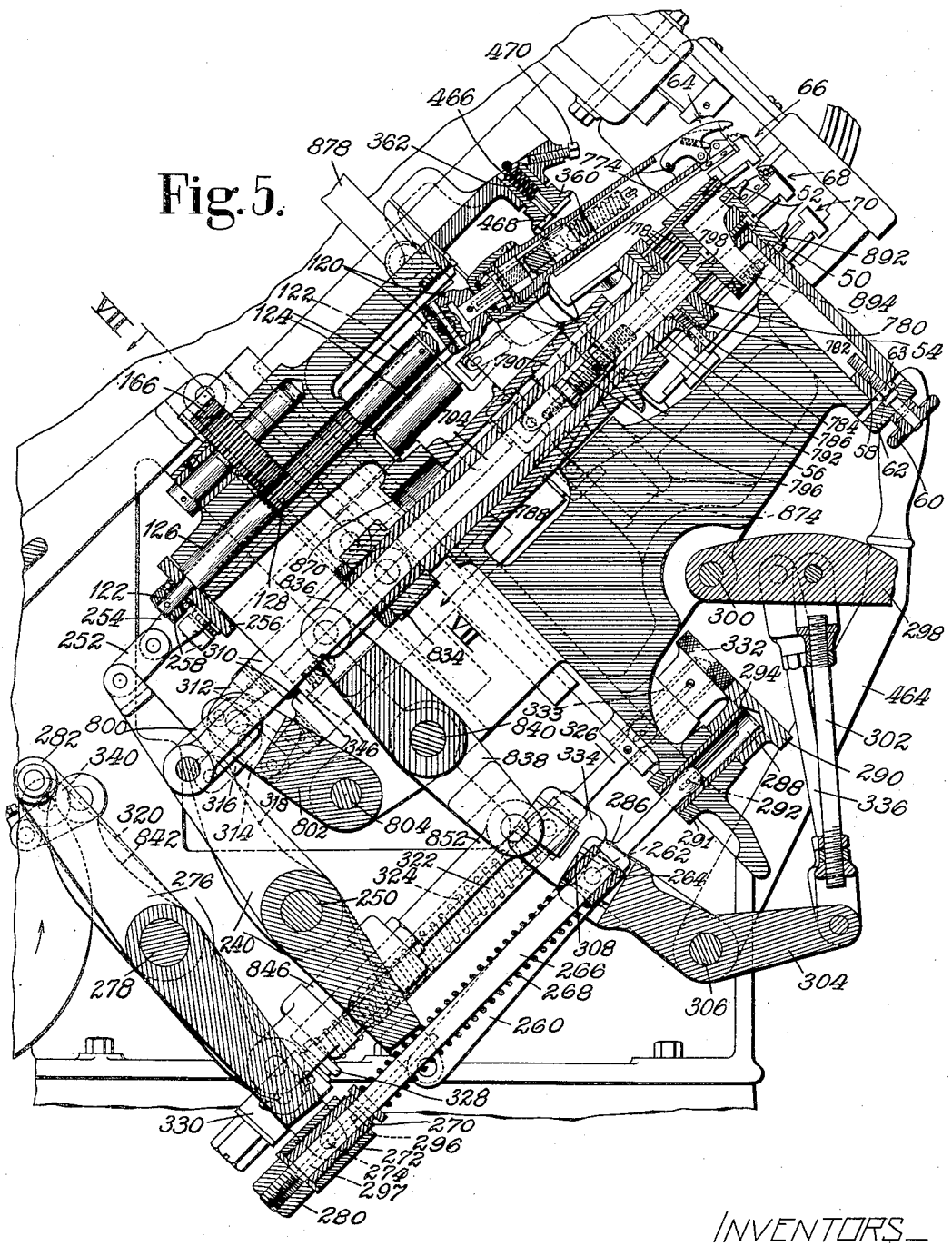

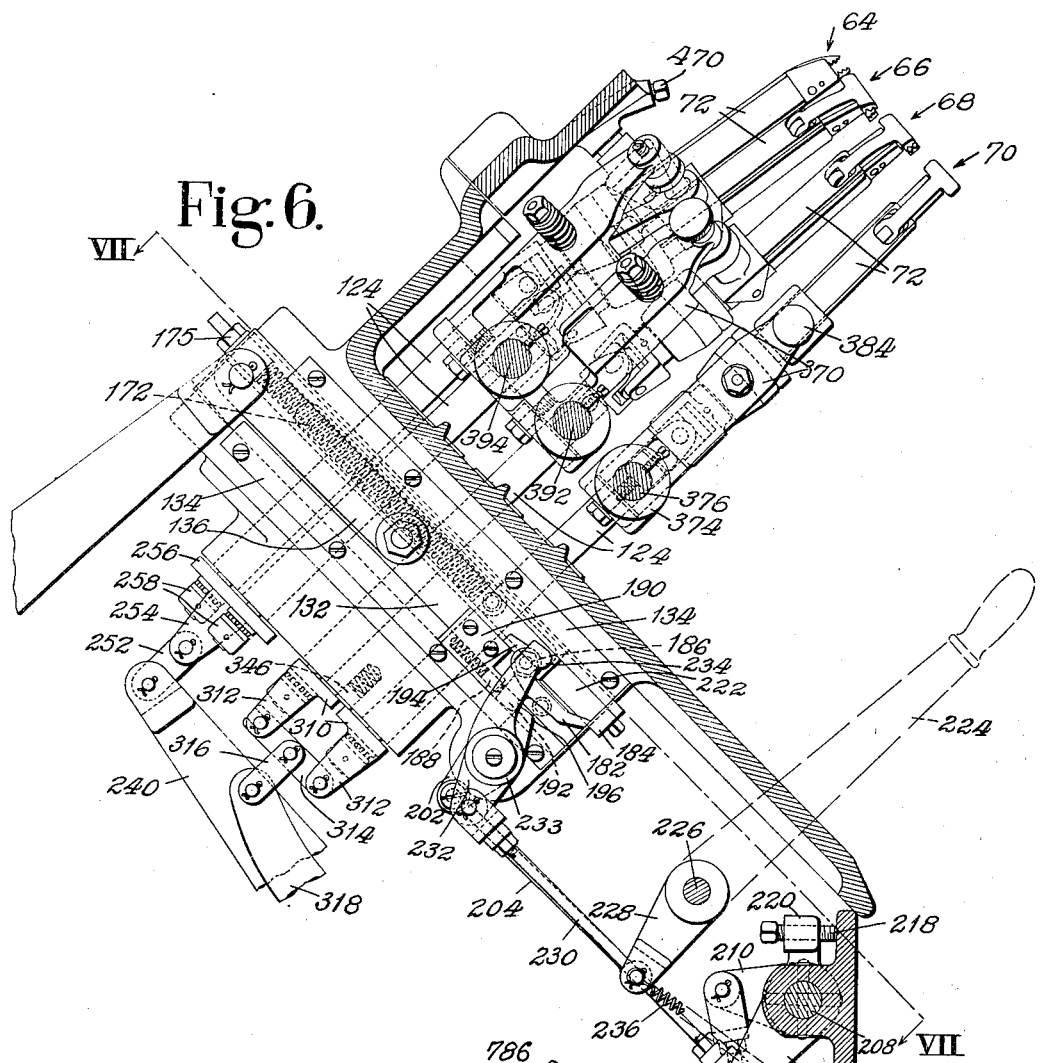
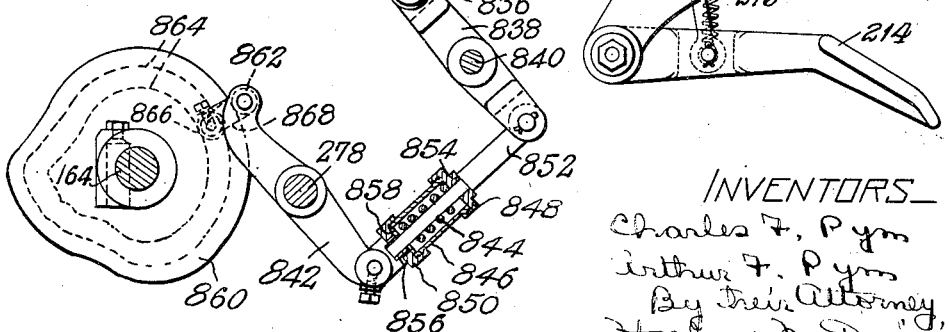

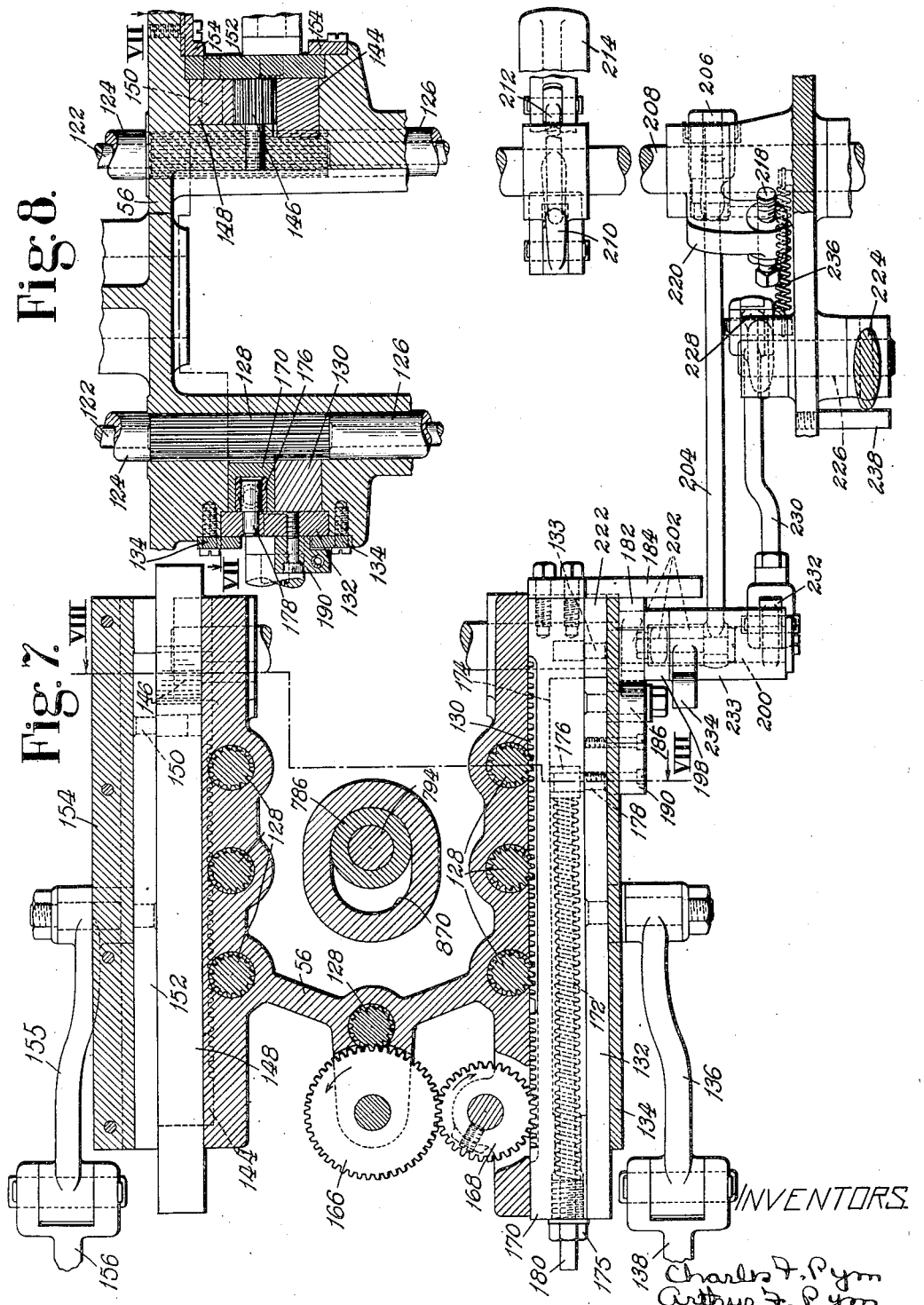

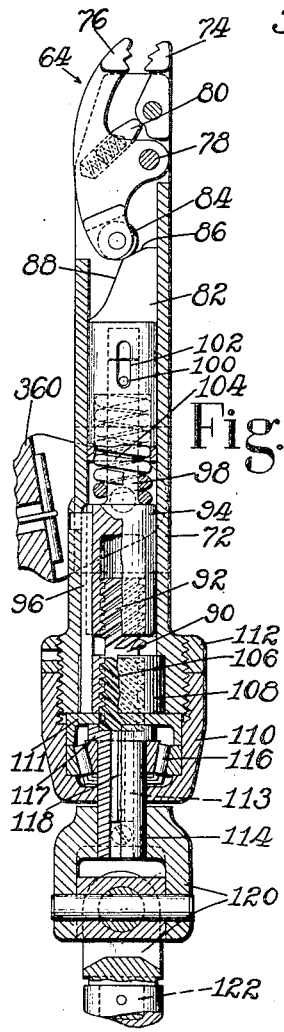
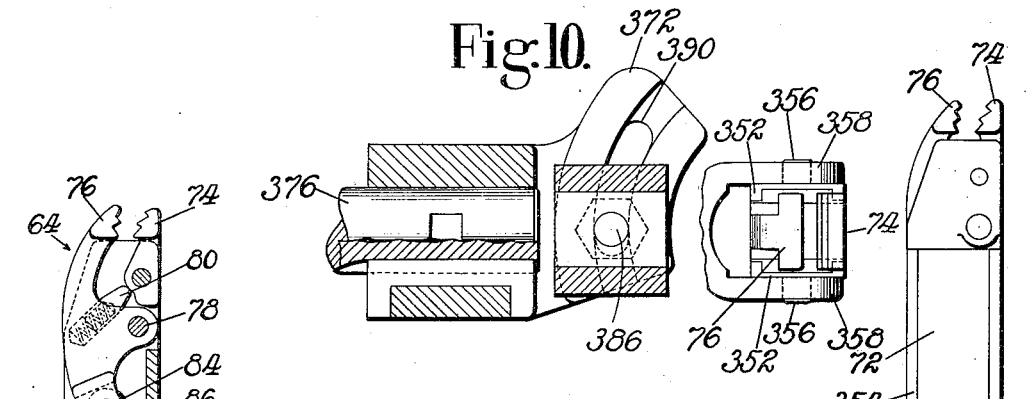
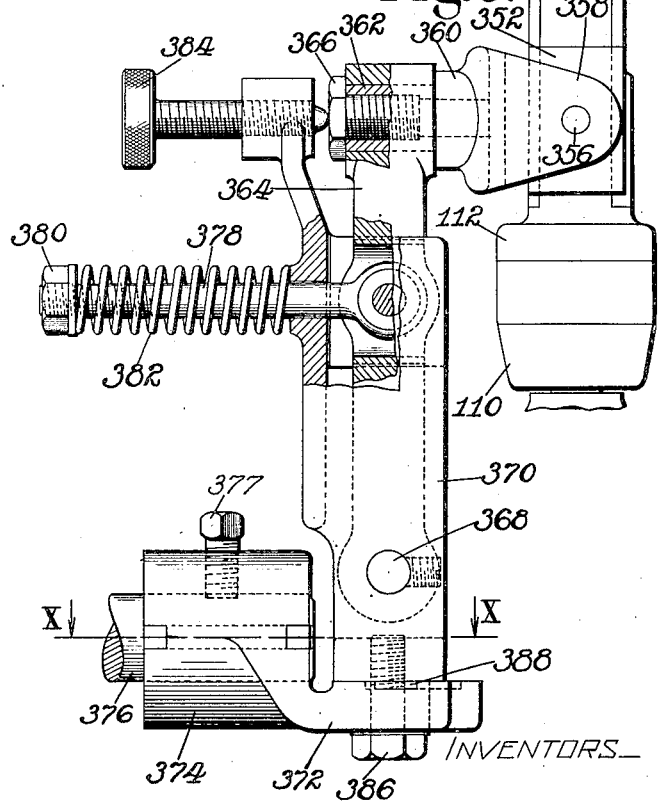

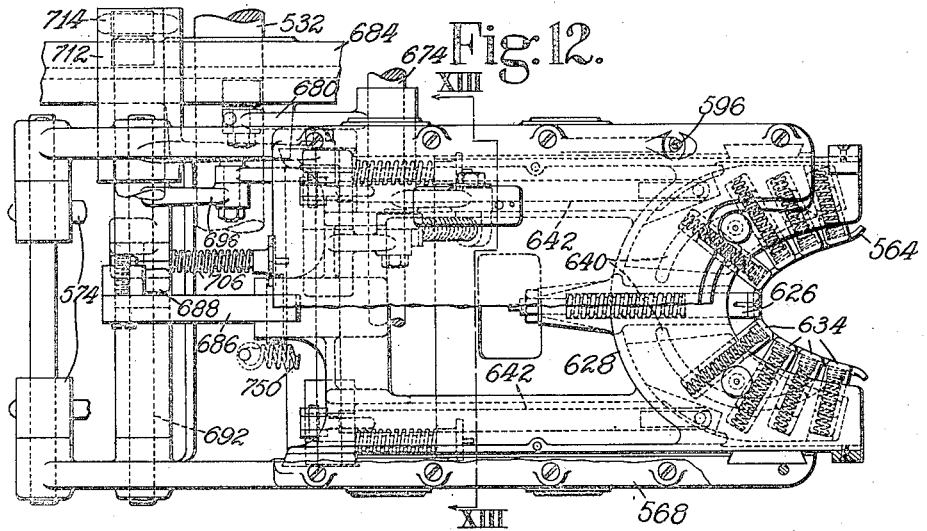
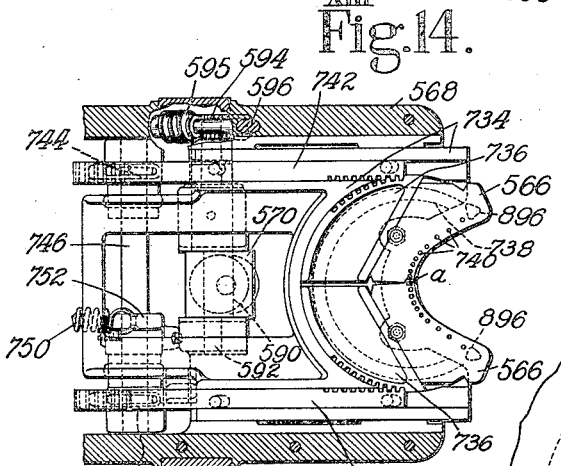
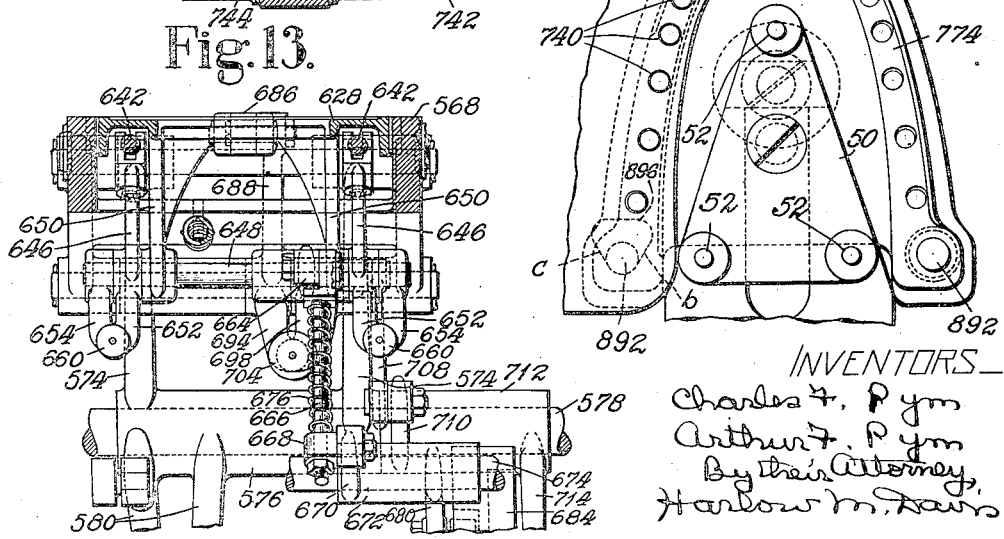

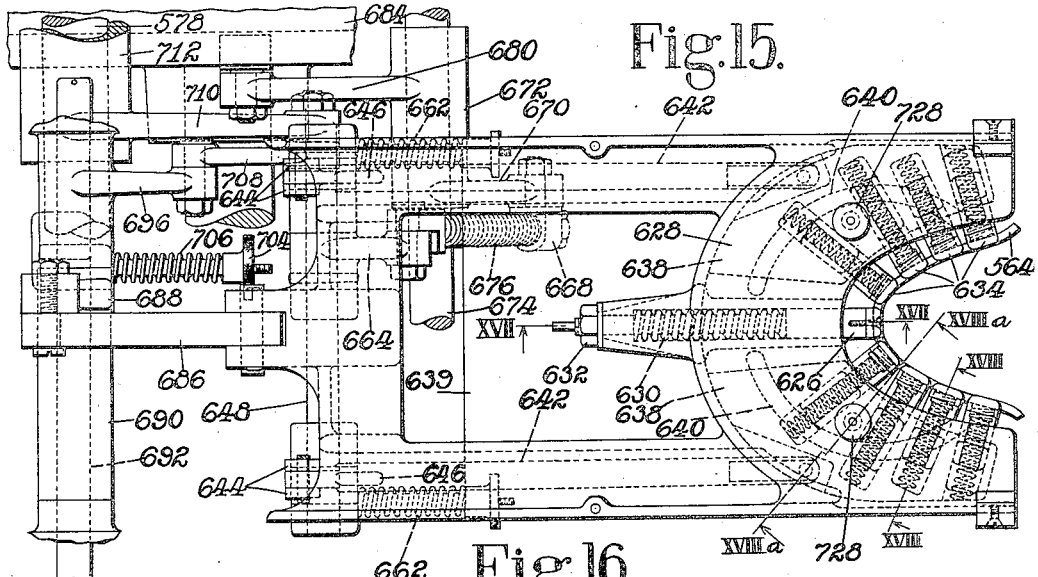
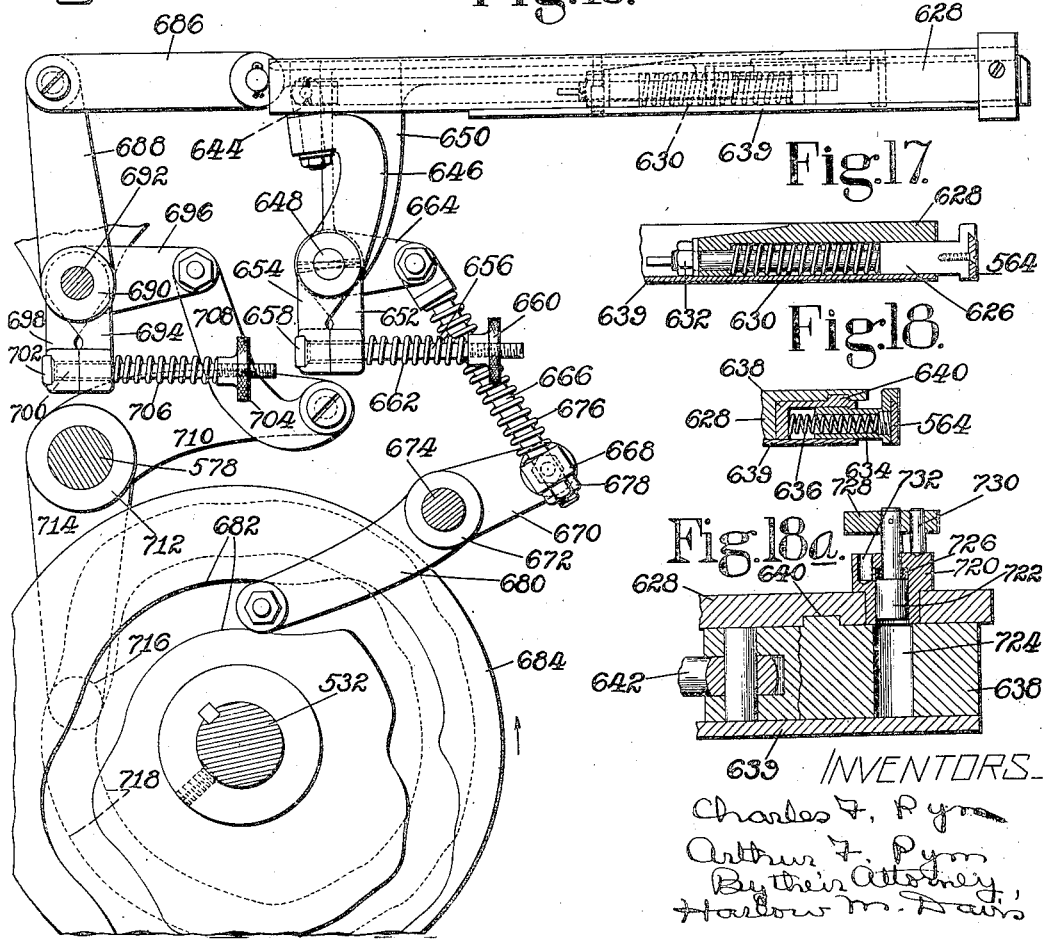

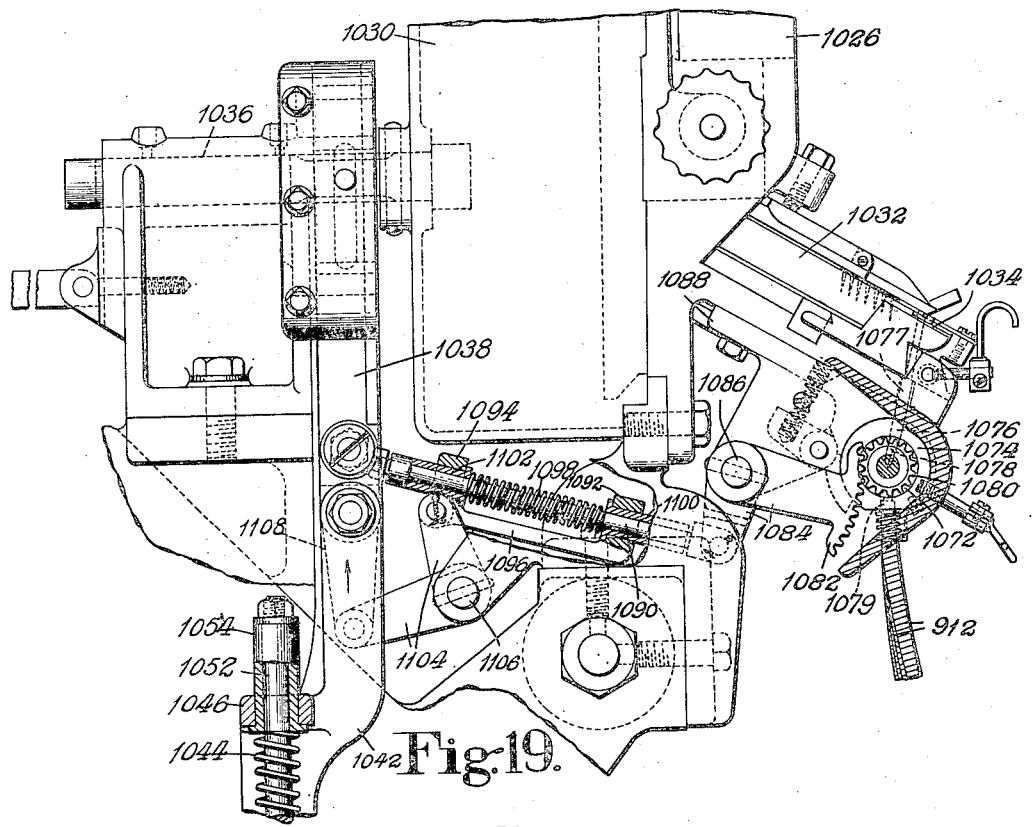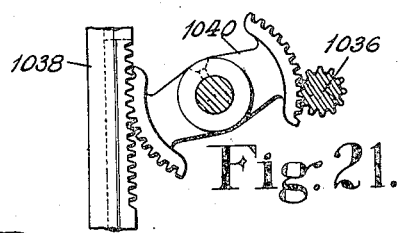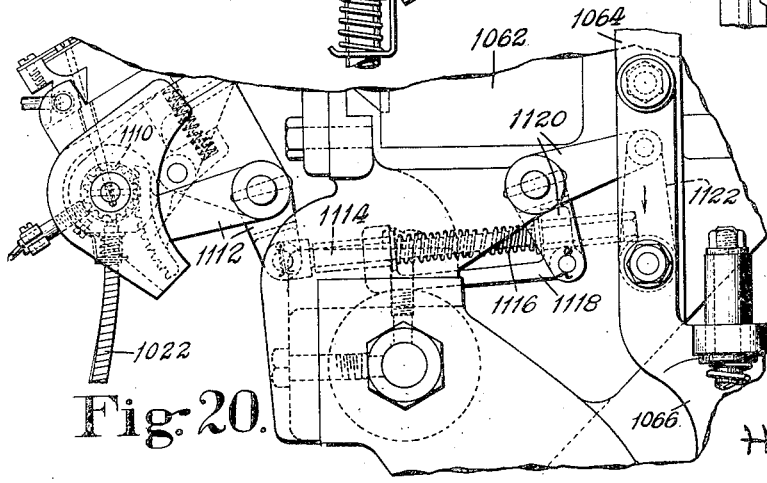

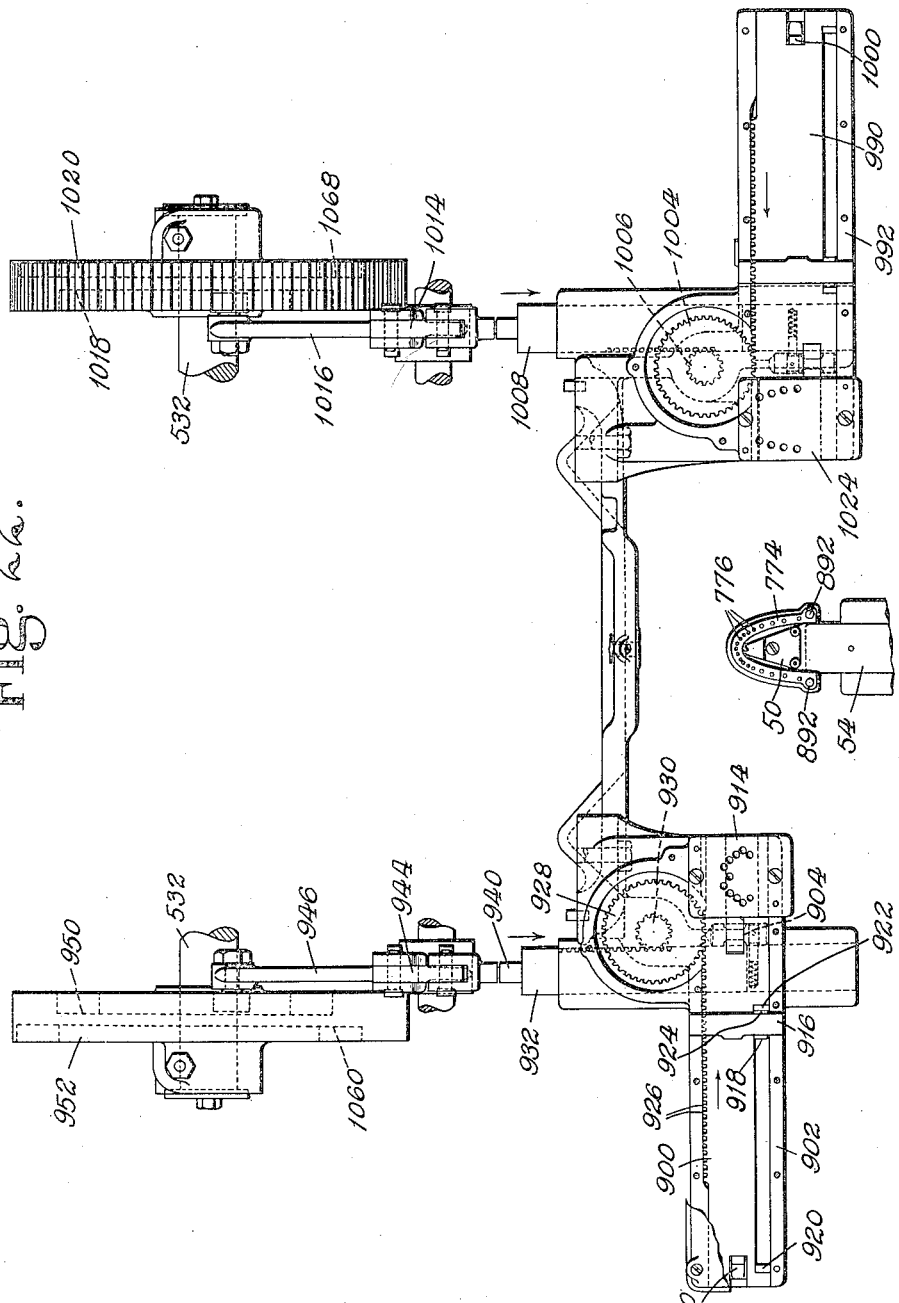

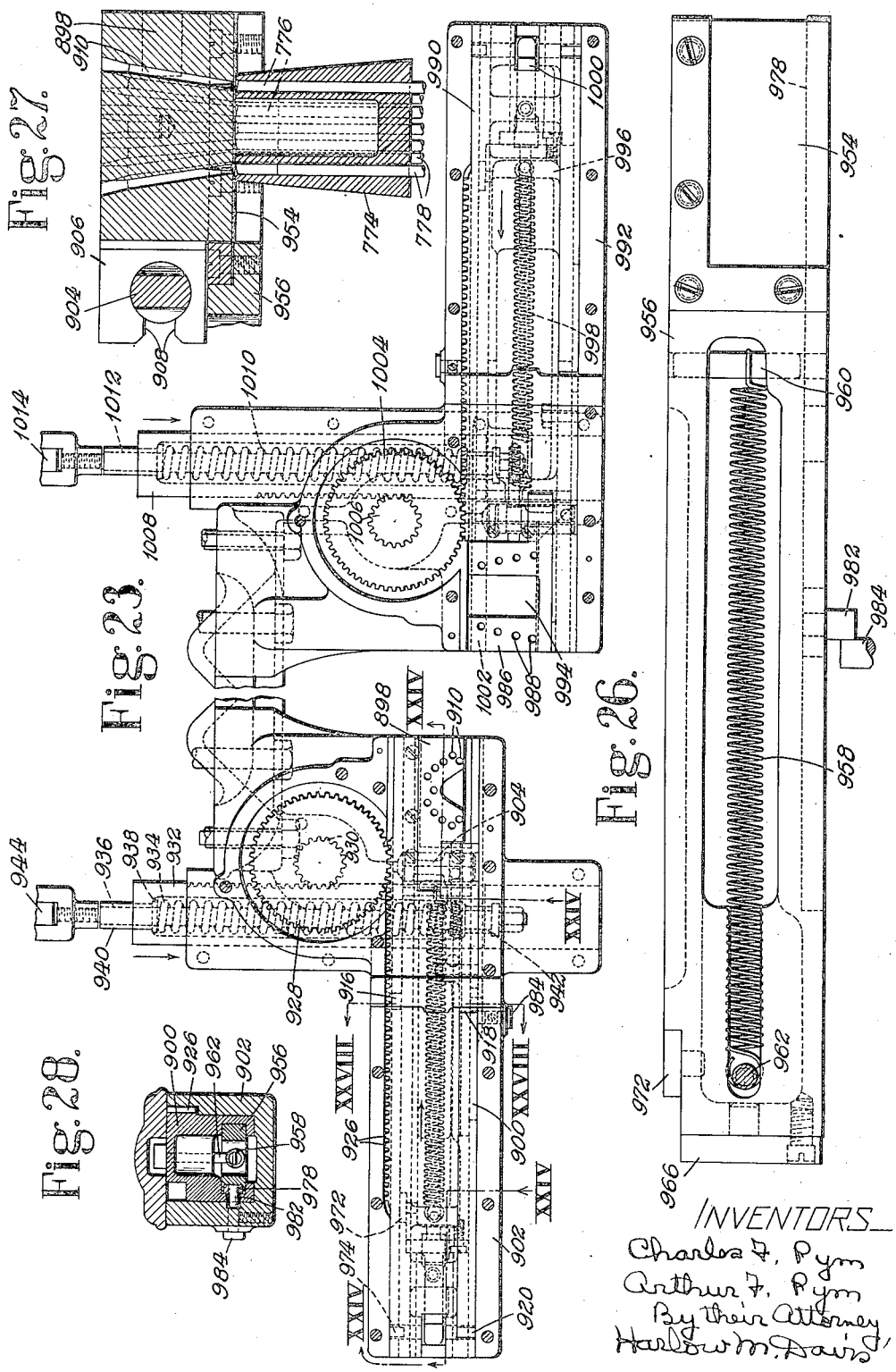

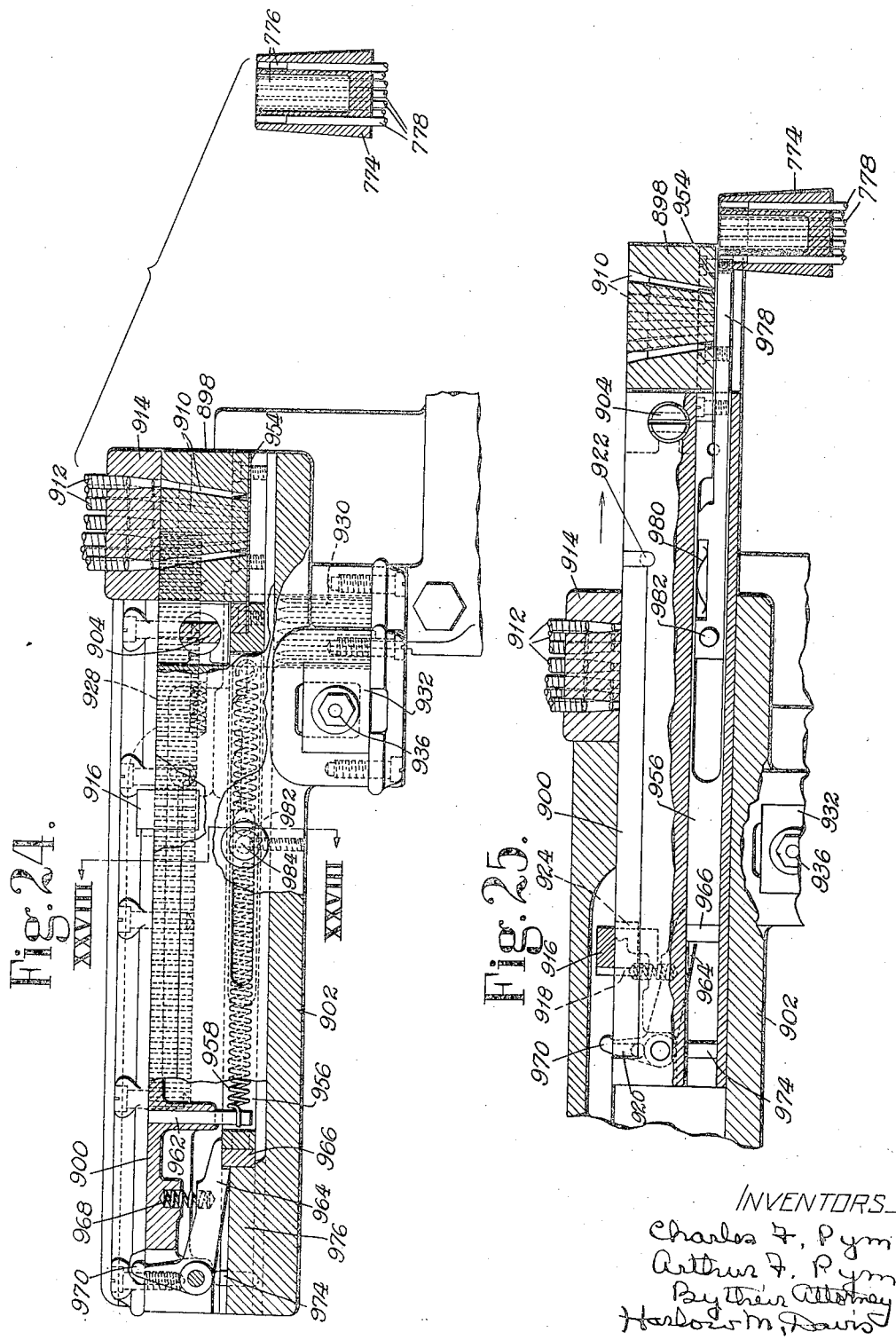

Nov. 13, 1934.  C. F. PYM ET AL  1,980,435
MACHINE FOR SHAPING UPPERS OVER LASTS
Filed March 24, 1932  19 Sheets-Sheet 15

INVENTORS
Charles F. Pym
Arthur F. Pym
By their Attorney,
Harlow F. Davis

Nov. 13, 1934.   C. F. PYM ET AL   1,980,435
MACHINE FOR SHAPING UPPERS OVER LASTS
Filed March 24, 1932   19 Sheets-Sheet 16
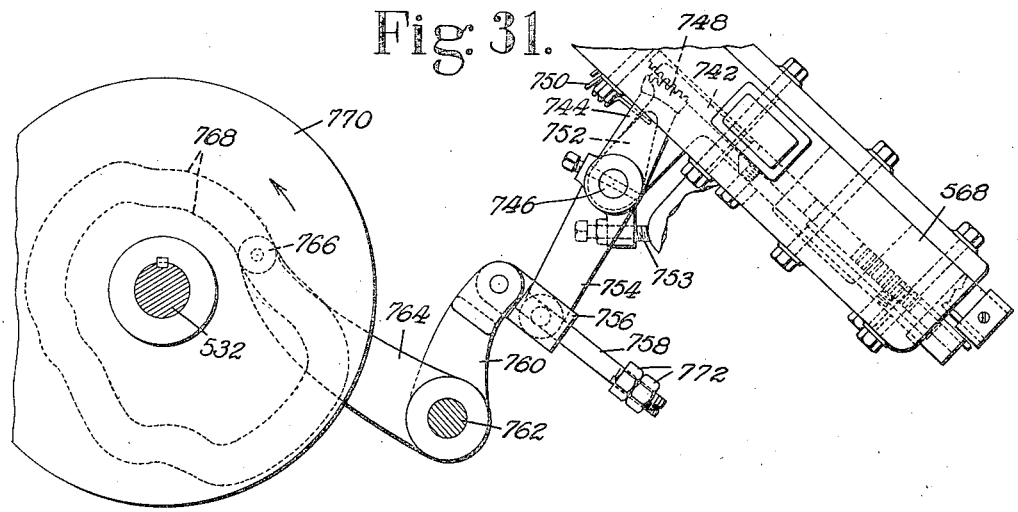
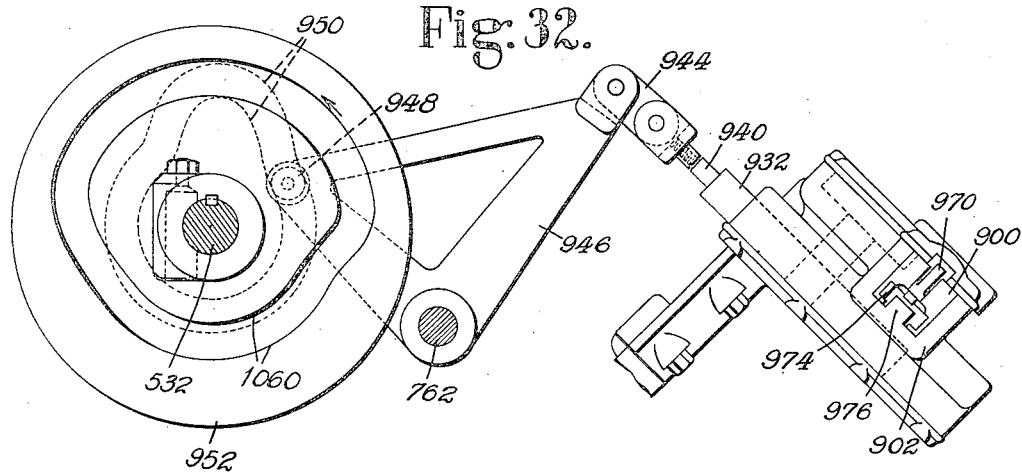
INVENTORS
Charles F. Pym
Arthur F. Pym
By their attorney
Harlow M. Davis

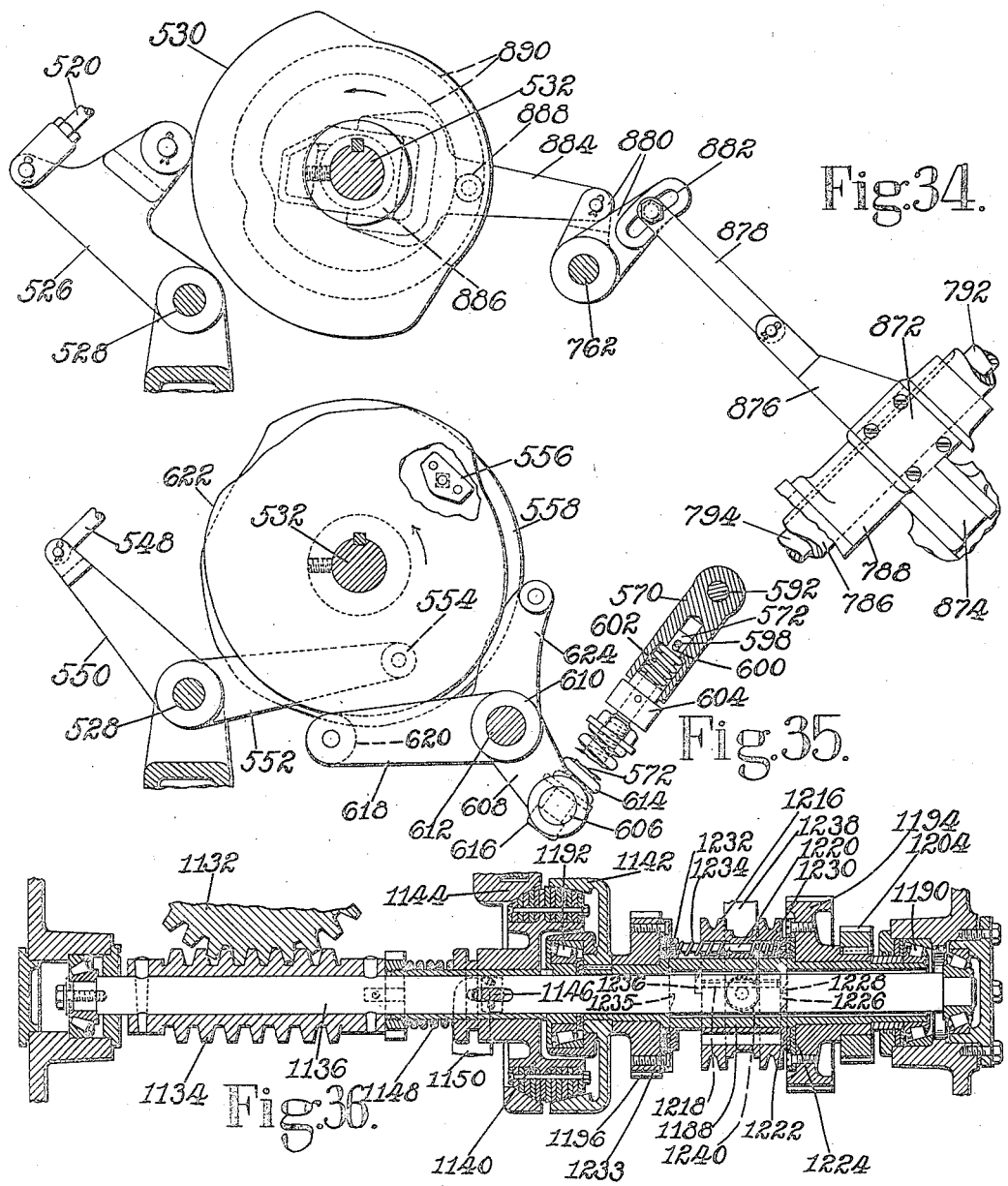

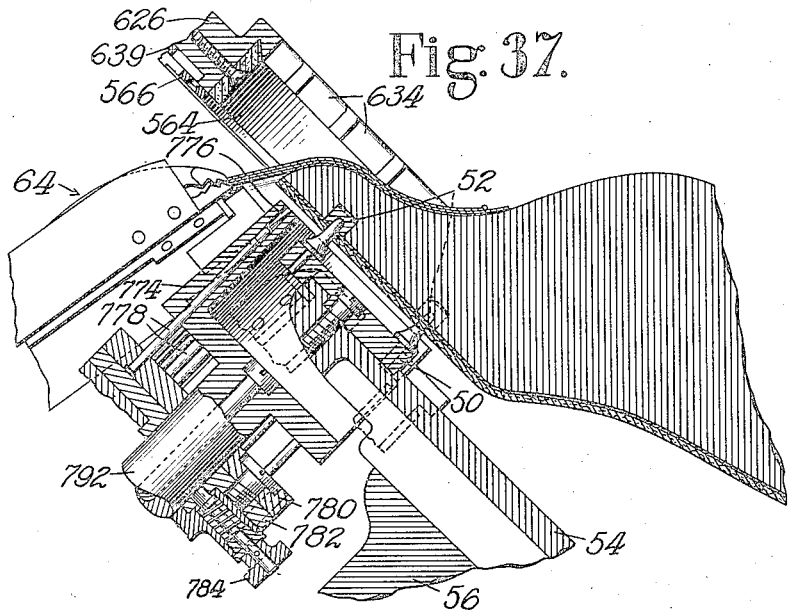
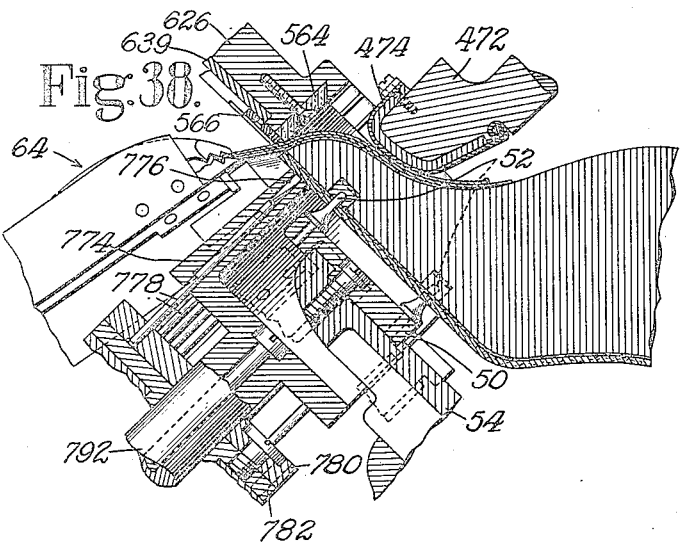
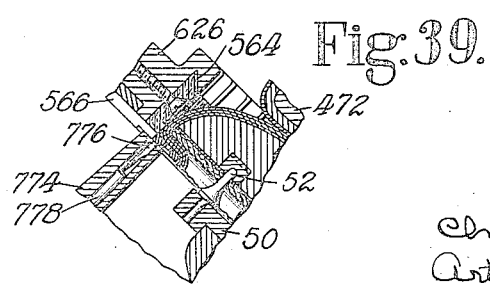

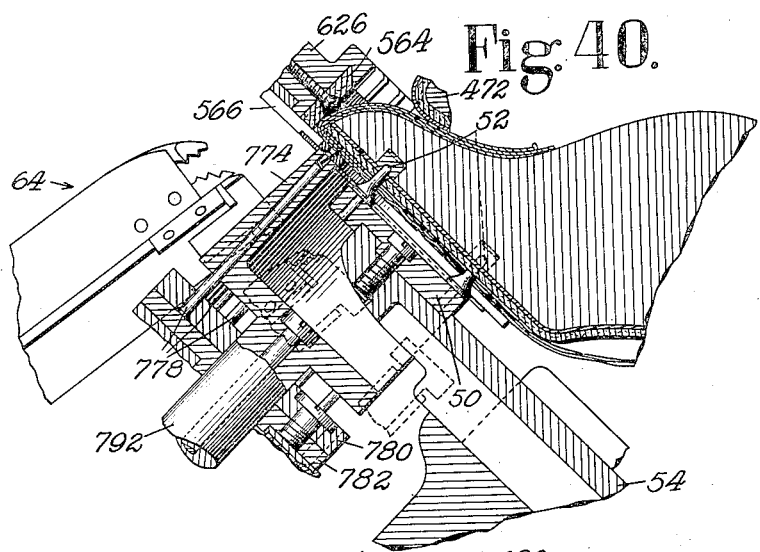
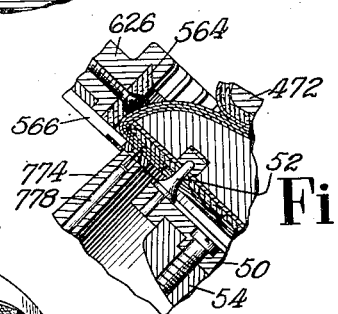
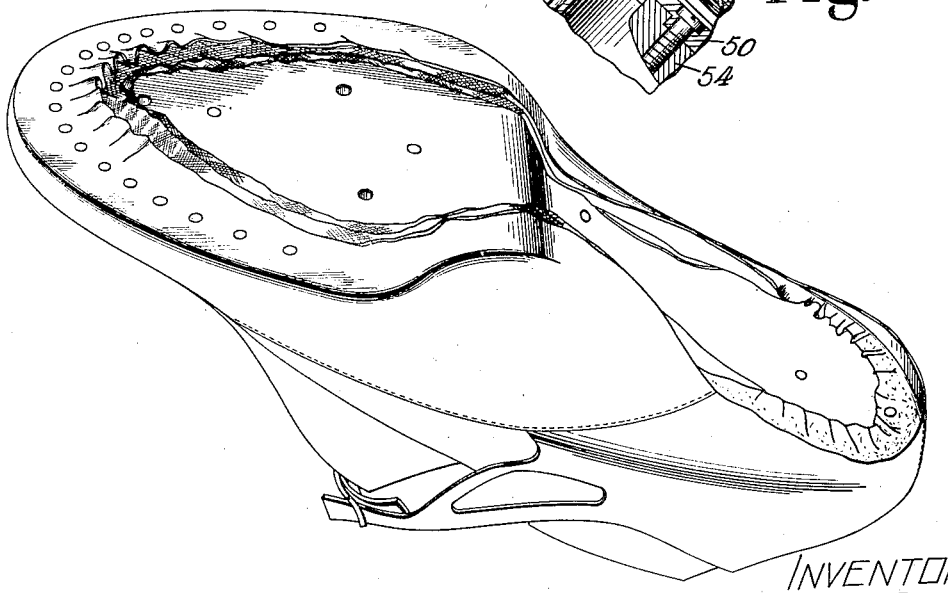

Patented Nov. 13, 1934

1,980,435

UNITED STATES PATENT OFFICE 1,980,435

MACHINE FOR SHAPING UPPERS OVER LASTS

Charles F. Pym, Beverly, and Arthur F. Pym, Swampscott, Mass., assignors to United Shoe Machinery Corporation, Paterson, N. J., a corporation of New Jersey Application March 24, 1932, Serial No. 600,900

270 Claims. (Cl. 12—4)

This invention relates to machines for use in the manufacture of shoes for shaping uppers over lasts. The invention is herein illustrated as embodied in a machine having means for pulling an upper over a last, means for working the marginal portion of the upper around the toe into lasted position over the bottom of the last, and means for fastening the upper in that position; but it is to be understood that in various novel aspects the invention is not limited to machines for performing all those operations nor to machines for lasting the toe ends of shoes. It is further to be understood that while the machine herein shown is especially designed for use in the manufacture of shoes of that type in which the marginal portion of the upper in lasted position lies in substantially parallel relation to the bottom of the last over an insole on the last, the invention is not limited to machines for operating on shoes of that particular type; and in view of the general applicability of the invention the term "sole" is frequently used hereinafter in a generic sense to designate that part over which the marginal portion of the upper is lasted, whether it be the insole of certain types of shoes or that part which in shoes of other types may be the only sole with which the shoe is provided.

In one important aspect the invention provides a novel construction and arrangement of means for shaping an upper over a last and over a sole on the last and for driving fastenings to fasten the upper to the sole. In the machine herein shown the arrangement is such that the upper is shaped over the toe end of a last positioned bottom downward, and fastenings are driven around the end and along the sides of the toe by a plurality of drivers movable upwardly in parallel relation to one another and in fixed relation to a member that operates them, the fastenings being driven from passages formed in a device which is positioned opposite the toe end of the shoe bottom when the shoe is presented to the machine. As illustrated, moreover, the upper is wiped inwardly over the sole around the toe by toe-embracing wipers that are movable relatively to the upper-fastening means in the wiping operation, the wipers being provided with openings through which the fastenings are driven after the wiping operation. While there are important advantages in an organization in which the last is thus positioned bottom downward, especially as affording the operator a good view of the upper over the top of the forepart of the last in the upper-shaping operation, it is to be understood that in various aspects the invention is not limited to an arrangement of that particular character.

The invention further provides novel means for insuring that the marginal portion of the sole will be positioned close to the bottom of the last when the upper is laid inwardly over it. For this purpose, in the construction shown, the device above referred to as provided with passages from which the fastenings are driven is moved into engagement with the sole around the toe end of the shoe bottom after the upper-pulling operation and is maintained in sole-engaging position until the wipers begin to wipe the upper inwardly over the sole, whereupon the device is withdrawn from the sole to permit the completion of the wiping operation.

In the illustrated machine the upper-fastening means is positioned against the outer faces of the wipers when the fastenings are driven, and to avoid danger of clamping any portion of the margin of the upper against these faces, the invention provides for a special movement of the fastening means relatively to the wipers into position for the driving of the fastenings. As shown, the device from which the fastenings are driven, after serving as sole-positioning means in the manner above described, is moved lengthwise of the shoe outwardly beyond the wiping edges of the wipers and is then moved into engagement with the outer faces of the wipers and reversely toward their wiping edges. Since the wipers are at the same time moving to wipe the upper inwardly over the sole, insurance is thus afforded that no portion of the margin of the upper will be bent outwardly over the wipers and clamped against them by the upper-fastening means when the fastenings are driven.

In an organization in which fastenings are driven through openings in the wipers by fastening means between which and the wipers there is provision for relative movement, as in the manner above described, it is important that the openings in the wipers shall be in proper alinement with the passages from which the fastenings are driven at the time of the driving operation. To this end, the invention further provides means whereby the wipers and the upper-fastening means cooperate to insure such alinement. In the construction shown the wipers are provided with cam faces which are engaged by members that are carried by the device in which the passages for the fastenings are formed to insure closing of the wipers to predetermined positions, the construction being such that said device and the wipers then interlock with each other in the proper relative positions.

In the machine herein shown the position of the shoe is such that the fastenings are driven upwardly into the shoe bottom in directions inclined to the vertical, and the passages from which they are driven have open upper ends to facilitate delivery of the fastenings to the driving means. When headed fastenings such as tacks are used, as illustrated, they are accordingly positioned in the passages by gravity in inclined relation to the paths of movement of the drivers, all of them being inclined in the same direction. It is desirable, however, that the fastenings be driven into the shoe bottom in directions substantially parallel to the paths of movement of the drivers so that they will not be inclined relatively to the bottom face of the sole. The invention accordingly further provides means whereby the fastenings are tipped into positions substantially parallel to the paths of movement of the drivers. For this purpose, in the construction shown, there is imparted to the upper-fastening means a movement lengthwise of the shoe after the points of the tacks have started to enter the upper in the tack-driving operation, so that by contact with their heads they are tipped to the desired positions before they have been forced into the shoe to any considerable extent. To facilitate this operation the movement imparted to the tack drivers is comparatively gradual, as distinguished from an instantaneous movement. It is to be understood that in this as well as other features the invention is not necessarily limited to an organization in which the fastenings are driven in upwardly inclined directions.

In accordance with another feature of the invention there is provided novel means for delivering fastenings to the upper-fastening means, comprising transferring mechanism which receives the fastenings from a source of supply and carries them to positions from which they are delivered into the above-mentioned passages. More particularly, in the construction shown the transferring mechanism comprises members that are movable inwardly at opposite sides of the machine to positions over the device in which the passages are formed and then deliver the fastenings into the passages, each member carrying a portion only of the whole number of fastenings used in each cycle of the machine. For supplying tacks which are to be driven point upward the transferring mechanism shown is constructed to receive and support the tacks head downward, the tacks being first separated point downward and then inverted prior to their delivery to the transferring members. In accordance with a further novel characteristic of the illustrated machine, the transfer of fastenings takes place when there is no shoe in the machine and the latter is brought to a stop automatically with the transferring mechanism in delivering position to allow time for the fastenings to settle in the driver passages, the upper-pulling grippers being at that time in retracted positions where they do not interfere with the transferring mechanism. When the machine is again started this mechanism is withdrawn and the grippers are returned into positions to receive the upper of the next shoe.

As applied to a power-operated machine having means for pulling an upper over a last and for then holding it under tension with the machine at rest, the invention further provides novel means whereby the machine may at that time be reversed and the parts returned to starting positions in case it is desired to repeat the upper-pulling operation. This result is accomplished in the construction shown by reversing the drive of a clutch through which the machine is operated. This clutch, as illustrated, comprises a driven member and a continuously running driving member arranged to operate the driven member when the clutch is actuated; and means is provided to enable the operator to reverse the direction of movement of the driving member so that the clutch, when next actuated, will effect the return of the parts to starting positions. There is further provided means for preventing such reversal of the drive until after the pulling of the upper by the upper-pulling means, and also automatic means for returning the reversing mechanism to its normal position so that the machine when next started will run in the normal direction.

For pulling the upper over the last the machine herein shown has three toe grippers comprising a central gripper that acts on the upper at the extreme end of the toe and others that act at the corners of the toe at the opposite sides of the central gripper, and has also two pairs of side grippers arranged to pull the upper respectively at the opposite sides of the forepart, each pair comprising what may be termed a front side gripper for pulling the upper at or near an end of the tip seam and a rear side gripper for pulling it at the rear of the tip seam. It is to be understood, however, that the invention is not limited to this particular number or arrangement of grippers. With reference to the upper-pulling mechanism further features of the invention are to be recognized in novel gripper-controlling means. Each of the grippers in the construction shown, extending heightwise of the last to pull the upper in that direction, is mounted for inward and outward swinging movements in directions transverse to the edge of the last bottom and is controlled by a spring that tends to swing it outwardly while permitting it to be swung inwardly by the action of the upper thereon, a stop being provided that co-operates with the spring to determine the normal position of the gripper and is adjustable to vary that position. The spring, moreover, is part of a controlling device positioned at the outer side of the gripper and relatively to which the gripper is movable in pulling the upper. Each controlling device except the one associated with the central toe gripper includes a lever mounted to swing inwardly or outwardly with the gripper, the lever being mounted on a holder that is adjustable about an axis extending heightwise of the last to turn the gripper and thereby adjust its jaws in accordance with the contour of the edge of the last bottom. In accordance with a further novel characteristic, each controlling device except the one associated with the central toe gripper is mounted for swinging movement in directions lengthwise of the last about an axis extending widthwise of the last to impart a corresponding movement to the gripper which it controls. In the case of each corner toe gripper this movement is utilized to vary the position of the gripper jaws relatively to the central toe gripper jaws for lasts of different shapes, the position of each gripper being determined by adjusting mechanism. With reference to the side grippers, the above-described swinging movements of their controlling devices are utilized to adjust the grippers preliminarily lengthwise of the last, to move them lengthwise of the last while holding the upper under tension so as to adjust the upper in proper relation to the last, and also to move them lengthwise of the last as a part of the upper-pulling operation and thereby to effect, as illustrated, what is known as a foredrawing of the sides of the upper toward the toe end of the last. In the means for operating the side grippers to pull the upper lengthwise of the last are also to be recognized various novel features, including novel means whereby such movements of the grippers are yieldingly effected, novel means for varying the extent of the movements and the initial positions of the several side grippers, and novel means whereby different grippers at the same side of the last may be moved relatively to each other lengthwise of the last while pulling the upper in that direction.

In the provision of means for operating a gripper or grippers to pull the upper heightwise of the last there are further novel features. As illustrated, there is associated with each gripper a rotatable shaft that extends heightwise of the last and is connected at one end to a member in the gripper to effect by its rotation relative closing movement of the gripper jaws; and in accordance with one novel feature the gripper is operated to pull the upper by mechanism connected to the other end of this shaft. In accordance with another feature a plurality of grippers are thus operated by a member or lever common to all of them. Still other features are embodied in a novel arrangement of parts including a lever and a spring for operating a gripper yieldingly, novel and conveniently operable means for varying the stress of the gripper-operating spring, and novel means to enable the operator to impart to the gripper movement to alter the force of its pull on the upper. In the machine herein shown there are conveniently accessible to the operator at the front of the machine three members mounted for turning movements to vary the stresses of three gripper-operating springs, one of which is common to all three toe grippers and the others associated respectively with the different pairs of side grippers; and also three manually operated levers, one for moving the three toe grippers heightwise of the last and the others for thus moving the respective pairs of side grippers to alter the force of the pull on the upper.

To facilitate the proper insertion of the marginal portion of the upper materials in the several grippers, there is further provided novel means for effecting, as illustrated, the closing of the central toe gripper on the upper prior to the starting of the power operation of the machine and while the other grippers remain open. In the construction shown this is accomplished independently of the toe gripper operating lever by rotation of the previously mentioned jaw-closing shaft, a spring-operated rack bar being releasable by the operator for turning the shaft. There is also provided means to enable the operator conveniently to open the toe gripper again, if he so desires, after it has thus been closed on the upper, and also automatic means for opening it after pulling the upper in the power operation of the machine.

There are various features of novelty also in gripper-jaw-closing mechanism. Relative closing movement of each pair of gripper jaws in the construction shown is effected by a member provided with different wedge faces, one arranged to effect a comparatively quick initial jaw-closing movement and the other to act thereafter with increased mechanical advantage to grip the upper more firmly. In accordance with another feature, the relative jaw-closing movement is effected by movement of a member that is operated yieldingly through a spring by movement of another member in the gripper, both members in the construction shown being rectilinearly movable in the same direction. In accordance with still another feature, a member that is rotatable in the gripper to effect relative closing movement of the jaws is itself moved bodily to accelerate the closing of the jaws, this member in the construction shown having oppositely inclined screw threads thereon which cooperate respectively with other members for the purpose in view.

For working the toe portion of the upper into lasted position the machine is provided with a device for wiping the upper about the toe heightwise of the last, this operation being commonly known as an upwiping operation and accordingly so referred to hereinafter although the direction of the movement in the illustrated machine is downward; and with toe-embracing wipers for wiping the marginal portion of the upper inwardly over the bottom of the last, these wipers being sometimes hereinafter referred to as overwiping wipers. In accordance with one feature of the invention there is a common support for the upwiping device and the wipers which is movable to carry them toward the toe and thereafter to impart to the wipers their wiping movements lengthwise of the last, additional mechanism being provided for closing the wipers inwardly at the sides of the toe. As illustrated also this support is movable heightwise of the last to effect the upwiping operation. In accordance with a further feature mechanism is provided for moving the upwiping device relatively to the common support, the construction shown comprising novel means for pressing it forwardly against the end of the toe and for closing it inwardly against the sides of the toe. Still other novel features are to be recognized in the construction of the upwiping means, comprising a flexible band controlled through a novel arrangement of springs or spring-pressed members arranged to act in different locations along the band to press it against the shoe. This means has the further function of clamping the upper around the end of the last, and novel features are also to be recognized in the construction disclosed considered simply as clamping means adapted for use at either end of a last.

For supporting the last and shoe against pressure applied on its bottom face novel means is also provided comprising, as illustrated, a shoe holder arranged to act on the shoe at the top of the forepart and arranged to be moved heightwise of the shoe by the operator substantially into operative position and thereafter to be forced firmly against the shoe in the power operation of the machine. In the construction shown the shoe holder is carried by a lever arranged to be swung downwardly by the operator while the machine is at rest after the pulling of the upper and then to be caught by a latch that is carried by another lever operated automatically to apply the pressure when the machine is again started. Novelty is to be recognized also in the means for operating the other lever, and more generally in means whereby the shoe holder is forced yieldingly against the shoe and is then held positively against retractive movement.

The above-mentioned and other features of the invention, including various novel details of construction and combinations of parts, will now be more particularly described by reference to the accompanying drawings and pointed out in the claims.

In the drawings,

Fig. 5 is a vertical central section longitudinally of the machine illustrating especially the construction of portions of the upper-pulling mechanism;

Fig. 6 is a view partly in side elevation and partly in section showing more fully portions of the upper-pulling mechanism;

Fig. 7 is a section on the line VII—VII of Figs. 5, 6 and 8;

Fig. 8 is a section on the line VIII—VIII of Fig. 7;

Fig. 9 is a view partly in elevation and partly in section showing one of the upper-pulling grippers and portions of its controlling means;

Fig. 10 is a view partly in plan and partly in section on the line X—X of Fig. 9;

Fig. 11 is a longitudinal section through one of the grippers, illustrating more fully the construction thereof;

Fig. 12 is substantially a plan view of the toe-wiping mechanism, with parts broken away;

Fig. 13 is a view partly in elevation and partly in section on the line XIII—XIII of Fig. 12;

Fig. 14 is a plan view of the overwiping wipers and parts associated therewith;

Fig. 14a is a plan view, with parts broken away, illustrating the interlocking of the wipers and the upper-fastening means;

Fig. 15 is a plan view showing more fully the upwiping means and parts associated therewith;

Fig. 16 shows the upwiping means and its operating mechanism substantially in side elevation, parts associated therewith being omitted;

Fig. 17 is a section on the line XVII—XVII of Fig. 15;

Fig. 18 is a section on the line XVIII—XVIII of Fig. 15;

Fig. 18a is a section on the line XVIIIa—XVIIIa of Fig. 15;

Fig. 19 is a view in left-hand side elevation, with parts in section, showing a portion of the tack-supplying mechanism at the left-hand side of the machine;

Fig. 19a shows in section a portion of the structure included in Fig. 19;

Fig. 20 is a view in right-hand side elevation of a portion of the tack-supplying mechanism at the right-hand side of the machine;

Fig. 21 is a detail view of a portion of the means for operating one of the tack hoppers;

Fig. 22 is substantially a plan view of a portion of the tack-transferring mechanism, with parts broken away;

Fig. 23 is a view generally similar to a portion of Fig. 22, on an enlarged scale, illustrating more fully the construction of certain parts;

Fig. 24 is a view partly in front elevation and partly in section of a portion of the tack-driving and tack-transferring mechanisms, parts of the tack-transferring mechanism being shown in section on the lines XXIV—XXIV of Fig. 23;

Fig. 25 shows a portion of the tack-driving and tack-transferring mechanisms, with the parts differently positioned than in Fig. 24;

Fig. 26 shows in plan a portion of the tack-transferring mechanism detached;

Fig. 27 is a sectional view showing a portion of the tack-transferring mechanism ready to deliver tacks to the driving means;

Fig. 28 is a section on the line XXVIII—XXVIII of Figs. 23 and 24;

Fig. 31 is a view in side elevation of a portion of the mechanism for operating the overwiping wipers;

Fig. 32 is a view in side elevation of a portion of the operating means for the tack-transferring mechanism;

Fig. 33 shows partly in elevation and partly in section a portion of the tack-driver-operating means;

Fig. 34 shows in side elevation a portion of the means for operating the shoe holder and of the means for controlling the device from which the tacks are driven;

Fig. 35 shows in side elevation a portion of the means for releasing the shoe holder and for imparting movements heightwise of the shoe to the toe-wiping means;

Fig. 36 is a vertical section longitudinally of the machine through the power-driving means;

Figs. 37, 38, 39, 40 and 41 illustrate different positions of parts of the machine in operating on a shoe; and Fig. 42 is a perspective view of a shoe after it has been operated upon by the machine.

Figure 1:
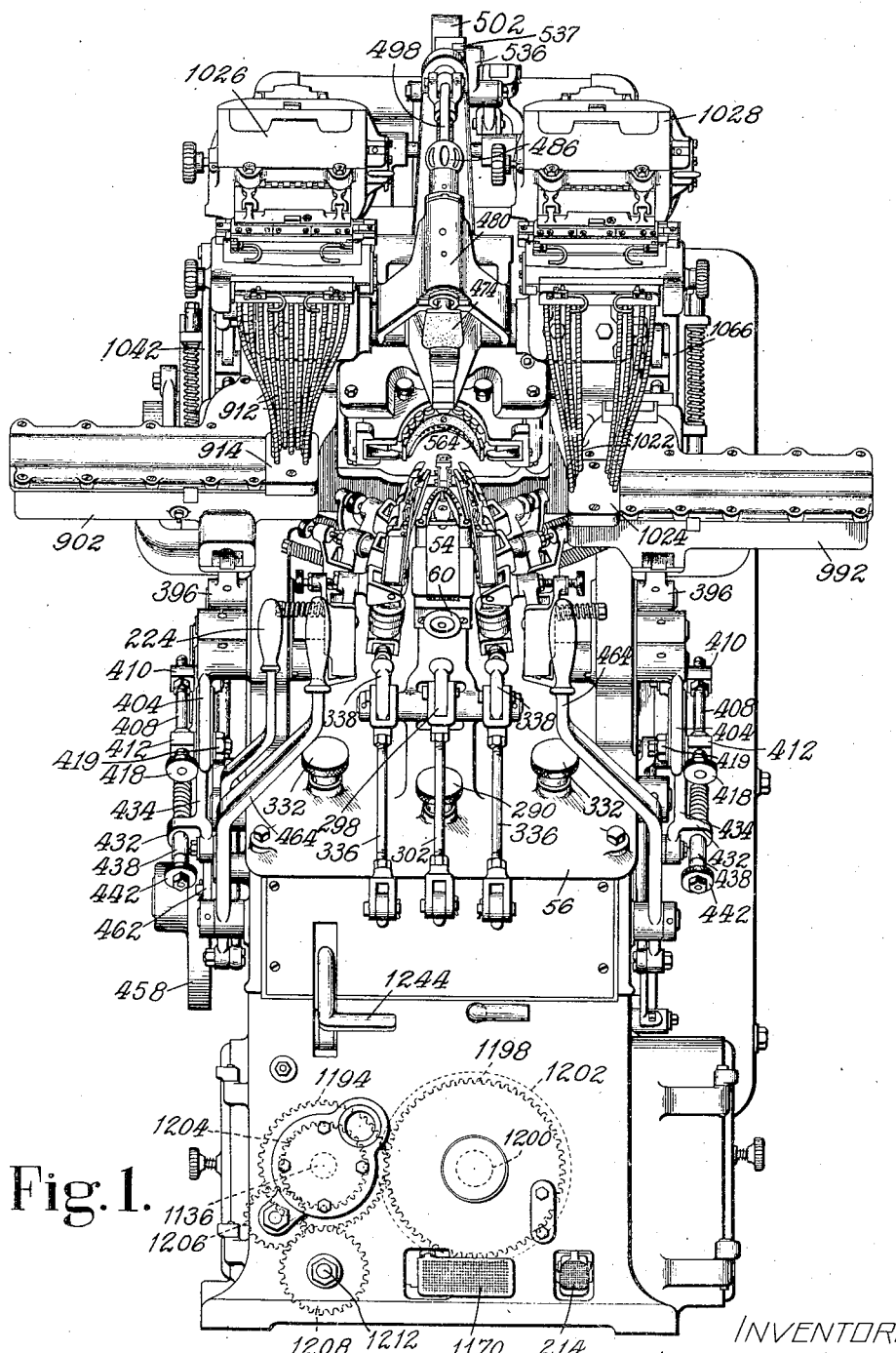
Fig. 1 is a view in front elevation of a machine in which the invention is embodied.

The machine herein shown is provided with means for supporting a last and shoe bottom downward in an inclined position with its toe end pointing upwardly and rearwardly away from the operator's working position, so that the operator may conveniently view the top of the forepart of the upper by looking forwardly and downwardly upon it and may thus readily determine when the upper is properly pulled and when it is positioned in proper relation to the last. This work-supporting means, as illustrated, is so constructed as to determine positively the position of the last and shoe, so that all shoes of the same size and style are positioned in exactly the same relation to the means that operates thereon. For this purpose there is provided a plate 50 (Fig. 5) having thereon three pins 52 arranged to project through holes in the insole into sockets provided in the bottom of the forepart of the last substantially in accordance with the disclosure of Letters Patent No. 1,674,060, granted on June 19, 1928 upon an application of A. F. Pym. The plate 50 is secured to a plate 54 which is mounted on a bracket 56 on the frame of the machine and is adjustable in directions lengthwise of the shoe by means of a threaded spindle 58 provided with a hand wheel 60 for turning it, a portion of this spindle being threaded in the plate 54 and another portion swiveled in a plate 62 which is fast on the bracket 56. The spindle 58 is secured in adjusted position by a lock nut 63. While convenient means is thus provided for determining the proper position of the work without the necessity for the exercise of any special care on the operator's part in presenting the work to the machine, it is to be understood that the invention is not limited to the use of work-positioning means of this particular character.

For pulling the upper over the last there are provided in the machine herein shown three toe grippers and two grippers for pulling the upper at each side of the forepart at the rear of the toe grippers. The three toe grippers comprise a central toe gripper 64 for pulling the upper substantially midway between the opposite sides of the toe and two grippers 66 with their jaws in angular relation to the central toe gripper jaws for pulling it at what may be termed the corners of the toe at the opposite sides of the central toe gripper. The two side grippers at each side comprise a front side gripper 68 for pulling the upper at or near an end of the tip seam, if the shoe is provided with a toe tip, and a rear side gripper 70 for pulling the upper in a location nearer the ball of the last. The several grippers are all substantially alike in construction, each of them comprising a casing 72 (Fig. 11) upon the upper end of which are mounted a pair of upper-gripping jaws consisting of a jaw 74 which is fast on the casing and a jaw 76 pivoted at 78 for swinging movements toward and from the fixed jaw. A spring plunger 80 mounted in the jaw 76 and bearing upon a portion of the jaw member 74 tends to swing the jaw 76 away from the jaw 74 to open the gripper for the reception of the upper materials. For moving the jaw 76 toward the other jaw to grip the upper there is mounted in the casing 72 a jaw-closing member or slide 82 arranged to engage a roll 84 which is mounted on a depending portion of the jaw member 76. The member 82 is arranged to perform its jaw-closing action by rectilinear upward movement in a direction substantially parallel to the direction of the pull of the gripper on the upper, and for this purpose it is provided with two wedge faces 86 and 88. It will be noted that the wedge face 86 is more nearly perpendicular to the direction of movement of the member 82 than the face 88, so as to impart initially to the jaw 76 a comparatively quick closing movement. Thereafter the wedge face 88 acts on the roll 84 with increased mechanical advantage to cause the jaws firmly to grip the upper materials.

For imparting to the jaw-closing member 82 its operative movement there is provided a member 90 which is rotatable in the gripper casing 72 about an axis extending lengthwise of the gripper in substantially parallel relation to the direction of the pull of the gripper on the upper, this member being provided with screw threads 92 having inclined faces arranged to engage correspondingly inclined faces of threads formed within a member 94 which is slidingly movable in the casing 72 in directions lengthwise of the gripper, the member 94 being held from turning by a key 96 mounted in a slot in the casing 72. Integral with the member 94 is a rod 98 which extends upwardly into an opening in the member 82 and is provided at its upper end with a pin 100 projecting into a slot 102 in the member 82 to prevent the latter from turning while permitting rectilinear movement of the member 94 relatively to the member 82. Between the upper end of the member 94 and a shoulder provided within the lower end portion of the member 82 is a spring 104 through which the jaw-closing member 82 is operated yieldingly by upward movement of the member 94. The pin 100 and the slot 102 are so arranged that before the gripping of the upper the spring 104 is maintained under substantial compression. The rotatable member 90 is also provided with screw threads 106 having faces oppositely inclined with respect to the faces of the threads 92 and arranged to engage cooperating threads formed in a nut 108 which is mounted in an enlarged opening in the lower end of the casing 72 and is thus prevented from moving upwardly in the casing, the nut also being held from turning by the key 96. Threaded on the lower end of the casing 72 is a cap 110 in which is a washer 111 that confines the nut 108 in the casing, this cap being held from turning by a lock nut 112. The screw-threaded member 90 extends downwardly within this cap and has a reduced lower end portion 113 projecting into an opening formed in a short shaft 114 which is mounted on roller bearings 116 in the cap 110 and has a flange 117 supported by the roller bearings. A key 118 connects the lower end portion 113 of the member 90 to the shaft 114 while permitting upward and downward movements of the member 90 relative to the shaft 114. Accordingly when the shaft 114 is turned it imparts turning movement to the member 90, as a result of which movement the screw threads 92 force the member 94 upwardly to impart jaw-closing movement to the member 82. At the same time the threads 106 serve to impart to the member 90 itself rectilinear upward movement in the direction of its axis and thereby to accelerate the operative movement imparted to the member 82, so as to effect the jaw-closing operation with comparatively little turning movement of the member 114. The member 114 is connected by a universal joint 120 to an operating shaft 122 which is operated by means hereinafter described. It will be understood that the opening of the gripper is effected in response to reverse downward movement of the member 82 when the movement of the shaft 114 is reversed, the pin 100 acting positively on the member 82 to insure its withdrawal to a position such as to permit the jaw 76 to be swung away from the jaw 74 by the spring plunger 80.

The several gripper-closing shafts 122 (Figs. 5 and 8) are parallel to one another and are extended downward, heightwise of the last, through bearings in the brackets 56 which are of greater diameter than the shafts, and mounted on each of the shafts are two sleeve members 124 and 126 of the same diameter as the bearing through which the shaft extends. Between these two sleeve members each of the shafts has formed thereon an elongated pinion 128 through which the shaft is turned to close the gripper. The three pinions 128 associated respectively with the front and rear side grippers and the corner toe gripper at the left-hand side of the machine are all engaged by a rack bar 130 (Figs. 7 and 8) mounted for sliding movement in the bracket 56. Adjacent to the rack bar 130 is an operating slide 132 which is connected to the rack bar by a pin 133 (Fig. 7). The slide 132 is guided by gibs 134 and is connected by a link 136 to a lever arm 138 formed on a sleeve 140 (Figs. 3, 4 and 30) which is mounted for rocking movement about a rod 142 on the frame. The three corresponding pinions 128 at the right-hand side of the machine are engaged by a rack bar 144 (Figs. 7 and 8). In order to turn these pinions simultaneously in the same directions as the other pinions, the rack bar 144 is connected by an idle pinion 146 to another rack bar 148 above it, this rack bar being connected by a pin 150 to an operating slide 152 which is guided by gibs 154 on the bracket 56. The slide 152 is connected by a link 155 to a lever arm 156 fast on the sleeve 140. It will thus be seen that both the slides 132 and 152 are moved simultaneously in the same direction, but that the rack bars 130 and 144 are moved in opposite directions, the relation of these rack bars to the pinions 128 that they operate being such that all these pinions are turned in the same direction. For turning the sleeve 140 there is fast thereon a lever arm 157 (Figs. 3, 4 and 30) which carries a roll 158 engaged and operated by a path cam 160 formed in one side of a cam wheel 162 fast on a cam shaft 164.

The machine herein shown is so constructed that the central toe gripper 64 may, if desired, be closed on the upper prior to the starting of the power operation of the machine, so that the operator may first position the extreme toe end of the upper in proper relation to this gripper and may secure it in that relation before he arranges the margin of the upper properly between the jaws of the other grippers. To this end, the pinion 128 of the central toe gripper shaft 122 is engaged by a pinion 166 (Figs. 5 and 7) which is connected by another pinion 168 to a rack bar 170 slidingly movable upon the previously-mentioned rack bar 130. The two pinions 166 and 168 serve to transmit to the pinion 128 of the central toe gripper shaft jaw-closing movement in the same direction as the movements of the other pinions 128 when the rack bar 170 is moved toward the left (Fig. 7). For imparting this movement to the rack bar 170 there is provided a spring 172 which is mounted within a recess 174 in this rack bar, the spring bearing at its left-hand end (Fig. 7) upon a bushing 175 that is threaded in the rack bar and at its right-hand end on a block 176 which is mounted on a pin 178 projecting from the slide 132. A rod 180 extends from the block 176 through the spring and is slidingly mounted in the bushing 175. Initially the rack bar 170 is held in the position in which it is shown in Fig. 7 by a latch 182 (see also Fig. 6) in engagement with an arm 184 which is fastened to one end of the rack bar and projects laterally therefrom, the latch 182 being pivotally mounted at 186 on the slide 132. The latch is maintained in operative position by a spring plunger 188 which is mounted in a block 190 fast on the slide 132 and engages a lug 192 projecting downwardly from the latch. A finger 194 on the latch is arranged to engage the block 190 to limit movement of the latch under the influence of the spring plunger. To release the rack bar 170 to the action of the spring 172 and thus to cause the closing of the central toe gripper on the upper, there is provided means for turning the latch 182 out of engagement with the arm 184. This means comprises a finger 196 arranged to engage the lug 192 on the latch, this finger being fast on a sleeve 198 (Fig. 7) which is mounted to turn on a shaft 200. Projecting downwardly from the sleeve 198 is an arm 202 a portion of which is offset lengthwise of the shaft 200 and is connected by a link 204 to an arm 206 fast on a rock shaft 208 on the frame, this rock shaft having also fast thereon another arm 210 connected by a link 212 to a treadle 214 pivoted on a bracket on the frame. A spring 216 serves to lift the treadle and to maintain it normally in a position determined by a stop screw 218 carried by an arm 220 on the rock shaft 208 and arranged to engage the frame of the machine. When the treadle is depressed the latch 182, through the connections described, is turned in a clockwise direction, thereby releasing the arm 184, whereupon the spring 172 impels the rack bar 170 toward the left (Fig. 7) and thereby closes the central toe gripper upon the upper. The distance that the rack bar moves will, of course, vary somewhat in accordance with the thickness of the upper materials. In this movement of the rack bar the arm 184 travels in a slot 222 (Fig. 7) in the slide 132. When the slide 132 is thereafter moved toward the left in the power operation of the machine to close the three grippers which it controls, it carries the block 176 with it and therefore serves to compress the spring 172 and thus to cause the central toe gripper jaws to grip the upper more firmly. It will be understood, however, that but little additional movement of the rack bar 170 results from such compression of the spring, and accordingly the slide 132 in its operative movement carries the latch 182 far enough to cause it to be returned by the spring plunger 188 into operative relation to the arm 184. In the return of the slide 132 to starting position the rack bar 170 is accordingly returned with the slide, thus opening the central toe gripper simultaneously with the other grippers. It will be understood that if the central toe gripper is not closed as described before starting the machine, it will be closed simultaneously with the other grippers by movement of the rack bar 170 with the slide 132.

There is further provided means whereby the central toe gripper, after it has been closed on the upper as above described, may be opened again to release the upper prior to the starting of the power operation of the machine if the operator so desires, in case, for example, the upper may not have been properly positioned when it was gripped. This means comprises a hand lever 224 which is fast on a rock shaft 226 on the frame, this shaft carrying an arm 228 connected by a link 230 to an arm 232 fast on a sleeve 233 on the shaft 200. This sleeve has integral therewith an arm 234 which is arranged to engage the arm 184 on the rack bar 170 and thus to return the rack bar to its initial position where it is caught and held again by the latch 182 when the operator pulls the lever 224 forwardly. Thereafter a spring 236 serves to return the hand lever and the arm 234 to their initial positions, the movement of the hand lever being limited by a pin 238 (Fig. 2) on the frame.

Figure 3:
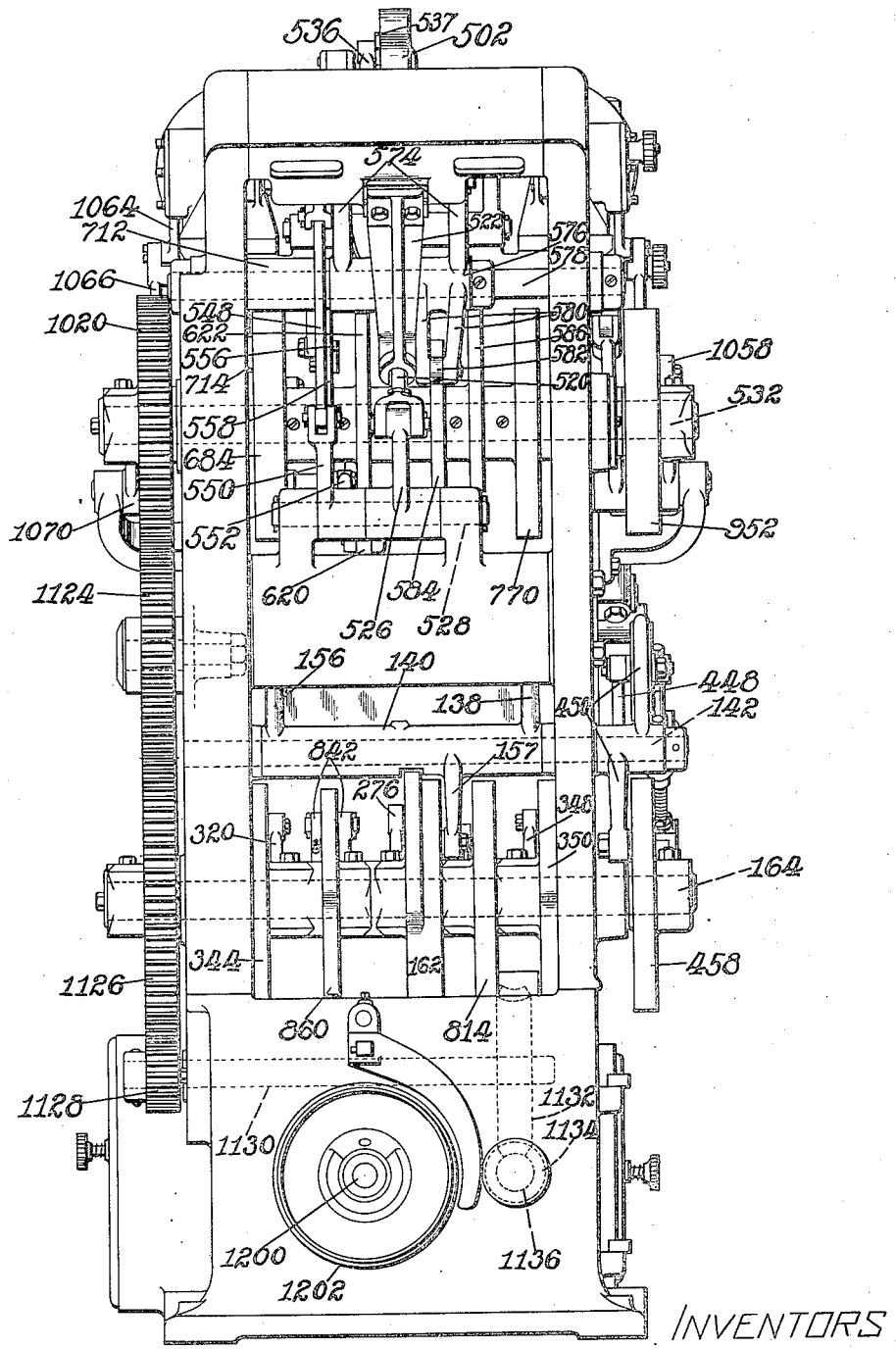
Fig. 3 shows the machine in rear elevation.
Figure 4:
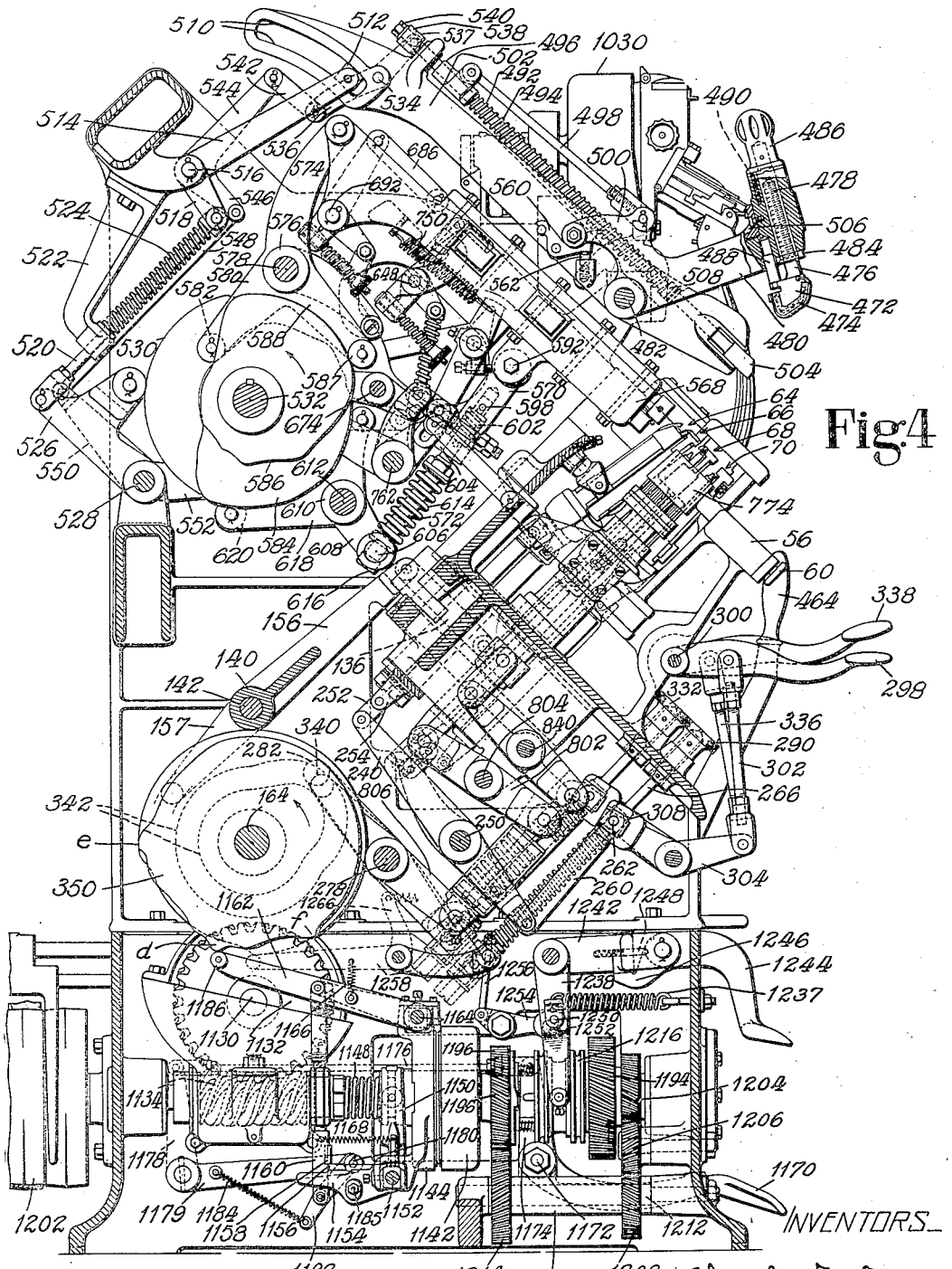
Fig. 4 is a view of the machine partly in left-hand side elevation and partly in section.
Figure 30:
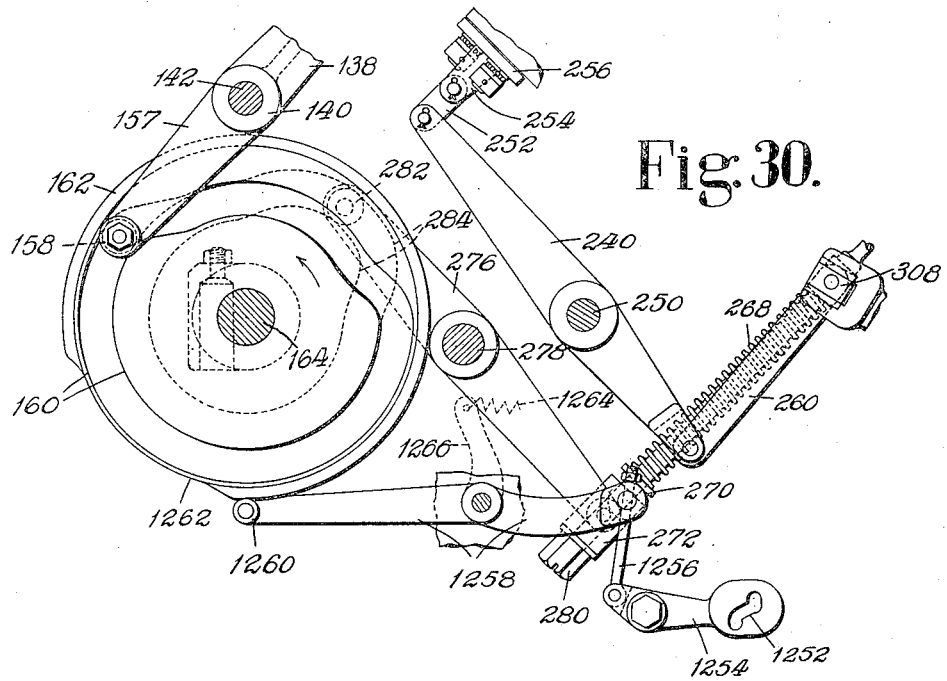
Fig. 30 is a view in side elevation of a portion of the gripper-operating mechanism and of mechanism for controlling the operation of the machine.

The several grippers are operated to pull the upper heightwise of the last by downward movements of the gripper closing shafts 122 with their sleeves 124 and 126, the latter sliding in the bearings through which the shafts extend. The central toe gripper 64 and the two corner toe grippers 66 are thus operated simultaneously by a lever 240 which is common to these three grippers and is fulcrumed on a rod 250 on the frame (Figs. 4 and 5). Since this lever effects what is commonly known as an updraw movement of the grippers, it is frequently referred to hereinafter as an updraw lever, although the pull on the upper is actually in a downward direction. The lever 240 is connected by a link 252 to a lug 254 projecting from a plate 256 through which all three toe gripper shafts 122 extend, this plate resting upon ball bearings supported by collars 258 that are fast on the ends of the shafts. The other end of the lever 240, extending forwardly toward the front of the machine, is connected by a pair of links 260 to pins 262 projecting from opposite sides of a sleeve 264 which is slidingly mounted on a rod 266 and bears on the upper end of a coil spring 268 on the rod. The lower end of this spring rests on a bushing 270 which is threaded in a member 272 provided on its opposite sides with pins 274 whereby it is connected to one end of a lever 276 fulcrumed on a rod 278 on the frame. A nut 280 on the lower end of the rod 266 serves to confine the member 272. At its rear end the lever 276 carries a roll 282 which is engaged by a path cam 284 formed in one side of the previously mentioned cam wheel 162 (Figs. 3 and 30). It will be evident that in operating the toe grippers to pull the upper the forward end of the lever 276 receives an upward movement, carrying the bushing 270 with it, and that the latter acts yieldingly through the spring 268 on the sleeve 264 to operate the lever 240 through the links 260, the spring 268 being compressed more or less in accordance with the resistance of the upper to the force of the pull. To return the toe grippers to starting positions the member 272 acts positively on the nut 280 in response to downward movement of the forward end of the lever 276, thus moving the rod 266 downwardly, this rod being provided with a flange 286 which in this operation bears on the upper end of the sleeve 264 and thus serves to impart downward movement to the links 260.

To vary the initial compression of the updraw spring 268 and thereby the force with which the upper is pulled by the toe grippers, there is provided a sleeve 288 which is mounted to turn in a bearing in the previously mentioned bracket 56 and has on its upper end a knurled head 290 for turning it, the sleeve being confined in its bearing by a collar 291 fast on its lower end. A reduced portion of the rod 266 extends upwardly within this sleeve and has on its upper end a rounded portion of substantially the same diameter as the sleeve provided with a pin 292 connected to a key which lies in a slot 294 formed in and extending lengthwise of the sleeve. A connection between the sleeve and the rod is thus provided at all times, so that the rod may be turned by turning the sleeve, the rod being movable upwardly within the sleeve in the upper-pulling operation. Near its lower end the rod 266 is connected by a pin 296 to the threaded bushing 270, the pin being fast on the bushing and extending through a slot 297 in the rod, so that the bushing is turned by the turning of the rod but is permitted to slide upwardly and downwardly along the rod. Accordingly the turning of the rod 266 serves to screw the bushing 270 upwardly or downwardly in the member 272 which is connected to the lever 276 and thus to vary the initial compression of the spring 268.

The machine is further provided with means whereby the three toe grippers, after they have been operated to pull the upper and while holding it under tension, may be moved by the operator to increase or decrease the force of the pull with which the upper is held. This means comprises a hand lever 298 pivoted on a rod 300 on the bracket 56 and connected by a link 302 to one arm of a bell-crank lever 304 fulcrumed on a rod 306 on the frame, the other arm of this lever having a forked end in sliding engagement with blocks 308 (Figs. 4 and 5) which are mounted on the pins 262. It will thus be seen that by depressing the hand lever 298 upward movement is imparted to the links 260 to move the lever 240 in the direction to increase the force of the pull of the toe grippers on the upper, and that by lifting the hand lever the force of the pull may be relaxed.

The two side grippers 68 and 70 at either side of the last are operated to pull the upper independently of the two grippers at the other side of the last. The mechanism for thus operating the two side grippers at the right-hand side is shown principally in Fig. 5. On the lower end of each of the gripper-closing shafts 122 connected to these grippers there is mounted a member 310 supported on a ball bearing similarly to the previously-mentioned plate 256 of the toe-gripper operating means, each of the members 310 being provided with a downwardly-extending lug 312. The two lugs 312 are connected by a cross-link or equalizer 314 which is connected midway between its ends by a link 316 to a side updraw lever 318 mounted to swing on the rod 250. This lever is yieldingly operated by a lever 320 mounted on the rod 278 through connections of substantially the same construction as those above described between the toe gripper operating levers 240 and 276, comprising links 322, a spring 324, a rod 326, a threaded bushing 328 and a member 330 in which the bushing is threaded, this member being carried by the lever 320. By means of a knurled head 332 on a sleeve 333 the rod 326 may be turned to vary the compression of the spring 324 in the same manner as the corresponding parts of the toe gripper operating means, and by a lever 334 mounted on the rod 306 and connected by a link 336 to a hand lever 338 (Fig. 1) on the rod 300 the two right hand side grippers may be moved by the operator either to increase or to relax the force of their pull on the upper. It will be understood that in the pulling of the upper these two grippers 68 and 70 may move relatively to each other heightwise of the last, as permitted by the cross-link 314, in accordance with differences in the resistance of different portions of the upper to the force of the pull, thus substantially equalizing the forces with which the two grippers pull the upper. The operating lever 320 carries a roll 340 (Figs. 4 and 5) operated by a path cam 342 formed in one side of a cam wheel 344 (Fig. 3) on the cam shaft 164. In order to position the two side grippers always in the same relation to each other heightwise of the last in the return of the parts to their starting positions, there is provided a spring plunger 346 against which the two members 310 are carried, this plunger serving also to cushion the members and thus to avoid objectionable noise.

The two side grippers 68 and 70 at the left-hand side of the machine are operated and controlled by mechanism substantially like that above described for operating the two grippers at the right-hand side, the various parts of this mechanism, in so far as they appear in the drawings, being designated by the same reference characters as those designating corresponding parts of the right-hand side gripper operating mechanism, except that the left-hand gripper operating lever, corresponding to the lever 320, is designated by reference character 348 (Fig. 3) this lever being operated by a path cam formed in a cam wheel 350 on the shaft 164. It will be understood that by means of the two knurled heads 332 the two side updraw springs 324 may be variably compressed each independently of the other, and that by manipulation of the two hand levers 338 the operator may increase or relax the force of the pull applied by the side grippers at either or both sides of the last and may shift the forepart of the upper transversely of the last.

As the several grippers are operated in the manner described to pull the upper, they are each guided by two plates 352 which are shown in Figs. 9 and 10 in their relation to one of the rear side grippers, these plates being located at opposite sides of the gripper casing 72 and having flanges that run on guideways 354 in the casing. The plates 352 shown in Figs. 9 and 10 carry pins 356 that are pivotally mounted in ears 358 of a member 360 which is part of a gripper-controlling device positioned at the outer side of the gripper, i. e., the side farthest from the shoe, the member 360 having a sleeve portion 362 mounted to turn in a bearing in the upper end of a lever 364 arranged to extend heightwise of the last. A cap screw 366 threaded in the sleeve 362 serves to hold the member 360 in place on the lever 364. This lever is pivoted at 368 in a holder 370 which is supported on a shelf 372 formed on a sleeve 374, this sleeve being keyed to a rock shaft 376 which is mounted in the bracket 56 and being further secured to the rock shaft by a set screw 377. Pivotally connected to the lever 364 and extending through an opening in the holder 370 is a rod 378 provided with a nut 380 on its outer end and having thereon a compression spring 382 between the nut and the holder. It will thus be seen that the spring 382 tends to swing the gripper outwardly away from the last about its universal joint connection with the shaft 122. A stop screw 384 threaded in the upper end of the holder 370 and bearing on the screw 366 limits outward swinging movement of the gripper and may be turned to adjust the gripper widthwise of the last transversely of the edge of the last bottom. It will be understood that in the upper-pulling operation the gripper casing 72 slides downwardly along the plates 352, and since the upper is flared somewhat outwardly from the side of the last as the pull is applied, the resistance of the upper may cause the gripper to swing somewhat inwardly while compressing the spring 382. The holder 370 is secured to the shelf 372 by a cap screw 386, and on its lower end it is provided with a curved rib 388 which lies in a correspondingly curved slot 390 in the shelf through which the screw 386 extends, the rib and slot being curved about an axis coinciding substantially with the location of the gripper. This construction permits the gripper to be turned to adjust its jaws angularly in proper relation to the edge of the last bottom in operating on shoes of different styles and sizes. After the gripper has been properly adjusted in this respect the screw 386 is turned to hold it securely in adjusted position.

A controlling device substantially like that above described is provided for controlling and adjusting each of the front and rear side grippers 68 and 70 and each of the corner toe grippers 66, each front side gripper being connected to a rock shaft 392 (Fig. 2) similar to the shaft 376 for the rear side gripper, and each corner toe gripper being connected to a similar rock shaft 394. On the outer end of each rock shaft 394 there is secured a collar 396 provided with a lug 398 which is engaged on its lower side by a spring plunger 400 and on its upper side by a stop screw 402 threaded in the bracket 56. It will thus be seen that each spring plunger 400 tends, by turning the corresponding rock shaft 394, to swing the corner toe gripper rearwardly toward the heel end of the shoe and that the stop screw 402 limits such swinging movement, this screw being accordingly adjustable to vary the position of this gripper lengthwise of the shoe relatively to the central toe gripper in accordance with the contours of differently shaped lasts.

The two rock shafts 376 and 392 associated respectively with the rear side gripper and the front side gripper at each side of the machine are controlled by means through which foredrawing movements toward the toe end of the last are imparted to these grippers while they are being moved to pull the upper heightwise of the last. By reference to Fig. 2 it will be seen that there is fast on the rock shaft 376 a lever arm 404 and fast on the rock shaft 392 another lever arm 406. These two arms are connected by a rod 408 which is threaded in a member 410 swiveled in a bearing in the arm 406, the rod being mounted to turn in a member 412 pivoted on a block that lies in a curved slot 414 in the arm 404. The member 412 is engaged by two collars 416 and 418 that are fast on the rod 408, the collar 418 having a knurled head for turning the rod. Through these connections swinging movement is imparted to the arm 404 from the arm 406, the latter being operated as hereinafter described to impart the foredrawing movements to the two grippers. It will be evident that the extent or rate of the movement of the arm 404 relative to that of the arm 406 depends upon the position of the member 412 along the slot 414, the member 412 being adjustable along the slot to vary the effective length of the arm 404 and thereby to vary the amount of foredrawing movement imparted to the rear side gripper relatively to that imparted to the front side gripper, so as to produce the best results under different conditions. A nut 419 (Fig. 1) is provided for fastening the member 412 in adjusted position. It will further be evident that by turning the rod 408 the rear side gripper can be adjusted lengthwise of the edge of the shoe bottom relatively to the front side gripper. After any such adjustment has been made the rod 408 is held from turning by a lock nut 420 in engagement with the member 410.

For operating the lever arm 406 there are provided connections between this arm and an arm 422 fast on a rock shaft 424 mounted in the frame of the machine. These connections comprise a rod 426 threaded in a member 428 which is swiveled in the arm 406 and extending through openings provided in lugs 430 and 432 formed on a bar 434 pivotally connected to the arm 422. The openings in these lugs are of greater diameter than the rod 426, and within these openings are thimbles 436 and 438 slidingly mounted on the rod and having enlarged heads or flanges bearing respectively on the inner sides of the two lugs 430 and 432. The thimble 436 engages a collar 440 fast on the rod 426, and the thimble 438 engages a sleeve 442 also fast on the rod and provided with a knurled head for turning the rod. Between the heads of the two thimbles 436 and 438 is a compression spring 444. It will thus be seen that when movement in a counterclockwise direction is imparted to the arm 422 the lug 430, acting through the thimble 436, brings pressure to bear on the spring 444, and that through the spring the thimble 438 bearing on the sleeve 442 is thus operated to impart to the rod 426 movement such as to swing the arm 406 in the same direction as the arm 422. In this foredrawing operation the spring 444 may be compressed more or less, depending upon the resistance of the upper, the lug 432 sliding along the thimble 438 when such compression of the spring takes place. It will be evident that by reason of the threaded connection between the rod 426 and the member 428 turning movement of the rod, which may be effected through the knurled head on the sleeve member 442, will serve to swing the arm 406 relatively to the arm 422 and thus to adjust both the front and rear side grippers together lengthwise of the edge of the shoe bottom. A lock nut 446 on the rod 426 serves by engagement with the member 428 to hold the rod from turning after any such adjustment has been made.

To operate the arm 422 there is provided a link 448 connecting the arm to one arm of a lever 450 mounted to rock on the previously mentioned rod 142, the other arm of this lever carrying a roll 454 engaged by a path cam 456 formed in one side of a cam wheel 458 (Figs. 2 and 3) on the cam shaft 164. The link 448 is adjustable along a slot 460 in the lever 450 to vary the effective length of the upper arm of this lever and accordingly to vary the amount of the foredrawing movement imparted to the two side grippers.

The lower end of the arm 406 is connected by a link 462 to a hand lever 464 which is pivotally mounted on the frame at the left-hand side of the machine. By use of this hand lever the operator is accordingly enabled to move the front and rear side grippers lengthwise of the last, either forwardly or rearwardly, while the machine is at rest with the upper held under tension. The connections previously described between the arm 406 and the arm 422 permit such movement in either direction to be imparted manually to the arm 406, since movement of this arm in one direction results in compression of the spring 444 by the thimble 436 sliding in the lug 430, and its movement in the opposite direction results in compression of the spring by the thimble 438 sliding in the lug 432, as will be evident from the foregoing description of these parts.

Figure 2:
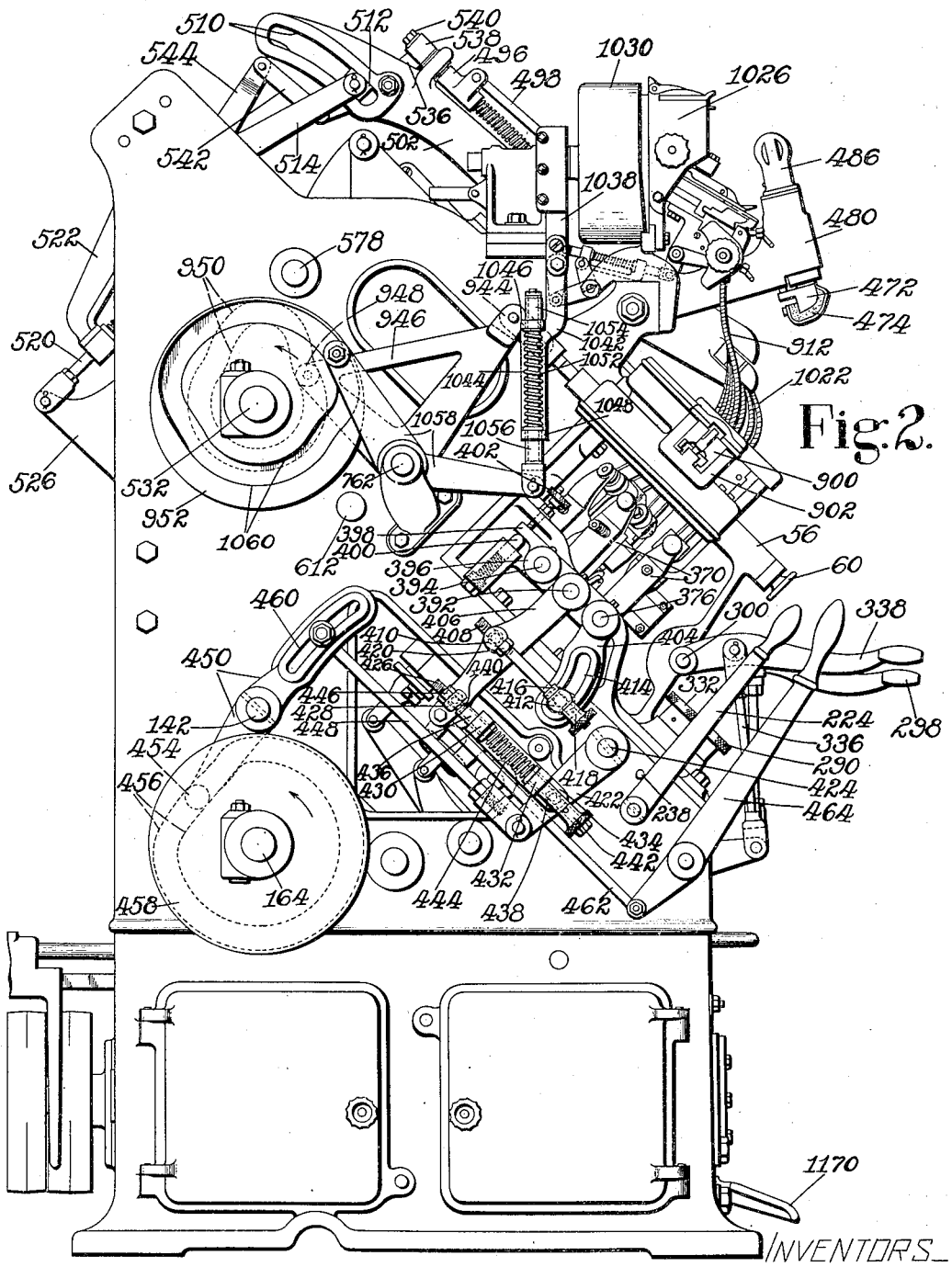
Fig. 2 is a view of the machine in left-hand side elevation.

The foredrawing and gripper-adjusting mechanism above described with reference to Fig. 2 as located at the left-hand side of the machine for controlling the front and rear side grippers at that side of the machine is, for the most part, duplicated at the opposite side of the machine for controlling the right-hand side grippers, and in so far as corresponding parts at the opposite sides of the machine appear on the drawings they are designated by the same reference characters (see especially Fig. 1). The foredrawing mechanisms at the opposite sides of the machine are, however, both operated by the single cam 456, the rock shaft 424 carrying at the right-hand side of the machine an operating arm 422 similar to that at the left-hand side. By reference to Fig. 1 it will be seen that there is a hand lever 464 at each side of the machine, and it will be evident that by use of these hand levers the front and rear side grippers at the opposite sides of the machine may be moved as desired lengthwise of the last to vary the amount of foredraw at either or both sides of the last and for adjusting the upper to position the tip line in proper relation to the last.

The sleeve portion 362 (Fig. 5) of the member 360 which controls the central toe gripper 64 is mounted in a bearing in the frame of the machine and serves to hold this gripper at all times against movement laterally of the shoe. This gripper, however, may swing about its universal joint connection with its shaft 122 in directions lengthwise of the shoe, the sleeve 362 being for this purpose slidable in the bearing in which it is mounted. A pull spring 466 connected at one end to the bracket 56 and at its other end to a pin 468 bearing upon the member 360 tends to pull the gripper outwardly or forwardly with respect to the last and permits the gripper to be swung inwardly by the action of the upper thereon in the upper-pulling operation, thus performing a function similar to that of each of the previously-mentioned springs 382. A screw 470 threaded in the bracket 56 and provided with a conical end in engagement with the outer end of the sleeve 362 cooperates with the spring 466 to determine the normal position of the member 360 and of the central toe gripper, and by turning this screw the member 360 and the gripper may be adjusted lengthwise of the last.

To support the shoe against pressure applied on its bottom face in wiping the toe end of the upper over the insole and in fastening it to the insole, there is provided a shoe holder which engages the shoe on the top of the forepart, comprising a block 472 (Fig. 4) on which is mounted an upper-pressing pad 474. The block 472 is provided with a rod 476 which is threaded in a sleeve member 478 mounted for turning movement in a bearing formed in the forward end of a lever arm 480, this arm being mounted on a rod 482 for downward and upward swinging movements. The sleeve member 478 has on its lower end a flange 484 which prevents it from moving upwardly in the arm 480, and a handle 486 fast on the upper end of the sleeve member prevents it from moving downwardly in the arm. By means of the handle 486, however, the sleeve member 478 may be turned in its bearing in the arm to adjust the rod 476 and the block 472 upwardly or downwardly. A short rod 488 carried by the block 472 extends into a slot in the arm 480, this slot being curved about the axis of the rod 476 and affording provision for a limited amount of turning movement of the rod and the block to permit the pad 474 to adjust itself to the shoe. A spring plunger 490 with a rounded end arranged to extend into shallow recesses in the handle member 486 serves to prevent unintentional turning of the sleeve member 478 and thereby to maintain the block 472 in adjusted position.

Initially the lever arm 480 is held in an upraised position, with the shoe holder well away from the shoe by means of a spring 492 which is mounted on a rod 494 controlled as hereinafter described and acts on a sleeve 496 slidingly mounted on the rod and connected by a link 498 to an arm 500 which is integral with the arm 480. From this position the arm 480 is movable downwardly about the rod 482 against the resistance of the spring 492, the sleeve 496 in this movement sliding along the rod 494 and compressing the spring. Such movement of the arm is effected manually by the operator by use of the handle 486 to carry the shoe holder into shoe-engaging position. The rod 494 is slidingly mounted in bearings in a lever 502 which is also pivoted on the rod 482 and at its forward end carries a latch 504 arranged to engage a plate 506 on the arm 480 to hold this arm in fixed relation to the lever 502 after it has been swung downwardly by the operator as above described. The rod 494 carries a collar 508 which bears on one end of the spring 492, so that the latch 504 is controlled by this spring which tends to move it forwardly but permits it to be pressed back by a portion of the arm 480 in the downward movement of the latter and thereafter impels it forwardly over the plate 506.

It will be understood that as a result of the above-described manual movement of the shoe holder into the position in which it is held by the latch 504 it engages the shoe only with comparatively light pressure. Thereafter in the further power operation of the machine the shoe holder is pressed more firmly upon the shoe by swinging movement of the lever 502, this lever acting on the lever arm 480 through the latch 504. For this purpose there is formed in the rear end of the lever 502 a curved slot 510 in which is slidingly mounted a block 512 pivotally connected to an arm 514 of a bell-crank lever which is pivoted on a rod 516 on the frame of the machine, the other arm 518 of this bell-crank lever being pivotally connected to a rod 520 which extends downwardly through an opening in a bracket 522 on the frame. A spring 524 on the rod 520 tends to impart upward movement to this rod and thus to swing the bell-crank lever 514, 518 in the direction to carry the block 512 rearwardly along the slot 510. By this action of the spring the pressure of the shoe holder on the shoe is increased, since the relation of the curvature of the slot 510 to the axis of the rod 516 is such that the rear end of the lever 502 is raised and its front end lowered by the rearward swinging movement of the arm 514. To permit the above described action of the spring 524, the rod 520 is controlled by an arm 526 to which it is pivotally connected, this arm being mounted for swinging movement on a rod 528 on the frame and carrying a roll (not shown) engaged by a peripheral cam 530 fast on a second cam shaft 532 (Figs. 4 and 34). When the cam 530 arrives at the proper position the spring 524 is rendered effective to press the shoe holder firmly upon the shoe as above described, and later in the cycle the cam acts positively through the rod 520 to move the block 512 forwardly along the slot 510 and thus to relax the pressure of the holder on the shoe. While the arm 514 is operated yieldingly by the spring 524 and accordingly may carry the block 512 to different positions in operating upon shoes of different styles or sizes, the relation of the arm and the block 512 to the curved slot 510 is such that they serve as positive means to secure the shoe holder against upward pressure of the shoe thereon.

After the pressure of the shoe holder 472 on the shoe has been relaxed near the end of the cycle of the machine, as above described, the latch 504 is retracted automatically to release the arm 480 and permit it to be swung upwardly by the spring 492. For this purpose there is pivotally mounted at 534 on the lever 502 a lever 536 which carries on its upper end a block 537 slidingly mounted for upward or downward movement in a slot formed in one side of another block 538 through which the rod 494 extends, the rod being provided on its outer end with a nut 540 against which the block 538 is arranged to bear. Connected by a link 542 to the lower end of the lever 536 is one arm 544 of a bell-crank lever pivotally mounted on the rod 516, the other arm 546 of this lever being connected by a link 548 to one arm 550 of a bell-crank lever mounted on the rod 528. The other arm 552 of the last-mentioned bell-crank lever carries at its outer end a roll 554 (Fig. 35) which is arranged to be engaged by a cam block 556 fast on one side of a cam wheel 558 on the shaft 532. At the proper time in the cycle the block 556 passes beneath the roll 554 and raises the arm 552, as a result of which movement of the arm the block 538 (Fig. 4) pulls the rod 494 rearwardly and thus disconnects the latch 504 from the plate 506, whereupon the arm 480 is swung upwardly by the spring 492. The upward swinging movement of the arm 480 is yieldingly limited by a pivoted cushioning member 560 (Fig. 4) on the lever 502 controlled by a spring plunger 562 and against which a roll (not shown) on the arm 500 is carried.

For working the toe-end portion of the upper into lasted position after the upper has been pulled as hereinbefore described, the machine is provided with a device for wiping the upper heightwise of the toe, including a flexible band 564 (Figs. 12 and 15) mounted and controlled as hereinafter described, and with a device comprising a pair of wipers 566 (Fig. 14), sometimes herein referred to as overwiping wipers, for wiping the marginal portion of the upper inwardly over the insole. The wiping of the upper heightwise of the toe is commonly known as an upwiping operation and is frequently so referred to herein, although in the machine shown the direction of the wiping movement is actually downward. Both these devices are supported on a wiper carrier 568 which serves as a common support therefor and is movable lengthwise of the shoe to carry the different devices toward the toe end of the shoe and thereafter to impart to the wipers 566 their wiping movement lengthwise of the shoe, the wiper carrier 568 being also mounted for swinging movements heightwise of the shoe to cause the band 564 to wipe the upper toward the edge of the insole and later in the cycle to press the wipers 566 firmly up against the overwiped margin of the upper. For this purpose the carrier 568 is pivotally supported near its forward end (Fig. 4) on a swinging link comprising a block 570 and a rod 572 constructed and operated as hereinafter described, and is pivotally supported at its rear end on a pair of arms 574 (Figs. 3 and 4) which project from a sleeve 576 mounted to turn on a rod 578 on the frame. Fast on the sleeve 576 are two arms 580 which carry a roll 582 in engagement with a peripheral cam 584 on the shaft 532. This cam accordingly imparts to the carrier 568 its forward movement toward the shoe. For moving the carrier in the opposite direction there is provided a peripheral cam 586 in engagement with a roll 587 carried by an arm 588 which is fast on the sleeve 576. It will be understood that these two cams are so constructed as to cooperate with each other at all times in determining the position of the carrier 568 with respect to movements lengthwise of the shoe.

The block 570 above referred to as a part of the link that supports the carrier 568 near its forward end is mounted on an eccentric portion 590 (Fig. 14) of a shaft 592 which is mounted in bearings formed in ears that project downwardly from the carrier. At one end the shaft 592 carries a worm gear 594 engaged by a worm 595 formed on a rotatable rod 596 in the carrier 568 for turning the eccentric 590 to adjust the carrier upward or downward relatively to the means that supports it. The block 570 is provided with a recess into which the reduced upper end of the rod 572 projects, and the block has fast therein a pin 598 (Fig. 35) which projects through a slot 600 formed in the rod. Mounted in the recess in the block 570 is a spring 602 which bears at its upper end on a shoulder on the block and at its lower end on a collar 604 which is fast on the rod 572 and has a reduced portion extending into the recess in the block. It will be evident that this construction permits limited relative movement of the rod and the block in directions lengthwise of the rod. At its lower end the rod 572 extends through an opening in a pin 606 which is swiveled on an arm 608 fast on a sleeve 610 mounted to turn on a rod 612 on the frame. Between the pin 606 and a nut on the rod 572 is a spring 614 through which upward movement may be imparted yieldingly to the rod by the action of the arm 608, the rod at its lower end having a head 616 arranged to be engaged by the pin 606 to move the rod downwardly. For operating the arm 608 to impart upward movement to the rod 572 there is fast on the sleeve 610 an arm 618 provided with a roll 620 in engagement with a peripheral cam 622 on the shaft 532. For moving the arm 608 in the opposite direction there is fast on the sleeve 610 an arm 624 provided with a roll (not shown) in engagement with the periphery of the previously-mentioned cam wheel 558. By the operation of the arm 624 downward swinging movement is imparted positively to the carrier 568 to cause the band 564 to wipe the upper toward the edge of the insole, the pin 598 at that time being seated at the upper end of the slot 600. Thereafter, as the wipers 566 are operated to wipe the upper inwardly over the insole, the spring 602, which is a comparatively light spring, may yield, thus permitting such downward movement of the carrier 568 as may be effected by the wedging action of the upper materials on the wipers, the arm 608 being at that time held stationary. Substantially at the end of the overwiping operation, the arm 618 is operated by its cam to swing the arm 608 in an upward direction, whereby comparatively heavy force is applied through the spring 614 to increase the upward pressure of the wipers on the marginal portion of the upper. It will be understood that the cams 558 and 622 are shaped to cooperate with each other at all times in controlling the two arms 624 and 618.

The band 564 for wiping the upper heightwise of the toe is preferably made of leather and midway between its opposite ends is fastened by a screw to a presser or plunger 626 (Figs. 15 and 17) movably mounted in a slide 628 on the carrier 568. A spring 630 in this slide tends to move the plunger forwardly, the limit of such movement being determined by a nut 632 on the rear end of the plunger. At each side of the central presser or plunger 626 the band 564 is engaged by a plurality of other pressers or plungers 634 which extend over its upper edge to prevent its upward displacement, as shown in Fig. 18, but are not fastened to it. The plungers 634 are backed up by springs 636 and are slidingly mounted in members or holders 638 which are movable in curved recesses formed in the slide 628. A thin plate 639 secured to the lower face of the slide 628 assists in supporting the several plungers and the holders 638. By tongue and groove connections 640 between the holders 638 and the slide 628 the holders are guided for movements about an axis located in the vicinity of the forward end of the central plunger 626 to close the band 564 about the toe. Such band closing movements are imparted to the holders 638 through rods 642 which are pivotally connected at their forward ends to the holders and are pivotally connected at their rear ends to members 644 which are swiveled in the upper ends of lever arms 646 (Figs. 13 and 16), these arms being mounted to swing on a rock shaft 648 which is mounted to turn in bearings formed in arms 650 projecting downwardly from the slide 628. Integral with the arms 646 are downwardly extending arms 652, and fast on the rock shaft 648 adjacent to the arms 652 are arms 654. Extending loosely through each pair of arms 652, 654 is a rod 656 provided with a head 658 in engagement with the arm 654, and mounted on this rod between the arm 652 and a nut 660 adjustably threaded on the rod is a spring 662. Also fast on the rock shaft 648 is an arm 664 pivotally connected to the head of a rod 666 which extends downwardly through a block 668 swiveled on an arm 670, this arm projecting from a sleeve 672 which is mounted to turn on a rod 674 on the frame. Between the block 668 and the head of the rod 666 is a spring 676, and on the lower end of the rod is a nut 678 arranged to engage the lower face of the block 668. Also fast on the sleeve 672 is an arm 680 which carries a roll (not shown) engaged by a path cam 682 formed in one side of a cam wheel 684 on the shaft 532. To impart to the rods 642 their forward movements to close the band 564 about the toe the arm 670 is swung in a downward direction by the cam, the block 668 acting positively on the nut 678 on the rod 666 to swing the arm 664 in a clockwise direction (Fig. 16). The two arms 654 are thus operated to pull on the rods 656 and through the springs 662 to impart movements also in clockwise directions to the arms 652 and 646. It will be understood that as the band 564 is thus closed about the toe the several spring plungers 634 will yield more or less in conformity to the contour of the toe, and either or both of the springs 662 may also yield if the resistance encountered is great enough. In the return of the parts to starting positions in response to reverse movement of the arm 670 the spring 676 may yield if abnormal resistance is encountered so as to avoid breakage of any part of the mechanism. Since the band 564 is not fastened to the plungers 634, there is provision for relative sliding movement of the band and the plungers in directions lengthwise of the band so that the parts may properly adjust themselves to the shoe.

In addition to the means above described for closing the band 564 about the toe, the machine is further provided with means for forcing the band as a whole in a direction lengthwise of the shoe to insure firm pressure thereof upon the upper about the end of the toe. For this purpose the slide 628 is mounted for movements lengthwise of the shoe in the carrier 568 and is connected at its rear end by a link 686 to a lever arm 688 which is fast on a sleeve 690 mounted to turn on a rod 692 supported by the carrier 568. Also fast on the sleeve 690 is an arm 694. Mounted to swing about the rod 692 is an arm 696 integral with which is another arm 698 adjacent to the arm 694. Extending loosely through the two arms 694 and 698 is a rod 700 having a head 702 in engagement with the arm 698, and mounted on this rod between the arm 694 and a nut 704 adjustably threaded on the rod is a spring 706. The arm 696 is connected by a link 708 to an arm 710 fast on a sleeve 712 which is mounted to turn on the previously-mentioned rod 578, and projecting from this sleeve is also an arm 714 provided with a roll 716 engaged by a path cam 718 formed in one side of the cam wheel 684. Forward movement of the slide 628 to force the band 564 against the shoe is effected by movement of the arm 710 in a clockwise direction, whereby the arms 696 and 698 are also moved in a clockwise direction and the arm 688 is operated yieldingly through the spring 706. It will be understood that the movement of the slide 628 which advances the band 564 lengthwise of the shoe and the movements of the bars 642 which close the band about the toe are properly coordinated, the different cams which effect these movements being suitably shaped for this purpose, and also that these cams are suitably shaped to compensate for movements of the carrier 568 effected by the means hereinbefore described.

In order to prevent possible damage to the machine when operated without any shoe on the shoe support, there is provided means that may be used to lock the holders 638 to the slide 628 so as to prevent movements of these holders to close the opposite side portions of the band 564 toward each other. For this purpose there are mounted in openings in the slide 628 bushings 720, one of which is shown in Fig. 18a, and slidingly mounted in each bushing is a plunger 722 which is arranged to aline with a hole 724 in the corresponding holder 638 when the holder is in its initial position. A spring 726 in the bushing tends to force the plunger downwardly. To hold the plunger 722 normally in an upraised position in which it does not interfere with the movement of the holder 638, as illustrated in Fig. 18a, there is fast on a stem that projects upwardly from the plunger a head 728 which carries a pin 730 arranged to rest in a depression in the upper end of the bushing 720. When it is desired to lock the holder 638 against movement the operator turns the head 728 until the pin 730 is in position to enter a hole 732 in the bushing, thus permitting the spring 726 to force the plunger downwardly into the hole 724. If the machine is then operated the springs 662 will yield without operating the holders 638.

The wipers 566 for wiping the marginal portion of the upper inwardly over the insole are supported under the slide 628 on a plate 734 (Fig. 14) which is fast on the carrier 568. This plate is provided with a curved recess in which are mounted two wiper holders 736 on which the wipers 566 are fastened, and these holders are further guided for wiper-closing movements by curved tongue and groove connections 738 with the plate 734. The wipers are provided with a plurality of holes 740 through which upper-fastening tacks are driven as hereinafter described, the central hole of the series, shown at a, (see also Fig. 14a), being located in an offset portion of one of the wipers at the axis of closing movements of the wipers determined by the guiding means. Advancing movement of the wipers 566 lengthwise of the shoe to wipe the upper inwardly at the end of the toe is effected as hereinbefore described by the movement of the carrier 568. For closing these wipers during their advancing movement there are provided rack bars 742 mounted in guideways in the plate 734 and engaging teeth formed on the wiper holders 736. For operating these rack bars there are provided arms 744 (Figs. 14 and 31) which are fast on a rock shaft 746 supported by the plate 734 and are provided at their upper ends with gear sectors 748 in engagement with teeth on the rack bars. A spring 750 connected at one end to the carrier 568 and at its other end to an arm 752 fast on the shaft 746 tends to retract the rack bars 742 and thus to hold the wipers in their open positions, the limit of their opening movements being determined by a stop screw 753 which is mounted in an arm integral with the arm 752 and is arranged to engage a projection on the carrier 568. Also fast on the shaft 746 is a depending arm 754 on the lower end of which is swiveled a block 756 in sliding engagement with a rod 758, this rod being pivotally connected at one end to an arm 760 which is pivotally mounted on a rod 762 on the frame. In fixed relation to the arm 760 is an arm 764 which carries a roll 766 engaged by a path cam 768 formed in one side of a cam wheel 770 on the cam shaft 532. On the rod 758 are nuts 772 one of which is arranged to engage at times one side of the block 756. It will be evident that there is thus provided a lost-motion connection between the arm 754 and the arm 760, permitting the carrier 568 and the parts supported thereon to be advanced toward the shoe as hereinbefore described without any closing movements of the wipers 566, the cam 768 being so formed as to contribute to this result by swinging the arm 760 in a clockwise direction. To close the wipers at the required time this arm is swung by the cam in the opposite direction, and imparts to the arm 754 its operative movement through the rod 758 and the nuts 772. It will be evident that through these connections the closing movements are imparted to the wipers positively and that the limits of their closing movements may be varied by adjusting the nuts 772.

The upper-fastening mechanism, whereby tacks are driven through the holes 740 in the wipers, comprises a tack block or holder 774 (Fig. 5) which is of substantially U-shape so as to position the tacks in proper relation to the edge of the shoe bottom and extends partly around the shoe support plate 50. This tack block is provided with a plurality of parallel passages 776 (Figs. 14a and 22) corresponding in number and arrangement to the holes 740 in the wipers so as to aline with these holes when the wipers are at the limit of their advancing and closing movements. Projecting at all times upwardly into these passages are a plurality of parallel tack drivers 778 which are carried by a plate 780 secured to another plate 782. A downwardly extending annular portion of the plate 782 is fastened detachably by a spring-pressed pin 784 in a recess formed in the upper end of a sleeve member 786, this sleeve member being movable lengthwise in another sleeve member 788 and a key 790 being provided to prevent relative turning movement of these two members. The tack block 774 is provided with a downwardly extending stem 792 which projects through the plates 780 and 782 and into the sleeve member 786. Farther downward in the member 786 is a rod 794 upon the upper end of which rests the head of a screw 796 adjustably threaded in the lower end of the stem 792. Extending downwardly through the stem 792 and the screw 796 and threaded at its lower end in the rod 794 is a screw 798 the head of which is in clamping engagement with the tack block 774. By removing the screw 798 the block 774 is accordingly released so that it may be readily removed to permit the substitution of a block of different contour. It will be evident that by adjustment of the screw 796 in setting up the parts of the machine the height of the tack block 774 can be accurately determined.

The tack block 774 is moved upwardly into engagement with the insole after the upper-pulling operation, as illustrated in Fig. 38, so as to act as a holddown to press the marginal portion of the insole close to the bottom of the last all around the toe, and it is held in engagement with the insole during the upwiping operation and until the wipers 566 begin to wipe the upper inwardly over the edge of the insole. It is then moved downwardly to permit the marginal portion of the upper to be wiped farther inwardly over the insole by the wipers 566, after which it is moved upwardly into engagement with the wipers preparatory to the tack-driving operation. For imparting to the tack block these upward and downward movements the rod 794 is connected at its lower end by a link 800 (Figs. 5 and 29) to a lever 802 pivotally mounted on a rod 804 on the bracket 56, this lever being yieldingly connected to another lever 806 pivoted on the rod 278 and provided with a roll 810 in engagement with a path cam 812 formed in one side of a cam wheel 814 on the cam shaft 164. The yielding connection between the levers 802 and 806 comprises a light spring 816 and a heavier spring 818 arranged within a tubular casing 820 the lower end of which is fastened to a member 822 pivotally mounted on the lever 806. Through a head 823 fast in the upper end of the casing 820 extends a rod 824 pivotally connected to the lever 802. A nut 826 on the lower end of this rod supports a disk 828 which serves as a seat for the lower ends of both springs 816 and 818. The upper end of the spring 816 bears on an annular portion 830 of the head 823, and the upper end of the spring 818 bears on a disk 832 which is normally seated against a shoulder provided by an enlarged portion of the rod 824, the spring thus being held under compression. It will thus be seen that when the lever 806 is moved in a clockwise direction it pulls the member 820 and the head 823 downwardly, the head acting first through the light spring 816 to impart downward movement to the rod 824 and thus to operate the lever 802 to move the tack block 774 upwardly. Thereafter the head 823 may come into engagement with the disk 832 so as to act on the lever 802 through the heavy spring 818 as well as through the light spring. When the tack block is in engagement with the insole only the light spring is compressed, and when it is thereafter engaged with the wipers preparatory to the tack-driving operation both springs are compressed to assist in pressing the wipers forcibly up against the shoe bottom.

The operation of the tack drivers 778 to drive the tacks is effected by upward movement of the sleeve member 786. At its lower end this sleeve member has fast thereon a collar 834 (Figs. 5 and 33) connected by links 836 to the forked end of a lever 838 mounted on a rod 840 on the bracket 56. Yieldingly connected to this lever is a lever 842 mounted on the previously-mentioned rod 278. The yielding connection between these two levers comprises a spring 844 which is mounted in a tubular casing 846 having fastened to its upper and lower ends respectively heads 848 and 850, the head 850 being pivotally connected to the lever 842. A rod 852 pivotally connected to the lever 838 has a shoulder 854 arranged normally to bear on the head 848 and has a reduced lower portion extending downwardly through the spring 844 and provided on its lower end with a nut 856 on which rests a washer 858 supporting the lower end of the spring. It will thus be seen that when the lever 842 is moved in a clockwise direction the head 848 tends to compress the spring 844 through which movement is imparted to the rod 852. This spring accordingly affords provision for yield in the operating connections to avoid danger of breaking any part under abnormal conditions. while at the same time being of sufficient strength to insure that the drivers will drive the tacks firmly into the shoe bottom. The lever 842 is operated by a cam wheel 860 on the shaft 164 the periphery of which is in engagement with a roll 862 on the lever to operate it. To impart return movement to the tack drivers there is provided in one side of the cam wheel 860 a path cam 864 which engages a roll 866 carried by an arm 868 projecting from the lever 842.

The machine is further provided with means whereby the tack block 774, accompanied by the drivers 778, is moved in directions lengthwise of the shoe at certain times in the cycle of operations. More particularly, when the tack block is moved downwardly away from the insole after serving as a holddown for the insole in the manner described, it receives a forward movement, i. e., in the direction in which the toe of the shoe points, before it is moved upwardly into engagement with the wipers as above described, and after engaging the wipers it is moved reversely along the wipers to bring the tack drivers into alinement with the holes in the wipers. Insurance is thus afforded that no portion of the margin of the upper will be caught between the tack block and the wipers. Still further rearward movement of the tack block is thereafter effected for tack-straightening purposes, as more particularly hereinafter explained. To permit these movements there is provided in the bracket 56 a slot 870 (Figs. 5 and 7) through which the rod 794 and the sleeve 786 extend, the sleeve 788 resting at its lower end upon the portion of the bracket in which the slot is formed. Secured on the opposite sides of the sleeve 788 are plates 872 one of which is shown in Fig. 34, having projections 874 slidingly mounted in bearings in the bracket 56 to guide the sleeve in its movements lengthwise of the shoe. Arms 876 projecting from the sleeve 788 are connected by a link 878 to one arm of a bell-crank lever 880 mounted on the rod 762 and provided with a slot 882 to permit the link to be connected at different distances from the axis of the lever, the other arm of the bell-crank lever being connected to a forked member 884 which is guided by a block 886 mounted on a bushing on the shaft 532. The member 884 carries a roll 888 engaged by a path cam 890 formed in one side of the previously-mentioned cam wheel 530, this cam being shaped to impart to the tack block and the drivers movements lengthwise of the shoe at the proper times in the cycle. It will be understood that the previously described links 800 and 836 are so arranged as to permit these movements to take place.

It will be evident that since the tack block 774 and the drivers are inclined as illustrated, the tacks resting head downward upon the ends of the drivers will all be inclined in the same direction relatively to the paths of movement of the drivers and relatively to the driver passages 776, their points resting against the sides of the passages that are nearest the operator's working position, as shown in Figs. 37, 38 and 39. It is desirable, however, to drive the tacks into the shoe in directions substantially parallel to the paths of movement of the drivers, so that they will extend in substantially perpendicular relation to the bottom face of the insole. Accordingly, as hereinbefore suggested, one object in the above described rearward movement of the tack block 774 is to straighten the tacks, i. e., tip them into positions in which they are substantially parallel to the paths of movement of the drivers.

Such movement of the block for tack-straightening purposes is timed to occur just after the points of the tacks as they are being driven have entered the upper materials, as shown in Fig. 40, and coincides with a further rearward movement of the wipers 556 without any closing movements thereof. In this manner the tacks are tipped to positions such that as the tack-driving operation continues they are driven in directions substantially perpendicular to the bottom face of the insole, as illustrated in Fig. 41. Time for such tack-straightening in the course of the tack-driving operation is afforded because of the fact that the operative movement of the tack drivers, effected as hereinbefore described, is somewhat gradual as distinguished from an instantaneous movement.

It is, of course, important that in the tack-driving operation the several tack drivers 778 and the passages 776 shall be in proper alinement with the holes 740 in the wipers 566, and to this end the different mechanisms for imparting to the wipers their advancing and closing movements and for imparting to the tack block 774 its movements lengthwise of the shoe are positive in their action. In order still further to insure proper alinement of the drivers and passages with the holes in the wipers, regardless of any backlash that there may be in the operating mechanisms, the machine is provided with means for effecting an interlocking connection between the tack block and the wipers. This means comprises two pins 892 (Figs. 14a and 22) mounted in the tack block and pressed upwardly by springs 894, one of which is shown in Fig. 5, and recesses 896 (Figs. 14 and 14a) formed in the lower faces of the wipers 566 near their forward ends and arranged to receive the pins 892. These pins snap up into the recesses as the tack block is moved along the wipers in the manner hereinbefore described, and in case the wipers may not have been fully closed, because of resistance of the shoe materials, the pins by engagement with cam faces b formed on the wipers within the recesses serve to complete the closing of the wipers, the pins being carried into corners of the recesses between the cam faces b and other faces c at the opposite sides of the recesses from the faces b. With the pins in the positions illustrated in Fig. 14a insurance is afforded that the drivers will properly aline with the holes in the wipers. It is after this interlocking connection between the tack block and the wipers has been effected that the tack-driving and tack-straightening operations take place.

For delivering tacks to the tack block 774 there are provided tack-transferring devices which are movable respectively from opposite sides of the tack block into positions over the block, each of these devices carrying a portion only of the total number of tacks that are driven in each cycle of the machine. The tack-transferring device at the left-hand side of the tack block, which carries the tacks that are to be driven around the end of the toe, comprises a transfer block 898 (Figs. 23, 24, 25 and 27) carried by a transfer slide 900 which is guided in a casing 902 on the frame of the machine. The block 898 is detachably fastened to the slide 900 by a pin 904 mounted to turn in the slide and provided with a flattened portion, shown in Fig. 27, which is arranged to extend through an opening formed in a tongue 906 on the block. In this tongue there is a slot 908 which permits the block 898 to be detached from the slide when the pin 904 has been turned a quarter revolution from the position in which it is shown in Fig. 27. The block 898 is provided with a plurality of tack passages 910 the lower ends of which are arranged to be positioned over the corresponding passages 776 in the tack block 774 when the block 898 is in tack-delivering position, as illustrated in Fig. 27. The block 898 receives its tacks from tack tubes 912 (Figs. 1 and 24) into which tacks are delivered by mechanism hereinafter described, the lower ends of these tubes being seated in openings formed in a plate 914 which is fast on the casing 902. It will be understood that these openings are over the passages 910 when the slide 900 is in its retracted position, as illustrated in Fig. 24. By mechanism hereinafter described the slide 900 is moved yieldingly in opposite directions, and to limit its movement toward tack-delivering position, and thus to insure a proper relation between the passages 910 and the passages 776, there is provided a bar 916 which is fast on the casing 902 and extends over the top of the slide 900, this bar having thereon a projection 918 (Fig. 22) positioned in a slot in the slide 900 and arranged to engage a block 920 on the slide to limit the movement of the latter. Movement of the slide in the opposite direction is limited by engagement of a block 922 thereon with a projection 924 on the bar 916.

On the rear face of the slide 900 are rack teeth 926 engaged by a pinion 928 (Fig. 23) which is mounted in a recess in the casing 902, and connected to this pinion is a smaller pinion 930 in engagement with rack teeth formed on a slide 932 mounted in the casing at right angles to the slide 900. Within the slide 932 is a spring 934 mounted on a rod 936 and in engagement at its opposite ends with flanges, one of which is shown at 938, formed on sleeve members 940 and 942 that are confined on the rod and extend through bearings in the slide 932, the flanges 936 normally engaging shoulders at the opposite ends of the slide. It will be understood that the sleeve members 940 and 942 may move lengthwise in their bearings in the slide 932 and that the rod 936 may move relatively to either one of them in a lengthwise direction. It will thus be seen that movement of the rod 938 in either direction causes one or the other of the sleeve members to act on the spring 934 and through the spring to move the slide 932 in the same direction. The rod 938 is connected by a link 944 (Figs. 2, 22 and 32) to a triangular bell-crank lever 946 fulcrumed on the rod 762 and carrying a roll 948 engaged by a path cam 950 formed in one side of a cam wheel 952 on the cam shaft 532. Through the connections described this cam acts to impart to the slide 900 its tack-transferring movement and its retractive movement.

To support the tacks in the passages 910 of the transfer block 898 there is provided a thin plate or shutter 954 arranged to lie against the lower face of the block, this plate being secured at one side and one end to a slide 956 (Fig. 26) which is mounted to move in guideways formed in the slide 900 (Fig. 28). A spring 958 connected at one end to a pin 960 on the slide 956 and at its other end to a pin 962 on the slide 900 tends to move the slide 956 toward the left to withdraw the plate 954 from under the passages 910. To prevent such movement until the proper time there is pivotally mounted on the outer end portion of the slide 900 a latch 964 arranged to engage a plate 966 on the outer end of the slide 956, this latch being held by a spring 968 in operative position. Near the end of the tack-transferring movement of the slide 900, when the passages 910 are substantially in positions over the passages 776, a finger 970 on the latch 964 engages the previously-mentioned bar 916, whereupon the latch is lifted and releases the slide 956. The spring 958 then moves this slide to withdraw the plate 954 and permit the tacks to be dropped into the tack block 774, this movement of the slide being limited by engagement of a stop 972 thereon (Fig. 23) with a stop 974 on the slide 900. In the return of the parts the plate 966 on the slide 956 is carried into engagement with a stop 976 (Fig. 24) on the casing 902 to stop the return movement of the slide 956 while the slide 900 continues its movement to carry the latch 964 again into position to hold the slide 956.

The thin plate 954, as previously stated, is fastened only at one side and one end to the slide 956. To insure against any sagging of other portions of the plate such as might cause its edge to abut against the side of the tack block 774 in the tack-transferring movement of the slide 900, there is further provided a bar 978 arranged to lie under the front edge portion of the plate 954 and thus to support the plate. This bar is mounted in a slideway in the slide 956 (Fig. 25) and has mounted in a recess therein a curved spring plate 980 which is arranged to engage the slide 956 frictionally and thus to prevent uncontrolled relative movement between the bar and the slide. As the transfer slide 900 is moved toward tack-delivering position the end of the bar 978 engages the tack block 774 just as the thin plate 954 starts to move over the upper face of the tack block, whereupon the bar is held stationary as the transfer slide continues its movement. In the return of the parts a pin 982 on the bar 978 is carried into engagement with a pin 984 in the casing 902, thereby limiting the return movement of the bar while the slide 956 continues its movement to return the plate 954 into the initial relation to the bar.

The tack-transferring mechanism at the right-hand side of the machine is generally similar to that described at the left-hand side. This mechanism includes a transfer block 986 (Fig. 23) having tack passages 988 therein for delivering to the tack block 774 the tacks that are to be driven at the sides of the shoe bottom at the rear of the tacks delivered by the block 898. The block 986 is detachably secured to a slide 990 mounted in a casing 992, and for supporting the tacks in the transfer block there is provided a thin plate 994 carried by a slide 996, the latter being controlled by a spring 998 and a latch 1000 in the same manner as the corresponding parts at the left-hand side of the machine. There is also a supporting bar 1002 arranged to operate in the same manner as the bar 978 and similarly controlled. The slide 990 is operated by a pinion 1004 through a pinion 1006 which is operated by a slide 1008, this slide being yieldably movable in opposite directions through the action of a spring 1010 and a rod 1012 in the same manner as corresponding parts at the left-hand side of the machine. The rod 1012 is connected by a link 1014 (Fig. 22) to a triangular bell-crank lever 1016, similar to the lever 946, provided with a roll engaged by a path cam 1018 formed in one side of a cam wheel 1020 on the cam shaft 532, this cam wheel having gear teeth on its periphery for a purpose hereinafter explained. The transfer block 986 receives its tacks from tack tubes 1022 (Fig. 1) the lower ends of which are mounted in openings in a plate 1024 on the casing 992. It will be understood that the tack transfer slides 900 and 990 are moved simultaneously into tack-delivering positions and are arranged side by side when they are over the tack block 774. To clear the pins 892 that project upwardly from the tack block there is a slot (not shown) in the lower face of the block 986.

For delivering tacks to the different groups of tack tubes 912 and 1022 there are provided tack supplying mechanisms 1026 and 1028 (Fig. 1) located respectively at the opposite sides of the machine. Each of these mechanisms is, for the most part, of well-known construction, the characteristic features of which are similar to the disclosure of Letters Patent No. 663,777, granted on December 11, 1900 upon an application of R. F. McFeely, with improvements shown in other Letters Patent, including No. 1,002,422, granted on September 5, 1911 upon an application of said McFeely. The mechanism at the left-hand side of the machine comprises an oscillatory tack hopper 1030 (Fig. 19) from which tacks are delivered to a plurality of raceways formed in a raceway block 1032. From the lower ends of these raceways the tacks are separated and dropped by a separator 1034, the tack hopper 1032 being mounted on a shaft 1036 by which the separator also is operated, as in the well-known prior construction. It will be understood that by turning movement of the shaft 1036 in one direction the separator is moved into position to receive the lowermost tacks in the raceways and that by movement of the shaft in the opposite direction the separator is operated to deliver the tacks. The shaft is turned in both directions by movements of a rack bar 1038 connected to a pinion on the shaft by a rocking member 1040 (Fig. 21). The rack bar 1038 is slidingly mounted in a bracket on the frame and is operated by a bar 1042 to which it is pivotally connected at its lower end. Upward and downward movements are imparted yieldingly to the bar 1042 through a spring 1044 which is mounted between two lugs 1046 and 1048 on the bar (Fig. 2). Extending through the spring and the lugs is a rod 1052 on the opposite ends of which are confined sleeves 1054 and 1056 slidingly mounted in the lugs and having flanges normally engaging the inner faces of the lugs and against which the spring bears. It will thus be seen that by movement in either direction the rod 1052 acts through the spring 1044 to move the bar 1042 in the same direction. At its lower end the rod 1052 is pivotally connected to one arm of a lever 1058 which is pivotally mounted on the rod 762, the other arm of this lever being provided with a roll (not shown) engaged by a path cam 1060 formed in one side of the previously-mentioned cam wheel 952. At the right-hand side of the machine the corresponding tack hopper 1062 (Fig. 20) is operated through connections substantially like those illustrated in Fig. 21 by a rack bar 1064 connected to an operating bar 1066, this bar being operated yieldingly through mechanism substantially like that above described for operating the bar 1042, including a lever 1070 (Fig. 3) receiving its movements from a path cam 1068 (Fig. 22) formed in one side of the cam and gear wheel 1020. In order that both tack hoppers may be turned simultaneously in the same direction the arrangement is such that the different rack bars 1038 and 1064, together with their operating bars 1042 and 1066, are moved simultaneously in opposite directions.

The tacks are, of course, delivered by each separator 1034 point downward. Since they are to be driven upwardly into the shoe bottom, there is associated with each of the tack-supplying mechanisms 1026 and 1028 means for inverting the tacks and for delivering them head downward into the tubes 912 or 1022. The tack-inverting mechanism at the left-hand side of the machine (Figs. 19 and 19a) comprises an oscillatory inverter 1072 mounted in a bearing formed in a cylindrical sleeve 1074 which is detachably mounted under the separator 1034 and is provided with a plurality of tack passages, one of which is shown at 1076, for receiving the tacks delivered by the separator into passages 1077 that aline with the passages 1076. The inverter 1072 is provided with a plurality of tack pockets, one of which is shown at 1078, which in one position of the inverter are arranged to aline with the passages 1076 and in another position thereof are arranged to aline with passages 1079 in the sleeve 1074 with which the tack tubes 912 communicate. Connected to the inverter 1072 is a pinion 1080 engaged by a gear sector 1082 which is formed on one arm of a bell-crank lever 1084 fast on a rock shaft 1086 mounted on a bracket 1088, the other arm of this bell-crank lever being pivotally connected to a rod 1090. This rod extends through lugs 1092 and 1094 formed on a bar 1096 and also through a spring 1098 which is mounted between these lugs. Confined on the rod 1090 are sleeves 1100 and 1102 which extend through bearings in the lugs 1092 and 1094 and have flanges engaged by the ends of the spring 1098, this mechanism being substantially like that above described for operating the bar 1042. It will thus be seen that by movements of the bar 1096 in opposite directions corresponding movements are imparted yieldingly in the same directions to the rod 1090 and thence to the inverter 1072. Means not shown is provided for limiting movements of the inverter to insure proper alinement of the tack pockets 1078 with the passages 1076 and 1079. The bar 1096 is pivotally supported on one arm of a bell-crank lever 1104 fast on a rock shaft 1106 which is mounted on a bracket on the frame, the other arm of this lever being connected by a link 1108 to the bar 1042 which accordingly operates the inverter simultaneously with the tack hopper and separator. At the right-hand side of the machine there is a similar inverter 1110 (Fig. 20) operated by mechanism substantially like that described for operating the inverter at the left-hand side, this mechanism including a bell-crank lever 1112, a rod 1114, a spring 1116, a bar 1118 and a bell-crank lever 1120. This bell-crank lever is connected by a link 1122 to the bar 1066 for operating the tack hopper at that side of the machine. It will be noted that the bell-crank 1120 and the link 1122 at the right-hand side of the machine are somewhat differently arranged than the corresponding parts at the left-hand side, so that movements in the same directions will be imparted simultaneously to the two tack inverters notwithstanding the fact that the bars 1042 and 1066 move respectively in opposite directions as hereinbefore described.

The two cam shafts 164 and 532 are connected to move simultaneously in the same direction by the previously-mentioned gear wheel 1020 (Fig. 3) on the shaft 532, an idle gear 1124, and a gear wheel 1126 on the shaft 164. The gear wheel 1126 is engaged and operated by a pinion 1128 fast on a shaft 1130 which carries a worm gear 1132 operated by a worm 1134 fast on a shaft 1136 (Fig. 36). The shaft 1136 is operated through a clutch member 1140 which is arranged to engage either a cooperating clutch member 1142, operated as hereinafter described, or a stationary brake member 1144. The clutch member 1140, which may be termed the driven member of the clutch, is slidingly mounted for movements lengthwise of the shaft 1136 and is connected to the shaft by a bar 1146 which extends through a slot in the shaft. A spring 1148 tends to move the clutch member 1140 into engagement with the driving member 1142 to cause the shaft 1136 to be driven. For further controlling the member 1140 there is provided a lever 1150 (Fig. 4) pivoted at 1152 on a bracket projecting from the brake member 1144 and having a forked upper end connected to a groove in the hub of the member 1140. Integral with the lever 1150 is a rearwardly projecting arm 1154 on which is a plate 1156 arranged to be engaged on its upper face by a plate 1158 carried by a bar 1160 which is pivotally supported at its upper end on a controlling lever 1162 pivoted at 1164 on the member 1144. The lever 1162 is yieldingly supported by a spring 1166 which tends to swing it upwardly. Another spring 1168 connected to the bar 1160 tends to swing this bar toward the right (Fig. 4) and thus to hold the plate 1158 in position over the plate 1156. When the parts are in these positions the lever 1150 maintains the clutch member 1140 in engagement with the brake member 1144 and out of engagement with the clutch member 1142, against the resistance of the spring 1148.

In order to release the clutch member 1140 to the action of the spring 1148 and thus to start the machine there is provided means for swinging the bar 1160 to the left (Fig. 4) so as to withdraw the plate 1158 from over the plate 1156. This means comprises a treadle 1170 pivoted at 1172 and connected to an upwardly extending arm 1174 which is connected by a rod 1176 to a lever arm 1178. Connected to this arm is a forwardly extending arm 1179 provided with a pin 1180 which normally lies in a recess formed in one end of a short lever 1182 pivoted between its opposite ends on the lower end of the bar 1160, the other end of the lever 1182 being connected by a pull spring 1184 to the arm 1179. It will be understood that depression of the treadle 1170 results in downward movement of the arm 1179, and in this movement the pin 1180 swings the lever 1182 about its connection with the bar 1160 and thereby moves this bar laterally to release the arm 1154 and thereby to start the machine. The pin 1180 then slips off the end of the lever 1182, so that the spring 1168 may swing the bar 1160 back as far as permitted by the plate 1156. Thereafter the lever 1182 rests on a pin 1185 on the arm 1154 ready to be picked up by the pin 1180 when the treadle is released and the pin rises.

To stop the machine at the required time there are provided on the periphery of the previously-mentioned cam wheel 350 three cam projections d, e, f which are arranged to engage a roll 1186 on the lever 1162. By reference to Fig. 4 it will be seen that initially the cam d holds this lever depressed. Immediately upon the starting of the machine this cam moves away from the roll 1186 and thus permits the lever 1162 to be raised by its spring 1166. This brings the plate 1158 into position to snap over the upper face of the plate 1156 in response to the action of the spring 1168. When thereafter the cam e, or later the cam f, depresses the lever 1162 the arm 1154 is swung downwardly to withdraw the clutch member 1140 from engagement with the member 1142 and to move it into engagement with the brake member 1144. It will thus be seen that there is provided automatic means for bringing the machine to a stop three times in each cycle. The cam *e* brings it to a stop after the upper-pulling operation with the grippers holding the upper under tension, and the cam *f* brings it to a stop after the wiping and tack-driving operations have been completed and after the tack-transferring mechanism has been moved into position to deliver tacks to the tack block 774. Thereafter the machine is started again to complete the return of all parts to their initial positions, the machine being brought to a stop in position to receive the next shoe by the cam *d*.

The clutch member 1142 is keyed to a sleeve 1188 (Fig. 36) which is mounted to turn about the shaft 1136 and is supported at its opposite ends on roller bearings 1190 and 1192 which hold it against lengthwise thrust in either direction. The member 1142 is accordingly operated by rotation of this sleeve, and mechanism is provided for turning the sleeve not only in the direction to cause the machine to perform its normal cycle of operations, but also in the reverse direction, if desired, after the machine has been brought to a stop by the cam *e* with the grippers holding the upper under tension, so that any improperly pulled upper may be released by return of the parts of the machine to starting positions and the upper-pulling operation performed over again. The sleeve is turned in the normal direction by a gear wheel 1194 and in the reverse direction by a gear wheel 1196, these gear wheels being so mounted as to permit each of them to turn idly on the sleeve when not in use. Each gear wheel is connected to the sleeve to drive the clutch member 1142 by mechanism hereinafter described. The gear wheel 1194 is engaged and operated by a gear wheel 1198 (Fig. 1) fast on a shaft 1200 which in the machine shown is driven by a belt pulley 1202 (Figs. 3 and 4). For driving the reverse gear wheel 1196 there is fast on the hub of the gear wheel 1194 a pinion 1204 in engagement with an idle pinion 1206 (Fig. 1) which engages a pinion 1208 fast on a sleeve 1210 (Fig. 4) rotatable on a rod 1212 on the frame. Also fast on the sleeve 1210 is another pinion 1214 in engagement with the gear wheel 1196. Through these connections the gear wheel 1196 is arranged to be driven in the opposite direction from the gear wheel 1194. It will be understood that both these gear wheels are driven continuously.

For connecting either the gear wheel 1194 or the reverse gear wheel 1196 to the sleeve 1188 there is provided a secondary clutch including a spool 1216 which is movable lengthwise of the sleeve 1188 but is connected to it by a key 1218 (Fig. 36). This spool carries a plurality of rods 1220, only one of which is shown, these rods having fast on one end thereof a ring 1222 which faces a ring 1224 fast on one side of the gear wheel 1194. The spool 1216 carries a dog 1226 arranged to engage a dog 1228 on the gear wheel 1194 to cause this gear wheel to transmit movement to the spool 1216 and the sleeve 1188. This results when the spool is moved toward the right (Fig. 36). In this movement of the spool the ring 1222 is first pressed against the ring 1224 through springs 1230 which are mounted on the rods 1220 and are engaged at their inner ends by a portion of the spool. By the frictional contact of these rings turning movement of the spool 1216 is accordingly started before the two dogs engage each other, so as to lessen the shock of their impact. At the opposite side of the spool 1216 the rods 1220 carry a ring 1232 arranged to engage a ring 1233 on the gear wheel 1196 when the spool 1216 is moved toward the left and presses on the ring 1232 through springs 1234. There are also two dogs 1235 and 1236 mounted on the gear wheel 1196 and the spool 1216, respectively, and arranged to cooperate in the same manner as the previously-mentioned dogs 1226 and 1228. The spool is normally held in the position illustrated in Figs. 4 and 36 by a spring 1237 acting on a forked lever 1238 which is pivoted on the frame and carries rolls 1240, one of which is shown in Fig. 36, extending into an annular groove in the spool 1216. Under these conditions the clutch member 1142 is driven in the direction to operate the machine normally, and the machine may be started by depression of the treadle 1170.

In order to put the driving mechanism in condition to drive the machine reversely when the treadle 1170 is depressed, the lever arm 1238 is swung to the left (Fig. 4) against the resistance of the spring 1237 to move the spool 1216 into position to connect the reverse gear 1196 to the sleeve 1188. For this purpose there is provided an arm 1242 which is connected to the arm 1238 and has pivoted on its forward end a treadle member 1244 which by means of a lug 1246 in engagement with the lower face of the arm 1242 is normally positioned to serve as a virtual extension of the arm. By reason of the pivotal connection with the arm 1242 the treadle member 1244 may be swung upward to an out of the way position in which it is held by a spring pin 1248 mounted in the arm 1242 and arranged to engage the hub of the member 1244 in a recess formed therein. The construction is further such that the arm 1238 can be swung to the left to put the driving mechanism in condition for reverse movement only at that time in the cycle when the machine has been brought to a stop by the cam *e* with the grippers holding the upper under tension. For this purpose the arm 1238 carries a pin 1250 which extends into a slot 1252 (Figs. 4 and 30) formed in a lever 1254 which is pivotally mounted on the frame. It will be seen that the slot 1252 is so formed as to have an upwardly extending portion, a downwardly extending portion and an intermediate inclined portion. Normally the lever 1254 is so positioned that the pin 1250 is in the upwardly extending portion of the slot, as indicated in Fig. 4, so that the arm 1238 is locked against movement to carry the spool 1216 into position for the reverse drive. The lever 1254 is connected by a link 1256 to one arm of a lever 1258 pivoted on the frame of the machine, the other arm of this lever carrying a roll 1260 in engagement with the periphery of the previously-mentioned cam wheel 162. In this cam wheel there is a depression 1262 which immediately upon the starting of the machine moves to a position opposite the roll 1260 and accordingly permits movement of the lever 1258 in a clockwise direction. The lever 1258 is moved in this manner by a spring 1264 acting on a finger 1266 connected to the lever, and by this movement the lever 1254 is carried to a position in which the inclined portion of the slot 1252 is in line with the pin 1250. The slot 1252, however, is so formed that at this time the lever 1258 is not moved as far by the spring 1264 as would be permitted by the cam depression 1262. When the machine is brought to a stop at the end of the first stage of the cycle the parts are still in these positions, so that the driving mechanism may be set for reverse drive by depression of the treadle member 1244. When this member is depressed the resulting movement of the arm 1238 carries the pin 1250 into alinement with the downwardly extending portion of the slot 1252, whereupon the spring 1264 imparts a further movement to the lever 1258, thereby moving the lever 1254 to a position in which the pin 1250 is located in the downwardly extending portion of the slot 1252. This locks the arm 1238 in the position to which it was moved by depression of the treadle member 1244. The operator may then depress the treadle 1170, whereupon the machine will be driven in the reverse direction until it is stopped in its normal stopping position by the cam $d$. Near the end of this reverse movement the lever 1258 is swung in a counterclockwise direction by the cam wheel 162, thereby lowering that part of the lever 1254 in which the slot 1252 is formed. This permits the spring 1237 to move the arm 1238 and the spool 1216 back to their normal positions, as soon as the pin 1250 is in line with the inclined portion of the slot 1252, and finally results in positioning the parts with the arm 1238 locked in its normal position by the pin.

In the operation of the machine, briefly summarized, the operator mounts a last and shoe on the shoe support pins 52 and positions the margin of the upper materials properly between the jaws of the central toe gripper 64, thereafter depressing the treadle 214 to cause the central toe gripper jaws to close upon the upper. If it is observed after the closing of these jaws that the upper is not properly positioned, the jaws may be opened to release it by use of the hand lever 224. Otherwise the operator next arranges the margin of the upper properly in the corner toe grippers and the side grippers and then starts the machine by depressing the treadle 1170. The machine then runs until it is brought to a stop by the cam $e$ at the end of the first stage of the cycle of operations. In this stage the upper is pulled by the several grippers in the manner hereinbefore described, and the carrier 568 is moved forward to bring the toe-wiping mechanism to a position near the shoe. In this stage of the cycle also some movement is imparted to the tack hoppers 1030 and 1062, and to the tack inverters 1072 and 1110, but not enough to cause the separating of any tacks or the delivery to the tack tubes of tacks previously deposited in the inverters.

While the machine is at rest at the end of the first stage of the cycle the operator may, if the condition of the work renders it desirable, use the hand lever 298 to increase or decrease the force of the pull applied by the three toe grippers and one or both of the hand levers 338 to increase or relax the force of the pull of the side grippers on the upper or to adjust the forepart of the upper transversely of the last. By use of the hand levers 464 the front and rear side grippers at the opposite sides of the last may also be moved lengthwise of the last to adjust the upper with its tip line in proper relation to the last. If before performing any of these manual operations the operator should observe that the upper has been pulled in such an improper manner as to render it desirable to release it and to perform the pulling operation over again, the operator depresses the reversing treadle 1244 and then the starting treadle 1170, whereupon the portions of the machine to which movements were imparted in the first stage of the cycle are moved reversely to their starting positions and the upper is released. The operator may then arrange the margin of the upper in the grippers again and cause the machine to repeat the first stage of the cycle.

Figure 29:
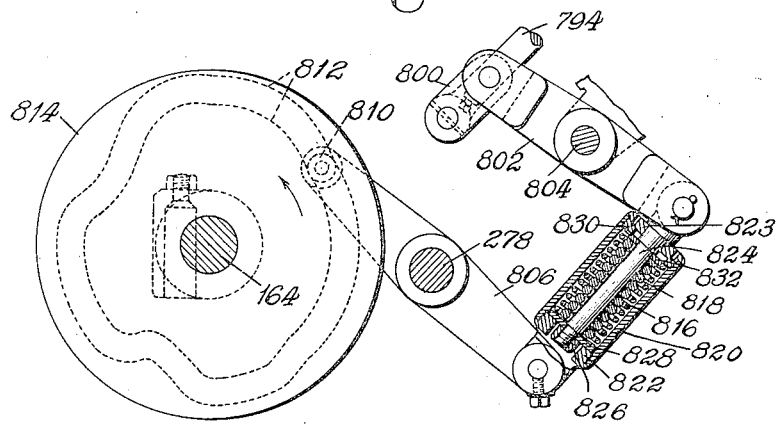
Fig. 29 is a view partly in side elevation and partly in section showing a portion of the means for operating the device from which the tacks are driven.

When the work is in proper condition for the machine to continue its cycle of operations the operator swings the shoe holder 472 downwardly to the position in which it is locked by the latch 504 and then depresses the treadle 1170 to start the machine again. As the machine starts the shoe holder is pressed more forcibly down against the shoe and the wiper carrier 568 is advanced to bring the band 564 against the upper at the end of the toe. Substantially at the same time the tack block 774 is moved up into engagement with the insole, as shown in Fig. 38. The toe band 564 is then pressed more firmly forward and is closed yieldingly about the toe by its operating mechanism and is moved downwardly by swinging movement of the carrier 568 to wipe the upper about the toe toward the edge of the insole. The wipers 566 are thereafter advanced and closed to wipe the marginal portion of the upper inwardly over the insole. As these wipers begin to wipe the upper inwardly, under the comparatively light upward pressure of the spring 602 (Fig. 35), the several grippers are opened to release the upper and the tack block 774 is moved downwardly to provide room for the wipers. As the wipers continue their inward movements the tack block is moved forwardly and upwardly into engagement with the wipers, as illustrated in Fig. 39, and is then moved rearwardly along the wipers to bring its tack passages 776 into alinement with the holes 740 in the wipers. In this movement of the tack block its spring-pressed pins 892 snap up into the recesses 896 in the wipers and as the movement continues the pins serve to insure proper alinement of the tack passages with the holes in the wipers in the manner hereinbefore explained and as illustrated in Fig. 14$a$. Substantially at the end of the advancing and closing movements of the wipers they are pressed more forcibly upward against the shoe bottom by the spring 614 (Fig. 35), and their pressure on the shoe is also increased by the tack block which is pressed forcibly against them by the springs 816 and 818 (Fig. 29). When the parts have arrived substantially in the positions illustrated in Fig. 40 the tack drivers 778 start their driving movements, and as soon as the points of the tacks have entered the upper the wipers and the tack block are moved rearwardly in unison, thus straightening the tacks, as illustrated by Fig. 41, so that as the drivers continue their driving movements the tacks are driven in directions substantially perpendicular to the bottom face of the insole. It will be understood that the tacks are fully driven and are clinched on the metal plate customarily provided on the bottom of the last in the manufacture of shoes of the illustrated type.

The above-described wiping and tack-driving operations having been performed, the shoe is released from pressure by retractive movements of the tack block, the wipers, the toe band and the shoe holder, the tack block being moved downwardly far enough to withdraw the pins 892 from the recesses in the wipers and thereafter moved upwardly again beyond its starting position to receive tacks for use in operating on the next shoe. These tacks, during this second stage of the cycle, are dropped head downward by the tack inverters 1072 and 1110 into the tack transfer blocks 898 and 986 and other tacks are dropped by the separators into positions to be received in the tack pockets of the inverters when the latter are returned to their starting positions. Before the machine is brought to a stop by the cam *f* the tack transfer slides 900 and 990 are moved inward to carry their tacks to positions over the tack block 774 and the thin plates 954 and 994 under the transfer blocks are withdrawn to deliver the tacks into the tack block. The machine is brought to a stop with the transfer blocks over the tack block to allow time for the tacks to settle in the driver passages, the several grippers being still maintained in positions low enough not to interfere with the tack-transferring operations. When the machine is again started by the operator the tack transfer slides are moved outwardly to their initial positions, the tack block 774 is lowered to its starting position, and the grippers are raised ready to receive the upper of the next shoe. The machine then comes to rest in the position determined by the stop cam *d*.

It will be understood that while the cam *d* has been referred to in the foregoing description as determining the starting position of the machine, the cam *f* may, if desired, be so referred to, in which case the first stage of the cycle would comprise the movements above mentioned as taking place in the last stage, preparatory to the introduction of a shoe into the machine.

Having described the invention, what we claim as new and desire to secure by Letters Patent of the United States is:

1. In a machine for shaping uppers over lasts, means for tensioning an upper over a last positioned bottom downward and for working the marginal portion of the upper about the toe inwardly into lasted relation to a sole on the last, and upper-fastening mechanism comprising a plurality of drivers movable upwardly in substantially parallel relation to one another to drive a plurality of fastenings into the shoe bottom around the end and along the sides of the toe to fasten the upper in lasted position.

2. In a machine for shaping uppers over lasts, means for tensioning an upper over a last positioned bottom downward and for working the marginal portion of the upper about the toe inwardly into lasted relation to a sole on the last, a plurality of drivers arranged in substantially parallel relation to one another for driving a plurality of fastenings into the shoe bottom around the end and along the sides of the toe to fasten the upper in lasted position, a member in fixed relation to which said drivers are mounted, and means for moving said member upwardly to drive the fastenings.

3. In a machine for shaping uppers over lasts, means for tensioning an upper over a last positioned bottom downward and for working the marginal portion of the upper around the toe inwardly into lasted relation to a sole on the last, a device arranged to lie under the toe end of the shoe bottom and provided with a plurality of passages from which to drive fastenings upwardly into the shoe bottom around the end and along the sides of the toe to fasten the upper in lasted position, means for delivering fastenings to said passages through their upper ends, and means for driving the fastenings.

4. In a machine for shaping uppers over lasts, means for pulling an upper over a last positioned bottom downward, means for working the marginal portion of the upper about the toe into lasted relation to a sole on the last, a device arranged to lie under the toe end of the shoe bottom when the shoe is presented to the machine and having therein a plurality of passages from which to drive fastenings upwardly into the shoe bottom around the end and along the sides of the toe to fasten the upper in lasted position, and a plurality of upwardly movable drivers for driving the fastenings.

5. In a machine for shaping uppers over lasts, means for pulling an upper over a last positioned bottom downward, means for working the marginal portion of the upper about the toe into lasted relation to a sole on the last, a substantially U-shaped device arranged to extend along the margin of the toe end of the shoe bottom and provided with a plurality of substantially parallel passages from which to drive fastenings upwardly into the shoe bottom around the end and along the sides of the toe to fasten the upper in lasted position, and a plurality of upwardly movable drivers for driving the fastenings.

6. In a machine for shaping uppers over lasts, means for pulling an upper over a last positioned bottom downward, toe-embracing wipers movable to wipe the marginal portion of the upper about the toe into lasted relation to a sole on the last, and upper-fastening mechanism relatively to which the wipers are thus movable comprising a plurality of drivers movable upwardly to drive fastenings into the shoe bottom around the end and along the sides of the toe to fasten the upper in lasted position.

7. In a machine for shaping uppers over lasts, grippers for pulling an upper over a last positioned bottom downward, toe-embracing wipers movable to wipe the marginal portion of the upper about the toe into lasted relation to a sole on the last, a device arranged to occupy a position opposite the toe end of the shoe bottom in the upper-pulling operation and provided with a plurality of passages from which to drive fastenings upwardly into the shoe bottom around the end and along the sides of the toe to fasten the upper in lasted position, and means for driving the fastenings.

8. In a machine for shaping uppers over lasts, grippers for pulling an upper over a last positioned bottom downward, toe-embracing wipers movable to wipe the marginal portion of the upper about the toe into lasted relation to a sole on the last, said wipers having a plurality of openings therein, a device relatively to which the wipers are thus movable provided with a plurality of passages arranged to aline with said openings in the wipers, and means for driving fastenings upwardly from said passages through the openings in the wipers to fasten the upper around the toe in lasted position.

9. In a machine for shaping uppers over lasts, grippers for pulling an upper over a last positioned bottom downward, toe-embracing wipers for wiping the marginal portion of the upper about the toe into lasted relation to a sole on the last, said wipers having a plurality of openings therein, a device provided with a plurality of passages from which to drive fastenings upwardly into the shoe bottom around the toe to fasten the upper in lasted position, said device being movable in the operation of the machine to aline said passages with the openings in the wipers, and a plurality of upwardly movable drivers for driving the fastenings.

10. In a machine for shaping uppers over lasts, grippers for pulling an upper over the forepart of a last positioned bottom downward, means for laying the marginal portion of the upper inwardly over a sole on the last, and upper-fastening mechanism arranged to occupy a position opposite the toe end of the shoe bottom in the upper-pulling operation, said upper-fastening mechanism comprising a plurality of drivers arranged in parallel relation to one another for driving fastenings at the end and the sides of the toe and an upwardly movable member common to the several drivers for operating them.

11. In a machine for shaping uppers over lasts, grippers for pulling an upper over the forepart of a last positioned bottom downward, means for laying the marginal portion of the upper inwardly over a sole on the last, a device arranged to occupy a position opposite the toe end of the shoe bottom in the upper-pulling operation and provided with a plurality of passages arranged in fixed relation to one another from which to drive fastenings upwardly into the shoe bottom at the end and the sides of the toe, and a plurality of drivers movable upwardly to drive the fastenings.

12. In a machine for shaping uppers over lasts, means for shaping an upper over a last positioned bottom downward comprising wipers for embracing the upper around an end of the last and for wiping it into lasted position over a sole on the last, a device provided with a plurality of passages from which to drive fastenings upwardly around the end of the shoe bottom to fasten the upper in lasted position, means for delivering fastenings to said passages through their upper ends, and a plurality of upwardly movable drivers for driving the fastenings.

13. In a machine for shaping uppers over lasts, grippers for pulling an upper over the forepart of a last, toe-embracing wipers for wiping the marginal portion of the upper about the toe into lasted relation to a sole on the last, and a gang of power-operated drivers arranged in fixed parallel relation to one another for driving fastenings into the shoe bottom around the end and along the sides of the toe to fasten the upper in lasted position.

14. In a machine for shaping uppers over lasts, grippers for pulling an upper over the forepart of a last, toe-embracing wipers for wiping the marginal portion of the upper about the toe into lasted relation to a sole on the last, a device provided with a plurality of passages arranged in fixed parallel relation to one another from which to drive fastenings into the shoe bottom around the end and along the sides of the toe to fasten the upper in lasted position, and a plurality of power-operated drivers for driving the fastenings from said passages.

15. In a machine for shaping uppers over lasts, grippers for pulling an upper over the forepart of a last, toe-embracing wipers for wiping the marginal portion of the upper about the toe into lasted relation to a sole on the last, a device relatively to which the wipers are movable in the wiping operation provided with a plurality of passages from which to drive fastenings into the shoe bottom around the end and along the sides of the toe to fasten the upper in lasted position, said device being arranged to occupy a position opposite the bottom of the shoe when the shoe is presented to the machine, and means for driving the fastenings from said passages.

16. In a machine for shaping uppers over lasts, grippers for pulling an upper over the forepart of a last, toe-embracing wipers for wiping the marginal portion of the upper about the toe into lasted relation to a sole on the last, a device arranged to occupy a position opposite the toe end of the shoe bottom in the upper-pulling operation and provided with a plurality of passages from which to drive fastenings around the end and along the sides of the toe to fasten the upper in lasted position, and a plurality of drivers for driving the fastenings from said passages.

17. In a machine for shaping uppers over lasts, grippers for pulling an upper over the forepart of a last, toe-embracing wipers mounted for relative swinging movements inwardly about the toe to wipe the marginal portion of the upper into lasted relation to a sole on the last, said wipers having a plurality of openings therein, and upper-fastening means comprising a plurality of drivers for driving fastenings through said openings in the wipers to fasten the upper about the toe in lasted position, said upper-fastening means and the wipers being relatively movable in the operation of the machine to aline the drivers with said openings prior to the driving of the fastenings.

18. In a machine for shaping uppers over lasts, grippers for pulling an upper over the forepart of a last, toe-embracing wipers mounted for relative swinging movements inwardly about the toe to wipe the marginal portion of the upper into lasted relation to a sole on the last, said wipers having a plurality of openings therein, a device provided with a plurality of passages from which to drive fastenings through the openings in the wipers to fasten the upper in lasted position, said device and the wipers being relatively movable in the operation of the machine to aline said passages with the openings in the wipers, and means for driving the fastenings.

19. In a machine for shaping uppers over lasts, means for shaping an upper over the forepart of a last and for laying its marginal portion inwardly over a sole on the last, and upper-fastening means arranged to occupy a position opposite the bottom of the shoe when the shoe is presented to the machine and comprising a plurality of drivers arranged in fixed relation to one another and movable as a unit to drive fastenings simultaneously at the end and the sides of the forepart to fasten the upper to the sole.

20. In a machine for shaping uppers over lasts, wipers for embracing an upper about the toe end of a last and for wiping its marginal portion into lasted relation to a sole on the last, and upper-fastening mechanism arranged to occupy a position opposite the bottom of the toe end of the shoe when the shoe is presented to the machine and relatively to which the wipers are movable in the wiping operation, said upper-fastening mechanism comprising a plurality of drivers arranged in parallel relation to one another and movable to drive fastenings around the end and along the sides of the toe to fasten the upper in lasted position.

21. In a machine for shaping uppers over lasts, wipers for embracing an upper about the toe end of a last and for wiping its marginal portion into lasted relation to a sole on the last, said wipers having a plurality of openings therein, and upper-fastening mechanism arranged to occupy a position opposite the toe end of the shoe bottom when the shoe is presented to the machine and relatively to which the wipers are movable in the wiping operation, said upper-fastening mechanism comprising a plurality of drivers arranged to drive fastenings through said openings in the wipers to fasten the upper around the end and along the sides of the toe in lasted position.

22. In a machine for shaping uppers over lasts, means for working the marginal portion of an upper about an end of a last into lasted position over the bottom of the last, a plurality of drivers for driving fastenings around the end of the shoe bottom to fasten the upper in lasted position, a member movable to operate said drivers, a lever for operating said member, and a yieldable connection between said member and lever.

23. In a machine for shaping uppers over lasts, means for working the marginal portion of an upper about an end of a last into lasted position over the bottom of the last, a plurality of drivers for driving fastenings around the end of the shoe bottom to fasten the upper in lasted position, a member movable to operate said drivers, a cam for imparting to said member its driver-operating movement, and a spring through which to operate the member by the cam.

24. In a machine for shaping uppers over lasts, wipers for wiping the marginal portion of an upper around the toe end of a last into lasted position over the bottom of the last, and upper-fastening means comprising devices for driving a plurality of fastenings around the end and along the sides of the toe to fasten the upper in lasted position, said devices being mounted for movement as a unit relatively to the wipers in a direction lengthwise of the shoe into position for the driving of the fastenings.

25. In a machine for shaping uppers over lasts, wipers for wiping the marginal portion of an upper around the toe end of a last into lasted position over the bottom of the last, a device provided with a plurality of passages from which to drive fastenings around the end and along the sides of the toe to fasten the upper in lasted position, said device being movable lengthwise of the shoe relatively to the wipers into position for the driving of the fastenings, and means for driving the fastenings from said passages.

26. In a machine for shaping uppers over lasts, wipers for wiping the marginal portion of an upper around an end of a last into lasted position over the bottom of the last, a device having therein a plurality of passages arranged in substantially parallel relation to one another and in substantially perpendicular relation to the wipers from which to drive fastenings around the end of the shoe bottom to fasten the upper in lasted position, and a plurality of substantially parallel drivers for driving the fastenings, said device and the drivers being movable as a unit along the outer faces of the wipers into position for the driving of the fastenings.

27. In a machine for shaping uppers over lasts, wipers for wiping the marginal portion of an upper around an end of a last into lasted position over the bottom of the last, a substantially U-shaped device provided with a plurality of passages from which to drive fastenings around the end of the shoe bottom to fasten the upper in lasted position, said device being movable lengthwise of the shoe along the outer faces of the wipers into position for the driving of the fastenings, and means for driving the fastenings from said passages.

28. In a machine for shaping uppers over lasts, wipers for wiping the marginal portion of an upper around an end of a last into lasted position over the bottom of the last, a device provided with a plurality of passages from which to drive fastenings around the end of the shoe bottom to fasten the upper in lasted position, means for moving said device both heightwise and lengthwise of the shoe relatively to the wipers into position for the driving of the fastenings, and means for driving the fastenings from said passages.

29. In a machine for shaping uppers over lasts, wipers for wiping the marginal portion of an upper around an end of a last into lasted position over the bottom of the last, a device provided with a plurality of passages from which to drive fastenings around the end of the shoe bottom to fasten the upper in lasted position, means for moving said device along the outer faces of the wipers toward their wiping edges after the wipers have begun to wipe the upper over the bottom of the last, and means for driving the fastenings from said passages.

30. In a machine for shaping uppers over lasts, wipers for wiping the marginal portion of an upper around an end of a last into lasted position over the bottom of the last, and upper-fastening means for driving fastenings around the end of the shoe bottom to fasten the upper in lasted position, said upper-fastening means being movable into engagement with the outer faces of the wipers at a substantial distance from their wiping edges and then along said faces toward the wiping edges prior to the driving of the fastenings.

31. In a machine for shaping upper over lasts, wipers for wiping the marginal portion of an upper around an end of a last into lasted position over the bottom of the last, a substantially U-shaped device provided with a plurality of passages from which to drive fastenings around the end of the shoe bottom to fasten the upper in lasted position, means for moving said device into engagement with the outer faces of the wipers at a substantial distance from their wiping edges and for then moving it along said faces toward the wiping edges prior to the driving of the fastenings, and means for driving the fastenings from said passages.

32. In a machine for shaping uppers over lasts, wipers for wiping the marginal portion of an upper around an end of a last into lasted position over the bottom of the last, said wipers having a plurality of openings therein, and upper-fastening means for driving a plurality of fastenings through the openings in the wipers to fasten the upper in lasted position, said upper-fastening means being movable relatively to the wipers lengthwise of the shoe into position for driving the fastenings through said openings.

33. In a machine for shaping uppers over lasts, wipers for wiping the marginal portion of an upper around an end of a last into lasted position over the bottom of the last, said wipers having a plurality of openings therein, a device provided with a plurality of passages from which to drive fastenings through said openings in the wipers to fasten the upper in lasted position, said device being movable lengthwise of the shoe along the plane of the wipers to aline said passages with the openings in the wipers, and means for driving the fastenings.

34. In a machine for shaping uppers over lasts, wipers for wiping the marginal portion of an upper around an end of a last into lasted position over the bottom of the last, said wipers having a plurality of openings therein, a device provided with a plurality of passages from which to drive fastenings through said openings in the wipers to fasten the upper in lasted position, means for moving said device along the outer faces of the wipers in contact with said faces to aline said passages with the openings in the wipers, and means for driving the fastenings.

35. In a machine for shaping uppers over lasts, wipers for wiping the marginal portion of an upper around an end of a last into lasted position over the bottom of the last, said wipers having a plurality of openings therein, a substantially U-shaped device provided with a plurality of passages from which to drive fastenings through said openings in the wipers to fasten the upper in lasted position, means for moving said device into engagement with the outer faces of the wipers at a substantial distance from their wiping edges and then along said faces toward the wiping edges to aline said passages with the openings in the wipers, and means for driving the fastenings.

36. In a machine for shaping uppers over lasts, wipers for wiping the marginal portion of an upper around an end of a last into lasted position over the bottom of the last, said wipers having a plurality of openings therein, a substantially U-shaped device provided with a plurality of passages in substantially parallel relation to one another from which to drive fastenings through said openings in the wipers to fasten the upper in lasted position, drivers in said passages, and means for moving said device toward the plane of the wipers at a substantial distance from their wiping edges and for then moving said device and the drivers along said plane toward the wiping edges to aline said passages and drivers with the openings in the wipers.

37. In a machine for shaping uppers over lasts, means for pulling an upper over the forepart of a last, toe-embracing wipers for wiping the marginal portion of the upper about the toe into lasted position over the bottom of the last, and upper-fastening means provided with a plurality of passages from which to drive fastenings into the shoe bottom around the toe to fasten the upper in lasted position, said upper-fastening means being arranged to occupy a position opposite the bottom face of the last in the upper-pulling operation and being movable thereafter to a position opposite the outer faces of the wipers and then reversely along said faces prior to the driving of the fastenings.

38. In a machine for shaping uppers over lasts, means for pulling an upper over the forepart of a last, toe-embracing wipers for wiping the marginal portion of the upper about the toe into lasted position over the bottom of the last, upper-fastening means provided with a plurality of passages from which to drive fastenings into the shoe bottom around the toe to fasten the upper in lasted position, said upper-fastening means being arranged to occupy a position opposite the bottom face of the last in the upper-pulling operation, and mechanism for thereafter moving said upper-fastening means outwardly beyond the edges of the wipers and then reversely toward said edges prior to the driving of the fastenings.

39. In a machine for shaping uppers over lasts, means for pulling an upper over the forepart of a last, toe-embracing wipers for wiping the marginal portion of the upper about the toe into lasted position over the bottom of the last, upper-fastening means provided with a plurality of passages from which to drive fastenings into the shoe bottom around the toe to fasten the upper in lasted position, said upper-fastening means being arranged to occupy a position opposite the bottom face of the last in the upper-pulling operation, and mechanism for thereafter moving said upper-fastening means outwardly beyond the edges of the wipers and then toward the plane of the wipers and reversely along said plane toward the wiping edges prior to the driving of the fastenings.

40. In a machine for shaping uppers over lasts, means for pulling an upper over the forepart of a last, toe-embracing wipers for wiping the marginal portion of the upper about the toe into lasted position over the bottom of the last, a substantially U-shaped device provided with a plurality of passages from which to drive fastenings into the shoe bottom around the toe to fasten the upper in lasted position, said device being arranged to occupy a position opposite the bottom face of the last in the upper-pulling operation, and means for thereafter moving said device forwardly lengthwise of the shoe beyond the edges of the wipers and for then moving it toward the plane of the wipers and reversely along said plane toward the wiping edges prior to the driving of the fastenings.

41. In a machine for shaping uppers over lasts, grippers for pulling an upper over the forepart of a last, toe-embracing wipers for wiping the marginal portion of the upper about the toe into lasted position over the bottom of the last, a device provided with a plurality of passages from which to drive fastenings into the shoe bottom around the toe to fasten the upper in lasted position, said device being arranged to occupy a position opposite the bottom face of the toe portion of the last in the upper-pulling operation, and mechanism for moving said device forwardly lengthwise of the shoe beyond the margin of the upper after the grippers have released the upper and for then moving it rearwardly along the wipers into position for the driving of the fastenings.

42. In an upper-shaping machine, the combination with means for shaping an upper over a last, of means for fastening the marginal portion of the upper to a sole on the last, said upper-fastening means being arranged to serve as a holddown for the sole by contact therewith in the upper-shaping operation.

43. In an upper-shaping machine, the combination with means for shaping an upper over a last, of a device from which to drive fastening means into the shoe bottom to fasten the upper to a sole on the last, said device being arranged to engage the marginal portion of the sole and to press it close to the bottom of the last in the upper-shaping operation.

44. In a machine for shaping uppers over lasts, the combination with means for wiping the marginal portion of an upper inwardly over a sole on a last, of a device from which to drive fastening means into the shoe bottom to fasten the upper to the sole, and mechanism for positioning said device in engagement with the marginal portion of the sole to hold the sole close to the bottom of the last at the beginning of the operation of wiping the upper inwardly over the sole and for then withdrawing it from the sole to permit the completion of the wiping operation.

45. In a machine for shaping uppers over lasts, the combination with means for wiping the marginal portion of an upper around an end of a last inwardly over a sole on the last, of upper-fastening means for fastening the upper to the sole around the end of the shoe bottom, and mechanism for positioning said upper-fastening means in engagement with the marginal portion of the sole around the end of the shoe bottom to hold the sole close to the bottom of the last at the beginning of the operation of wiping the upper inwardly over the sole and for thereafter withdrawing it from the sole to permit the completion of the wiping operation.

46. In an upper-shaping machine, the combination with means for shaping an upper over a last and for laying its marginal portion around an end of the last inwardly over a sole on the last, of a substantially U-shaped device having passages therein from which to drive fastenings through the upper and into the sole around the end of the shoe bottom, and means for positioning said device in engagement with the marginal portion of the sole to press the sole close to the bottom of the last in the upper-shaping operation and for thereafter withdrawing it from the sole to permit the laying of the marginal portion of the upper inwardly over the sole.

47. In a machine for shaping uppers over lasts, the combination with means for wiping an upper heightwise of a last and for thereafter laying its marginal portion inwardly over a sole on the last, of means for fastening the marginal portion of the upper to the sole, said upper-fastening means being arranged to serve as a holddown for the marginal portion of the sole in the wiping of the upper heightwise of the last.

48. In a machine for shaping uppers over lasts, the combination with means for wiping an upper heightwise of a last around the toe end of the last and for thereafter laying its marginal portion inwardly over a sole on the last, of a device provided with a plurality of passages from which to drive fastenings through the upper and into the sole around the toe, and means for positioning said device in engagement with the sole to hold the marginal portion of the sole close to the bottom of the last in the wiping of the upper heightwise of the last and for thereafter withdrawing it from the sole to permit the laying of the upper inwardly over the sole.

49. In a machine for shaping uppers over lasts, the combination with means for pulling an upper over a last, and means for laying the marginal portion of the upper inwardly over a sole on the last, of means for fastening the upper to the sole, and mechanism for moving said upper-fastening means into position to press the marginal portion of the sole close to the bottom of the last in time relation to the upper-pulling operation and for thereafter withdrawing it from the sole to permit the upper to be laid inwardly over the sole.

50. In a machine for shaping uppers over lasts, the combination with means for pulling an upper over a last, and means for wiping the upper heightwise of the last and for laying its marginal portion inwardly over a sole on the last, of a device from which to drive fastening means into the shoe bottom to fasten the upper to the sole, and mechanism for moving said device into position to press the marginal portion of the sole close to the bottom of the last and for maintaining it in that position during the wiping of the upper heightwise of the last and for thereafter withdrawing it from the sole to permit the upper to be laid inwardly over the sole.

51. In a machine for shaping uppers over lasts, the combination with means for pulling an upper over the forepart of a last, and toe-embracing wipers for wiping the marginal portion of the upper around the toe inwardly over a sole on the last, of upper-fastening means provided with a plurality of passages from which to drive fastenings into the shoe bottom around the toe to fasten the upper to the sole, and mechanism for moving said upper-fastening means into position to press the marginal portion of the sole close to the bottom of the last in time relation to the upper-pulling operation and for thereafter withdrawing it from the sole to permit the upper to be wiped inwardly over the sole.

52. In a machine for shaping uppers over lasts, the combination with means for shaping an end portion of an upper over a last, including wipers for wiping the marginal portion of the upper around the end of the last inwardly over a sole on the last, of upper-fastening means for fastening the upper to the sole around the end of the shoe bottom, and means for maintaining said upper-fastening means in position to hold the marginal portion of the sole close to the bottom of the last during a portion of the upper-shaping operation and for thereafter withdrawing it from the sole, moving it outwardly beyond the edges of the wipers and then reversely along the plane of the wipers toward their wiping edges prior to the upper-fastening operation.

53. In a machine for shaping uppers over lasts, the combination with means for shaping an end portion of an upper over a last, including wipers for wiping the marginal portion of the upper around the end of the last inwardly over a sole on the last, said wipers having a plurality of openings therein through which to drive fastenings to fasten the upper to the sole, of upper-fastening means comprising a device provided with a plurality of passages from which to drive the fastenings, and means for maintaining said device in position to hold the marginal portion of the sole close to the bottom of the last during a portion of the upper-shaping operation and for thereafter withdrawing it from the sole and moving it into position to aline its passages with the openings in the wipers.

54. In a machine for shaping uppers over lasts, the combination with means for pulling an upper over the forepart of a last, means for wiping the upper heightwise of the last around the toe, and wipers for wiping the marginal portion of the upper around the toe inwardly over a sole on the last, of a device provided with passages from which to drive fastenings around the toe end of the shoe bottom to fasten the upper to the sole, said device being arranged to engage the marginal portion of the sole around the toe end of the shoe bottom to hold the sole close to the bottom of the last in the wiping of the upper heightwise of the last, and means for thereafter withdrawing said device from the sole, moving it forwardly lengthwise of the shoe beyond the edges of the wipers and then moving it reversely toward said edges prior to the driving of the fastenings.

55. In a machine for shaping uppers over lasts, the combination with means for pulling an upper over the forepart of a last, and means for wiping the upper around the toe heightwise of the last and for laying its marginal portion inwardly over a sole on the last, of a device provided with passages from which to drive fastenings around the toe end of the shoe bottom to fasten the upper to the sole, and means for moving said device into engagement with the sole prior to the overlaying operation to press the marginal portion of the sole close to the last and for thereafter withdrawing it from the sole to permit the laying of the upper inwardly over the sole.

56. In a machine for shaping uppers over lasts, wipers for wiping the marginal portion of an upper around an end of a last inwardly over the bottom of the last, said wipers having a plurality of openings therein, upper-fastening means for driving fastenings through said openings in the wipers to fasten the upper, said wipers and the upper-fastening means being mounted for relative movement along the plane of the wipers prior to the driving of the fastenings, and mechanism for effecting by such relative movement an interlocking connection between the wipers and the upper-fastening means to insure proper relation of the fastening means to the openings in the wipers.

57. In a machine for shaping uppers over lasts, wipers for wiping the marginal portion of an upper around an end of a last inwardly over the bottom of the last, said wipers having a plurality of openings therein, upper-fastening means for driving fastenings through said openings in the wipers to fasten the upper, said wipers and the upper-fastening means being mounted for relative movement along the plane of the wipers prior to the driving of the fastenings and having portions arranged for interengagement by such relative movement to insure proper relation of the fastening means to the openings in the wipers.

58. In a machine for shaping uppers over lasts, wipers for wiping the marginal portion of an upper around an end of a last inwardly over the bottom of the last, said wipers having a plurality of openings therein, upper-fastening means for driving fastenings through said openings in the wipers to fasten the upper, said wipers and the upper-fastening means being relatively movable prior to the driving of the fastenings, and spring-controlled members carried by the fastening means and arranged to enter recesses in the wipers spaced from the openings therein to insure proper relation of the fastening means to said openings.

59. In a machine for shaping uppers over lasts, wipers for wiping the marginal portion of an upper around an end of a last inwardly over the bottom of the last, said wipers being mounted for closing movements toward each other and having a plurality of openings therein, upper-fastening means for driving fastenings through said openings in the wipers to fasten the upper, said wipers and upper-fastening means being mounted for relative movement along the plane of the wipers prior to the driving of the fastenings and having portions arranged for interengagement by such relative movement to insure closing of the wipers to predetermined positions to present their openings in proper relation to the fastening means.

60. In a machine for shaping uppers over lasts, wipers for wiping the marginal portion of an upper around an end of a last inwardly over the bottom of the last, said wipers being mounted for closing movements toward each other and having a plurality of openings therein, upper-fastening means for driving fastenings through said openings in the wipers to fasten the upper, said wipers and the upper-fastening means being relatively movable lengthwise of the shoe prior to the driving of the fastenings and having interengaging portions including cam faces arranged to act in such relative movement to insure closing of the wipers to predetermined positions to present their openings in proper relation to the fastening means.

61. In a machine for shaping uppers over lasts, wipers for wiping the marginal portion of an upper around an end of a last inwardly over the bottom of the last, said wipers having a plurality of openings therein, a device provided with passages from which to drive fastenings through said openings in the wipers to fasten the upper, said device being mounted for movement lengthwise of the shoe relatively to the wipers prior to the driving of the fastenings, and means on said device arranged to interlock with the wipers substantially at the end of that movement to insure proper alinement of said passages with the openings in the wipers.

62. In a machine for shaping uppers over lasts, wipers for wiping the marginal portion of an upper around an end of a last inwardly over the bottom of the last, said wipers having a plurality of openings therein, a device provided with passages from which to drive fastenings through said openings in the wipers to fasten the upper, said device being mounted for movement along the plane of the wipers prior to the driving of the fastenings, and spring-controlled members carried by said device and arranged to enter recesses in the wipers in that movement to insure proper alinement of said passages with the openings in the wipers.

63. In a machine for shaping uppers over lasts, wipers for wiping the marginal portion of an upper around an end of a last inwardly over the bottom of the last, said wipers being mounted for closing movements toward each other and having a plurality of openings therein, a device provided with a plurality of passages from which to drive fastenings through said openings in the wipers to fasten the upper, said device being mounted for movement relatively to the wiper along their outer faces prior to the driving of the fastenings and having means thereon arranged to act on the wipers in that movement to insure their closing to predetermined positions to present their openings in proper alinement with said passages.

64. In a machine for shaping uppers over lasts, wipers for wiping the marginal portion of an upper around an end of a last inwardly over the bottom of the last, said wipers being mounted for closing movements toward each other and having a plurality of openings therein and also having cam faces thereon, a device provided with a plurality of passages from which to drive fastenings through said openings to fasten the upper, said device being movable along the outer faces of the wipers in a direction lengthwise of the shoe prior to the driving of the fastenings and having means for engaging said cam faces on the wipers to insure closing of the wipers to predetermined positions to present their openings in proper alinement with said passages.

65. In a machine for shaping uppers over lasts, the combination with means for laying the marginal portion of an upper inwardly over a sole on a last, of upper-fastening means including a driver for driving a fastening through the upper and into the sole, said upper-fastening means being arranged to position the fastening initially in inclined relation to the path of movement of the driver and being movable in the driving operation to tip the fastening into a position substantially parallel to said path.

66. In a machine for shaping uppers over lasts, the combination with means for laying the marginal portion of an upper inwardly over a sole on a last, of a device having a passage therein from which to drive a pointed fastening through the upper and into the sole, a driver for driving the fastening from said passage, said device being arranged to position the fastening initially in inclined relation to the path of movement of the driver, and means for effecting relative movement of said device and the shoe in a direction transverse to said path after the point of the fastening has entered the upper to tip the fastening into a position substantially parallel to said path.

67. In a machine for shaping uppers over lasts, the combination with means for laying the marginal portion of an upper around an end of a last inwardly over a sole on the last, of a plurality of drivers for driving fastenings around the end of the shoe bottom to fasten the upper to the sole, means for positioning the fastenings initially in inclined relation to the paths of movement of the drivers and mechanism for moving said positioning means and the drivers, after the fastenings have started to enter the upper materials, to tip the fastenings into positions substantially parallel to the paths of movement of the respective drivers.

68. In a machine for shaping uppers over lasts, the combination with means for laying the marginal portion of an upper around an end of a last inwardly over a sole on the last, of a device provided with a plurality of passages from which to drive pointed fastenings around the end of the shoe bottom to fasten the upper to the sole, drivers for driving the fastenings from said passages, said device being arranged to support the fastenings prior to the driving operation in positions in which they are all inclined in substantially the same direction relatively to the paths of movement of the drivers, and means for moving said device and the drivers, after the points of the fastenings have entered the upper, in a direction to tip the fastenings into positions substantially parallel to the paths of movement of the drivers.

69. In a machine for shaping uppers over lasts, the combination with means for laying the marginal portion of an upper around an end of a last inwardly over a sole on the last, of upper-fastening means provided with a plurality of passages open at their outer ends from which to drive tacks to fasten the upper to the sole and having drivers for driving the tacks from said passages, said upper-fastening means being so positioned that the tacks in said passages are inclined by gravity relatively to the paths of movement of the drivers, and mechanism for effecting relative movement of said upper-fastening means and the shoe, after the points of the tacks have entered the upper, to tip the tacks into positions substantially parallel to the paths of movement of the drivers.

70. In a machine for shaping uppers over lasts, the combination with means for laying the marginal portion of an upper around an end of a last inwardly over a sole on the last, of upper-fastening means provided with a plurality of passages from which to drive tacks to fasten the upper to the sole and having drivers for driving the tacks from said passages, said upper-fastening means being arranged to support the tacks prior to the driving operation in positions in which they are all inclined lengthwise of the shoe relatively to the paths of movement of the drivers, and mechanism for moving said upper-fastening means lengthwise of the shoe, after the points of the tacks have entered the upper, to tip the tacks into positions substantially parallel to the paths of movement of the drivers.

71. In a machine for shaping uppers over lasts, the combination with means for shaping an upper over a last positioned bottom downward at an inclination to the horizontal, including mechanism for laying the marginal portion of the upper around an end of the last inwardly over a sole on the last, of a plurality of drivers movable upwardly in inclined paths to drive tacks around the end of the shoe bottom to fasten the upper to the sole, guiding means for the tacks arranged to support them prior to the driving operation in positions in which they are inclined lengthwise of the shoe relatively to the paths of movement of the drivers, and mechanism for moving said guiding means and the drivers lengthwise of the shoe, after the points of the tacks have entered the upper, to tip the tacks into positions substantially parallel to the paths of movement of the drivers.

72. In a machine for shaping uppers over lasts, the combination with means for shaping an upper over the forepart of a last positioned bottom downward with its toe portion upwardly inclined, including mechanism for laying the marginal portion of the upper around the toe inwardly over a sole on the last, of a device inclined similarly to the toe portion of the last and provided with passages open at their upper ends from which to drive tacks upwardly in inclined directions around the toe end of the shoe bottom to fasten the upper to the sole, drivers for driving the tacks from said passages, said device being arranged to support the tacks prior to the driving operation in positions in which they are inclined lengthwise of the shoe relatively to the paths of movement of the drivers, and means for moving said device and the drivers lengthwise of the shoe, after the points of the tacks have entered the upper, to tip the tacks into positions substantially parallel to the paths of movement of the drivers.

73. In a machine for shaping uppers over lasts, the combination with wipers for wiping the marginal portion of an upper around an end of a last inwardly over a sole on the last, said wipers having openings therein through which to drive fastenings to fasten the upper to the sole, of a plurality of drivers movable to drive pointed fastenings through said openings in the wipers, and means for positioning the fastenings prior to the driving operation in inclined relation to the paths of movement of the drivers, said positioning means together with the wipers being movable, after the fastenings have started to enter the upper, to tip the fastenings into positions substantially parallel to the paths of movement of the drivers.

74. In a machine for shaping uppers over lasts, the combination with wipers for wiping the marginal portion of an upper around the toe end of a last inwardly over a sole on the last, said wipers being provided with openings through which to drive tacks to fasten the upper to the sole, of a plurality of drivers movable to drive the tacks, a device having passages therein for said drivers and arranged to support the tacks in said passages in positions in which they are inclined lengthwise of the shoe relatively to the paths of movement of the drivers, and means for moving said device and the drivers, together with the wipers, lengthwise of the shoe after the points of the tacks have entered the upper to tip the tacks into positions substantially parallel to the paths of movement of the drivers.

75. In a machine for shaping uppers over lasts, the combination with means for shaping an upper over the forepart of a last positioned bottom downward with its toe end upwardly inclined, including wipers for wiping the marginal portion of the upper around the toe inwardly over a sole on the last, said wipers having openings therein through which to drive tacks to fasten the upper to the sole, of a plurality of drivers movable upwardly in inclined paths to drive the tacks, a device provided with passages for said drivers and arranged to support the tacks in said passages in positions in which they are inclined lengthwise of the shoe relatively to the paths of movement of the drivers, and means for moving said device and the drivers, together with the wipers, lengthwise of the shoe after the points of the tacks have entered the upper to tip the tacks into positions substantially parallel to the paths of movement of the drivers.

76. In a machine for shaping uppers over lasts, the combination with wipers for wiping the marginal portion of an upper around an end of a last inwardly over a sole on the last, said wipers having openings therein through which to drive tacks to fasten the upper to the sole, of a plurality of drivers for driving the tacks, a device having passages therein for said drivers and arranged to support the tacks in said passages in positions in which they are inclined relatively to the paths of movement of the drivers, and means for moving said device along the outer faces of the wipers to bring said passages into alinement with the openings in the wipers prior to the driving operation and for thereafter moving the device and the wipers at the beginning of the driving operation to tip the tacks into positions substantially parallel to the paths of movement of the drivers.

77. In a machine for shaping uppers over lasts, the combination with means for conforming an upper to the contour of a last and for laying its marginal portion inwardly over a sole on the last, of upper-fastening means having a plurality of passages from which to drive fastenings to fasten the upper to the sole, and mechanism constructed to carry a plurality of fastenings and movable to a position adjacent to said upper-fastening means for delivering the fastenings to said passages prior to the driving operation.

78. In a machine for shaping uppers over lasts, the combination with means for conforming an upper to the contour of a last and for laying its marginal portion inwardly over a sole on the last, of upper-fastening means for inserting a plurality of fastenings to fasten the upper to the sole, said upper-fastening means being arranged to occupy a position opposite the bottom of the shoe when the shoe is presented to the machine, and mechanism constructed to carry a plurality of fastenings and movable to a position adjacent to said upper-fastening means when there is no shoe in the machine for delivering the fastenings to said means.

79. In a machine for shaping uppers over lasts, the combination with means for conforming an upper to the contour of a last and for laying its marginal portion inwardly over a sole on the last around the toe end of the shoe bottom, of upper-fastening means for inserting a plurality of fastenings around the end and along the sides of the toe to fasten the upper to the sole, said upper-fastening means being provided with a plurality of passages from which to drive the fastenings, and transferring mechanism constructed to carry a plurality of fastenings and movable to a position adjacent to said upper-fastening means for delivering the fastenings to said passages prior to the driving operation.

80. In a machine for shaping uppers over lasts, the combination with means for conforming an upper to the contour of a last positioned bottom downward and for laying its marginal portion inwardly over a sole on the last, of upper-fastening means provided with a plurality of upwardly-extending passages open at their upper ends from which to drive fastenings to fasten the upper to the sole, drivers for driving the fastenings upwardly from said passages, and mechanism constructed to carry a plurality of fastenings and movable to a position over said upper-fastening means for delivering the fastenings to said passages through their upper ends prior to the driving operation.

81. In a machine for shaping uppers over lasts, the combination with means for conforming an upper to the contour of a last positioned bottom downward and for laying its marginal portion inwardly over a sole on the last, of upper-fastening means for inserting a plurality of fastenings to fasten the upper to the sole, said upper-fastening means being arranged to occupy a position below and opposite the bottom of the shoe when the shoe is presented to the machine, and mechanism movable to a position over said upper-fastening means when there is no shoe in the machine for delivering thereto a plurality of fastenings.

82. In a machine for shaping uppers over lasts, the combination with means for conforming an upper to the contour of the forepart of a last positioned bottom downward and for laying the marginal portion of the upper around the toe inwardly over a sole on the last, of upper-fastening means comprising a device having a plurality of passages from which to drive fastenings upwardly into the shoe bottom around the end and along the sides of the toe to fasten the upper to the sole, said device being arranged to occupy a position opposite the bottom of the forepart of the shoe when the shoe is presented to the machine, and mechanism movable to a position over said device for delivering fastenings to said passages.

83. In a machine for shaping uppers over lasts, the combination with means for conforming an upper to the contour of the forepart of a last positioned bottom downward and for laying the marginal portion of the upper around the toe inwardly over a sole on the last, of upper-fastening means comprising a tack block provided with a plurality of passages from which to drive tacks upwardly into the shoe bottom around the end and along the sides of the toe to fasten the upper to the sole, and tack-transferring mechanism constructed to support tacks head downward and movable to a position over said tack block for delivering the tacks to said passages.

84. In a machine for shaping uppers over lasts, the combination with means for conforming an upper to the contour of the forepart of a last positioned bottom downward and for laying the marginal portion of the upper around the toe inwardly over a sole on the last, of upper-fastening means provided with a plurality of passages from which to drive tacks upwardly into the shoe bottom around the end and along the sides of the toe to fasten the upper to the sole, tack-transferring mechanism constructed to support tacks head downward and movable to a position over said upper-fastening means for delivering the tacks to said passages, and means for separating tacks point downward and for inverting them and delivering them to said transferring mechanism.

85. In a machine for shaping uppers over lasts, the combination with means for conforming an upper to the contour of a last positioned bottom downward and for laying the marginal portion of the upper around an end of the last inwardly over a sole on the last, of upper-fastening means comprising a plurality of drivers arranged to occupy positions opposite the bottom of the shoe when the shoe is presented to the machine and to drive fastenings upwardly into the shoe bottom around the end thereof to fasten the upper to the sole, and mechanism constructed to support a plurality of fastenings and movable to a position over the upper-fastening means to carry the fastenings into substantial alinement with the drivers.

86. In a machine for shaping uppers over lasts, the combination with means for conforming an upper to the contour of a last and for laying its marginal portion inwardly over a sole on the last, of upper-fastening means for inserting a plurality of fastenings to fasten the upper to the sole, said upper-fastening means being arranged to occupy a position opposite the bottom of the shoe when the shoe is presented to the machine, and means for delivering fastenings to said upper-fastening means comprising devices each arranged to carry a portion only of the number of fastenings to be driven, said devices being movable to positions adjacent to the upper-fastening means for delivering the fastenings.

87. In a machine for shaping uppers over lasts, the combination with means for conforming an upper to the contour of a last positioned bottom downward and for laying its marginal portion inwardly over a sole on the last around an end of the shoe bottom, of upper-fastening means for inserting a plurality of fastenings around the end of the shoe bottom to fasten the marginal portion of the upper to the sole, said upper-fastening means being arranged to occupy a position opposite the bottom of the shoe when the shoe is presented to the machine, and means for delivering fastenings to said upper-fastening means comprising slides each arranged to carry a portion only of the number of fastenings required, said slides being mounted at opposite sides of the machine for movements inwardly into positions for delivering the fastenings.

88. In a machine for shaping uppers over lasts, the combination with means for conforming an upper to the contour of the forepart of a last positioned bottom downward and for laying the marginal portion of the upper around the toe inwardly over a sole on the last, of upper-fastening means comprising a device having a plurality of passages from which to drive fastenings upwardly into the shoe bottom around the end and along the sides of the toe to fasten the upper to the sole, said device being arranged to occupy a position opposite the bottom of the forepart of the shoe when the shoe is presented to the machine, and mechanism for delivering fastenings to said passages, said mechanism comprising transferring devices movable to positions over said upper-fastening means and arranged to deliver respectively the fastenings to be driven around the end of the toe and those to be driven at the sides of the toe.

89. In a machine for shaping uppers over lasts, the combination with means for conforming an upper to the contour of the forepart of a last positioned bottom downward and for laying the marginal portion of the upper around the toe inwardly over a sole on the last, of upper-fastening means having a plurality of passages arranged in fixed relation to one another from which to drive fastenings upwardly into the shoe bottom around the end and along the sides of the toe to fasten the upper to the sole, and mechanism for delivering fastenings to said passages, said mechanism comprising transferring devices movable to positions over said upper-fastening means and arranged to deliver respectively the fastenings to be driven around the end of the toe and those to be driven at the sides of the toe.

90. In a machine for shaping uppers over lasts, the combination with means for conforming an upper to the contour of the forepart of a last positioned bottom downward and for laying the marginal portion of the upper around the toe inwardly over a sole on the last, of upper-fastening means comprising a tack holder having a plurality of passages from which to drive tacks upwardly into the shoe bottom around the end and along the sides of the toe to fasten the upper to the sole, and mechanism for delivering tacks to said passages, said mechanism comprising tack-transferring devices each constructed to support a plurality of tacks head downward and movable respectively to positions over different portions of the tack holder for delivering the tacks.

91. In a machine for shaping uppers over lasts, the combination with means for conforming an upper to the contour of the forepart of a last positioned bottom downward and for laying the marginal portion of the upper around the toe inwardly over a sole on the last, of upper-fastening means comprising a tack holder having a plurality of passages from which to drive tacks upwardly into the shoe bottom around the end and along the sides of the toe to fasten the upper to the sole, tack-transferring devices comprising slides mounted respectively at opposite sides of the machine and movable inwardly into positions for delivering tacks respectively to different portions of said tack holder, said slides being constructed to support the tacks head downward, and means for separating tacks point downward and for inverting them and delivering them to said slides.

92. In a machine for shaping uppers over lasts, the combination with means for conforming an upper to the contour of the forepart of a last positioned bottom downward and for laying the marginal portion of the upper around the toe inwardly over a sole on the last, of upper-fastening means comprising a tack holder having a plurality of passages from which to drive tacks upwardly into the shoe bottom around the end and along the sides of the toe to fasten the upper to the sole, tack-transferring devices mounted respectively at opposite sides of the machine and movable into positions to deliver tacks to said tack holder, said devices being arranged to support the tacks head downward, and different mechanisms associated respectively with said different transferring devices for separating tacks point downward and for inverting them and delivering them to said devices.

93. In a power-operated machine for shaping uppers over lasts, the combination with means for conforming an upper to the contour of a last positioned bottom downward and for laying its marginal portion inwardly over a sole on the last, of upper-fastening means for driving a plurality of fastenings upwardly to fasten the marginal portion of the upper to the sole, mechanism movable to a position over said upper-fastening means for delivering fastenings to said means, and automatic means for bringing the machine 94. In a power-operated machine for shaping uppers over lasts, the combination with means for conforming an upper to the contour of a last positioned bottom downward and for laying its marginal portion inwardly over a sole on the last around the toe end of the shoe bottom, of upper-fastening means comprising a device having a plurality of passages from which to drive fastenings upwardly into the shoe bottom around the toe to fasten the upper to the sole, said device being arranged to occupy a position opposite the bottom of the forepart of the shoe when the shoe is presented to the machine, mechanism movable to a position over said device when there is no shoe in the machine for delivering fastenings to said passages, and automatic means for bringing the machine to a stop with said mechanism in delivering position.

95. In a machine for shaping uppers over lasts, the combination with grippers for pulling an upper over the forepart of a last positioned bottom downward, and means for laying the marginal portion of the upper around the toe inwardly over a sole on the last, of upper-fastening means comprising a device having a plurality of passages from which to drive fastenings upwardly into the shoe bottom around the toe to fasten the upper to the sole, said device being arranged to occupy a position opposite the bottom of the forepart of the shoe in the upper-pulling operation, mechanism movable to a position over said device for delivering fastenings to said passages while the grippers are in retracted positions with no shoe in the machine, and means for thereafter withdrawing said mechanism and for moving the grippers into positions to receive the upper of a shoe.

96. In a power-operated machine for shaping uppers over lasts, the combination with grippers for pulling an upper over the forepart of a last positioned bottom downward, and means for laying the marginal portion of the upper around the toe inwardly over a sole on the last, of upper-fastening means comprising a device having a plurality of passages from which to drive fastenings upwardly into the shoe bottom around the toe to fasten the upper to the sole, said device being arranged to occupy a position opposite the bottom of the forepart of the shoe in the upper-pulling operation, mechanism movable to a position over said device for delivering fastenings to said passages while the grippers are in retracted positions with no shoe in the machine, automatic means for bringing the machine to a stop with said mechanism in delivering position, and means for withdrawing said mechanism and for moving the grippers into positions to receive the upper of a shoe when the machine is again started.

97. In a power-operated machine for shaping uppers over lasts, the combination with means for pulling an upper over a last and for then holding it under tension with the machine at rest, of a clutch through which the machine is operated, means for actuating said clutch to start the machine for pulling each upper, and means movable at the will of the operator while the upper is held under tension to cause said clutch to run in the reverse direction and thereby to return the parts to starting positions.

98. In a power-operated machine for shaping uppers over lasts, the combination with means for pulling an upper over a last and for then holding it under tension with the machine at rest, of a main clutch through which the machine is operated, means for actuating said clutch to start the machine for pulling each upper, a secondary clutch for controlling the direction of drive of the main clutch, and means for setting said secondary clutch, while the upper is held under tension, to reverse the direction of drive of the main clutch and thus to cause the main clutch, when next actuated, to return the parts to starting positions.

99. In a power-operated machine for shaping uppers over lasts, the combination with means for pulling an upper over a last and for then holding it under tension with the machine at rest, of a main clutch through which the machine is operated, means for actuating said clutch to start the machine for pulling each upper, a secondary clutch through which said main clutch is driven normally in one direction, means for setting said secondary clutch at the will of the operator, while the upper is held under tension, to reverse the direction of drive of the main clutch and thus to cause the main clutch, when next actuated, to return the parts to starting positions, and automatic means for restoring the secondary clutch to its normal condition upon the completion of the reversal of the machine.

100. In a power-operated machine for shaping uppers over lasts, the combination with means for pulling an upper over a last and for then holding it under tension with the machine at rest, of a main clutch through which the machine is operated, means for actuating said clutch to start the machine for pulling each upper, a secondary clutch through which said main clutch is operated, said secondary clutch comprising a member movable to different positions to cause the main clutch to be driven in forward and reverse directions respectively, a spring for maintaining said member normally in position for the forward drive, and means for moving said member against the resistance of the spring into position for the reverse drive while the upper is held under tension.

101. In a power-operated machine for shaping uppers over lasts, the combination with means for pulling an upper over a last and for then holding it under tension with the machine at rest, of a main clutch through which the machine is operated, means for actuating said clutch to start the machine for pulling each upper, a secondary clutch through which said main clutch is operated, said secondary clutch comprising a member movable to different positions to cause the main clutch to be driven in forward and reverse directions respectively, a spring for maintaining said member normally in position for the forward drive, means for moving said member, while the upper is held under tension, into position for the reverse drive to cause the main clutch, when next actuated, to return the parts to starting positions, means for locking said member in reversing position, and automatic means for releasing said member to permit its return to normal position by the spring upon the completion of the reversal of the machine.

102. In a power-operated machine for shaping uppers over lasts, the combination with means for pulling an upper over a last and for then holding it under tension with the machine at rest, of a clutch through which the machine is operated, said clutch comprising a driven member and a continuously running driving member arranged to operate said driven member when the clutch is actuated, and means movable at the will of the operator to reverse the direction of movement of said driving member while the machine is at rest with the upper under tension to effect return of the parts to starting positions upon the next actuation of the clutch.

103. In a power-operated machine for shaping uppers over lasts, the combination with means for pulling an upper over a last and for then holding it under tension with the machine at rest, of a clutch through which the machine is operated, said clutch comprising a driven member and a continuously running driving member arranged to operate said driven member when the clutch is actuated, means movable at the will of the operator to reverse the direction of movement of said driving member while the machine is at rest with the upper under tension to effect return of the parts to starting positions upon the next actuation of the clutch, and means for preventing such reversal of movement of the driving member until after the pulling of the upper by the upper-pulling means.

104. In a power-operated machine for shaping uppers over lasts, the combination with means for pulling an upper over a last and for then holding it under tension with the machine at rest, of a clutch through which the machine is operated, said clutch comprising a driven member and a continuously running driving member arranged to operate said driven member when the clutch is actuated, means movable at the will of the operator to reverse the direction of movement of said driving member while the machine is at rest with the upper under tension to effect return of the parts to starting positions upon the next actuation of the clutch, and automatic means to cause said driving member again to run in its normal direction after the reversal of the machine.

105. In a power-operated machine for shaping uppers over lasts, the combination with means for pulling an upper over a last and for then holding it under tension with the machine at rest, of a main clutch through which the machine is operated, said clutch comprising a driven member and a continuously running driving member arranged to operate said driven member when the clutch is actuated, a secondary clutch through which said driving member may be turned either in a forward direction or in the reverse direction, and controlling means for normally maintaining said secondary clutch in condition to impart to the driving member its forward movement, said controlling means being movable at the will of the operator while the machine is at rest with the upper under tension to reverse the direction of movement of said driving member for effecting return of the parts to starting positions upon the next actuation of the main clutch.

106. In a power-operated machine for shaping uppers over lasts, the combination with means for pulling an upper over a last and for then holding it under tension with the machine at rest, of a clutch through which the machine is operated, said clutch comprising a driven member and a continuously running driving member arranged to operate said driven member when the clutch is actuated, means movable at the will of the operator to reverse the direction of movement of said driving member while the machine is at rest with the upper under tension to effect return of the parts to starting positions upon the next actuation of the clutch, means for locking said reversing means in reversing position, and automatic means for returning said reversing means to its normal position upon the completion of the reversal of the machine.

107. In a power-operated machine for shaping uppers over lasts, the combination with means for pulling an upper over a last and for then holding it under tension with the machine at rest, and driving means through which the machine is operated, of mechanism movable at the will of the operator while the upper is held under tension to reverse the direction of movement of said driving means for effecting return of the parts to starting positions, and automatic means for returning said reversing mechanism to normal position upon the completion of the reversal of the machine to cause the driving means when next started to run in the normal direction.

108. In a power-operated machine for shaping uppers over lasts, the combination with means for pulling an upper over a last and for then holding it under tension with the machine at rest, and means for laying the marginal portion of the upper inwardly over a sole on the last and for fastening it when the machine is again started, of a clutch through which the machine is operated, said clutch comprising a driven member and a continuously running driving member arranged to operate said driven member when the clutch is actuated, and means movable at the will of the operator to reverse the direction of movement of said driving member while the machine is at rest with the upper under tension to cause the machine, when next started, to return the parts to starting positions instead of completing the cycle.

109. In a power-operated machine for shaping uppers over lasts, the combination with means for pulling an upper over a last and for then holding it under tension with the machine at rest, and means for laying the marginal portion of the upper inwardly over a sole on the last and for fastening it when the machine is again started, of a main clutch through which the machine is operated, a secondary clutch through which said main clutch may be driven either in a forward direction or in the reverse direction, and mechanism movable at the will of the operator while the machine is at rest with the upper under tension to set the secondary clutch for the reverse drive to cause the main clutch, when next actuated, to return the parts to starting positions instead of completing the cycle.

110. In a power-operated machine for shaping uppers over lasts, the combination with means for pulling an upper over a last, means for driving fastenings to fasten the upper, and automatic means for bringing the machine to a stop while the upper is held under tension by the upper-pulling means prior to the driving of the fastenings, of mechanism movable at the will of the operator after the machine has thus come to a stop to reverse the movement of the machine and thereby to return the parts to starting positions, the machine being provided with means for separating fastenings for delivery to the driving means only after that stage of the cycle in which the pulling of the upper is effected.

111. In a machine for shaping uppers over lasts, a gripper arranged to extend heightwise of a last and movable to pull an upper in that direction, said gripper being mounted for inward and outward swinging movements in directions transverse to the edge of the last bottom, and a controlling device relatively to which said gripper is movable heightwise of the last in pulling the upper, said controlling device being constructed to prevent outward swinging movement of the gripper in the upper-pulling operation but including a spring against the resistance of which the gripper may be swung inwardly by the action of the upper thereon.

112. In a machine for shaping uppers over lasts, a gripper arranged to extend heightwise of a last and movable to pull an upper in that direction, said gripper being mounted for inward and outward swinging movements in directions transverse to the edge of the last bottom, and a controlling device relatively to which said gripper is movable heightwise of the last in pulling the upper, said controlling device having means for adjustably determining the limit of outward swinging movement of the gripper and including a spring against the resistance of which the gripper may be swung inwardly by the action of the upper thereon in the upper-pulling operation.

113. In a machine for shaping uppers over lasts, a gripper arranged to extend heightwise of a last and movable to pull an upper in that direction, said gripper being mounted for inward and outward swinging movements in directions transverse to the edge of the last bottom, and a controlling device relatively to which said gripper is movable heightwise of the last in pulling the upper, said controlling device comprising a lever arranged to extend heightwise of the last and mounted for inward and outward swinging movements with the gripper, and a spring arranged to act on said lever to swing the gripper outwardly and against the resistance of which it may be swung inwardly by the action of the upper thereon.

114. In a machine for shaping uppers over lasts, a gripper arranged to extend heightwise of a last and movable to pull an upper in that direction, said gripper being mounted for inward and outward swinging movements in directions transverse to the edge of the last bottom, a lever connected to the gripper and relatively to which the gripper is movable heightwise of the last in pulling the upper, said lever being mounted for inward and outward swinging movements with the gripper, a spring arranged to act on said lever to swing the gripper outwardly, and a stop arranged to act on said lever in opposition to said spring to determine the normal position of the gripper and adjustable to vary that position.

115. In a machine for shaping uppers over lasts, a plurality of grippers for pulling an upper over a last at the toe end and the opposite sides of the last respectively, said grippers being mounted for inward and outward swinging movements in directions transverse to the edge of the last bottom, and controlling devices associated respectively with the different grippers and relatively to which the grippers are movable heightwise of the last to pull the upper, each of said controlling devices including a spring tending to swing the gripper outwardly and against the resistance of which it may be swung inwardly by the action of the upper thereon in the upper-pulling operation.

116. In a machine for shaping uppers over lasts, a plurality of grippers for pulling an upper over a last at the toe end and the opposite sides of the last respectively, said grippers being mounted for inward and outward swinging movements in directions transverse to the edge of the last bottom, and controlling devices associated respectively with the different grippers and relatively to which the grippers are movable heightwise of the last to pull the upper, each of said controlling devices comprising a spring tending to swing the gripper outwardly and a device arranged to cooperate with said spring to determine the normal position of the gripper and adjustable to vary that position.

117. In a machine for shaping uppers over lasts, a gripper arranged to extend heightwise of a last and movable to pull an upper in that direction, and a controlling device supported as a whole at one side of said gripper independently of the gripper and relatively to which the gripper is movable heightwise of the last in pulling the upper, said controlling device being adjustable preliminarily about an axis extending heightwise of the last to turn the gripper and thereby vary its angular relation to the edge of the last bottom.

118. In a machine for shaping uppers over lasts, a gripper arranged to extend heightwise of a last and movable to pull an upper in that direction, and a controlling device supported as a whole at the outer side of said gripper independently of the gripper and relatively to which the gripper is movable heightwise of the last in pulling the upper, said controlling device being adjustable preliminarily to turn the gripper about an axis substantially coincident therewith and extending heightwise of the last to vary its angular relation to the edge of the last bottom.

119. In a machine for shaping uppers over lasts, a gripper arranged to extend heightwise of a last for pulling an upper in that direction, said gripper being mounted for swinging movement in directions transverse to the direction of the pull, a lever arranged to extend heightwise of the last and connected to the gripper for controlling it, said lever being mounted to swing with the gripper, and a support for said lever adjustable about an axis extending heightwise of the last to turn the gripper and thereby vary its angular relation to the edge of the last bottom.

120. In a machine for shaping uppers over lasts, a gripper arranged to extend heightwise of a last for pulling an upper in that direction, said gripper being mounted for inward and outward swinging movements in directions transverse to the edge of the last bottom, a lever arranged to extend heightwise of the last and connected to the gripper, said lever being mounted to swing with the gripper, means for controlling the lever, and a support for said lever and its controlling means adjustable about an axis extending heightwise of the last to turn the gripper and thereby vary its angular relation to the edge of the last bottom.

121. In a machine for shaping uppers over lasts, a gripper arranged to extend heightwise of a last and movable to pull an upper in that direction, said gripper being mounted for swinging movements lengthwise of the edge of the last bottom, and a controlling device connected to the gripper and relatively to which the gripper is movable heightwise of the last in pulling the upper, said controlling device being positioned at the outer side of the gripper and mounted for swinging movements lengthwise of the edge of the last bottom with the gripper.

122. In a machine for shaping uppers over lasts, a gripper arranged to extend heightwise of a last and movable to pull an upper in that direction, said gripper being mounted for swinging movements lengthwise of the edge of the last bottom, and a controlling device supported independently of the gripper and relatively to which the gripper is movable heightwise of the last in pulling the upper, said controlling device being positioned at the outer side of the gripper and mounted for swinging movements lengthwise of the edge of the last bottom about an axis extending in a direction transverse to the height of the last to swing the gripper.

123. In a machine for shaping uppers over lasts, a gripper arranged to extend heightwise of a last for pulling an upper in that direction, said gripper being mounted for inward and outward swinging movements in directions transverse to the edge of the last bottom and also for swinging movements lengthwise of the edge of the last bottom, a device connected to said gripper for swinging it inwardly or outwardly and relatively to which the gripper is movable heightwise of the last in pulling the upper, and means arranged to act through said device to swing the gripper also lengthwise of the edge of the last bottom.

124. In a machine for shaping uppers over lasts, a gripper arranged to extend heightwise of a last for pulling an upper in that direction, said gripper being mounted for inward and outward swinging movements in directions transverse to the edge of the last bottom and also for swinging movements lengthwise of the edge of the last bottom, and a device connected to said gripper for swinging it inwardly or outwardly, said device being mounted to swing about an axis extending in a direction transverse to the height of the last to swing the gripper lengthwise of the edge of the last bottom.

125. In a machine for shaping uppers over lasts, a gripper arranged to extend heightwise of a last for pulling an upper in that direction, said gripper being mounted for inward and outward swinging movements in directions transverse to the edge of the last bottom and also for swinging movements lengthwise of the edge of the last bottom, a lever arranged to extend heightwise of the last at one side of the gripper and connected to the gripper, means arranged to act through said lever to control the gripper with respect to inward and outward swinging movements, and a support for said lever mounted for swinging movement about an axis extending in a direction transverse to the height of the last for controlling the gripper with respect to movements lengthwise of the edge of the last bottom.

126. In a machine for shaping uppers over lasts, a plurality of grippers for pulling an upper over the toe end of a last comprising a central toe gripper and corner toe grippers arranged respectively at opposite sides of the central toe gripper, said grippers being arranged to extend heightwise of the last and the corner toe grippers being adjustably movable relatively to the central gripper each about an axis extending widthwise of the last.

127. In a machine for shaping uppers over lasts, a plurality of grippers for pulling an upper over the toe end of a last comprising a central toe gripper and corner toe grippers arranged respectively at opposite sides of the central toe gripper, said grippers being arranged to extend heightwise of the last and the corner toe grippers being mounted for swinging movements relatively to the central gripper each about an axis extending widthwise of the last, controlling devices associated respectively with the different corner toe grippers and each movable about an axis extending widthwise of the last, and means for adjusting said controlling devices about their axes to vary the positions of the corner toe grippers.

128. In a machine for shaping uppers over lasts, grippers arranged to pull an upper heightwise of a last at the opposite sides of the last respectively, said grippers being mounted for swinging movements lengthwise of the last, controlling devices connected respectively to the different grippers and relatively to which the grippers are movable heightwise of the last in pulling the upper, said controlling devices being mounted for swinging movements about axes extending widthwise of the last, and means for swinging said controlling devices to move the grippers lengthwise of the last.

129. In a machine for shaping uppers over lasts, grippers arranged to pull an upper heightwise of a last at the opposite sides of the last respectively, said grippers being mounted for swinging movements lengthwise of the last, controlling devices connected respectively to the different grippers and relatively to which the grippers are movable heightwise of the last in pulling the upper, said controlling devices being mounted for swinging movements about axes extending widthwise of the last, and manually-operated members connected respectively to the different controlling devices for swinging them and the grippers at the opposite sides of the last lengthwise of the last while the upper is held under tension.

130. In a machine for shaping uppers over lasts, grippers arranged to pull an upper heightwise of a last at the opposite sides of the last respectively, said grippers being mounted for swinging movements lengthwise of the last, levers connected respectively to the different grippers and extending heightwise of the last, said levers being mounted for swinging movements each about an axis extending widthwise of the last, and means arranged to act through said levers to determine the positions of the grippers lengthwise of the last.

131. In a machine for shaping uppers over lasts, front and rear side grippers for pulling an upper over a last at each of the opposite sides of the last, said grippers being mounted for swinging movements lengthwise of the last, controlling devices associated respectively with the different grippers and mounted for swinging movements each about an axis extending widthwise of the last, and means for swinging said controlling devices to vary the positions of the grippers lengthwise of the last.

132. In a machine for shaping uppers over lasts, front and rear side grippers for pulling an upper over a last at each of the opposite sides of the last, said grippers being mounted for swinging movements lengthwise of the last, controlling devices associated respectively with the different grippers and mounted for swinging movements each about an axis extending widthwise of the last, means adjustably connecting the controlling devices for the front and rear side grippers at each side of the last to effect relative adjustments of said grippers lengthwise of the last, and additional means arranged to act through said controlling devices to vary the positions of both the front and rear grippers lengthwise of the last.

133. In a machine for shaping uppers over lasts, front and rear side grippers for pulling an upper over a last at each of the opposite sides of the last, said grippers being mounted for swinging movements lengthwise of the last, levers arranged to extend heightwise of the last and connected respectively to the different grippers, said levers being mounted for swinging movements each about an axis extending widthwise of the last, connections between the levers for the front and rear grippers at each side of the last for effecting relative adjustment of said grippers lengthwise of the last, and additional means arranged to act through said levers to vary the positions of both the front and rear grippers lengthwise of the last.

134. In a machine for shaping uppers over lasts, grippers arranged to pull an upper heightwise of a last at the opposite sides of the last respectively, said grippers being movable lengthwise of the last to pull the upper also in that direction, controlling devices arranged at the outer sides of the respective grippers and movable to impart to the grippers their movements lengthwise of the last, and automatic means for thus operating said controlling devices in the upper-pulling operation.

135. In a machine for shaping uppers over lasts, grippers movable heightwise of a last to pull an upper at the opposite sides of the last respectively, said grippers being mounted for swinging movements lengthwise of the last to pull the upper also in that direction, controlling devices connected respectively to the different grippers and relatively to which the grippers are movable heightwise of the last in the upper-pulling operation, said controlling devices being mounted independently of each other for swinging movements each about an axis extending widthwise of the last to impart to the grippers their upper-pulling movements lengthwise of the last, and automatic means for thus operating said devices.

136. In a machine for shaping uppers over lasts, grippers arranged to pull an upper heightwise of a last at the opposite sides of the last respectively, said grippers being movable lengthwise of the last to pull the upper also in that direction, and automatic means comprising different springs yieldable independently of each other for imparting respectively to the different grippers their upper-pulling movements lengthwise of the last.

137. In a machine for shaping uppers over lasts, grippers arranged to pull an upper heightwise of a last at the opposite sides of the last respectively, said grippers being movable lengthwise of the last to pull the upper also in that direction, controlling devices arranged at the outer sides of the respective grippers and mounted independently of each other for swinging movements lengthwise of the last to impart to the grippers their upper-pulling movements in that direction, and automatic means comprising different springs yieldable independently of each other for thus operating the different respective controlling devices.

138. In a machine for shaping uppers over lasts, grippers arranged to pull an upper heightwise of a last at the opposite sides of the last respectively, said grippers being movable lengthwise of the last to pull the upper also in that direction, lever arms connected respectively, to said different grippers for moving them lengthwise of the last, said arms being relatively movable, other lever arms for operating said first-named arms, and independently yieldable connections between said other arms and the first-named arms.

139. In a machine for shaping uppers over lasts, grippers arranged to pull an upper heightwise of a last at the opposite sides of the last respectively, said grippers being movable lengthwise of the last to pull the upper also in that direction, lever arms connected respectively to said different grippers for moving them lengthwise of the last, other lever arms yieldingly connected to said first-named arms to operate the latter, and a cam-operated lever connected to said other arms to operate them.

140. In a machine for shaping uppers over lasts, grippers arranged to pull an upper heightwise of a last at the opposite sides of the last respectively, said grippers being movable lengthwise of the last to pull the upper also in that direction, and power-operated mechanism movable to impart to the grippers their upper-pulling movements lengthwise of the last and including lever arms connected respectively to the different grippers, said movable mechanism comprising parts relatively adjustable to vary the amount of movement thus imparted to the grippers.

141. In a machine for shaping uppers over lasts, grippers arranged to pull an upper heightwise of a last at the opposite sides of the last respectively, said grippers being movable lengthwise of the last to pull the upper also in that direction, and power-operated mechanism movable to impart to the grippers their upper-pulling movements lengthwise of the last, said movable mechanism comprising parts relatively adjustable to vary the initial positions of the different grippers lengthwise of the last independently of each other.

142. In a machine for shaping uppers over lasts, grippers arranged to pull an upper heightwise of a last at the opposite sides of the last respectively, said grippers being movable lengthwise of the last to pull the upper also in that direction, lever arms connected respectively to said different grippers for moving them lengthwise of the last, other lever arms for operating said first-named arms, and operating connections between said other arms and the first-named arms adjustable to vary the initial positions of the different grippers lengthwise of the last independently of each other.

143. In a machine for shaping uppers over lasts, grippers arranged to pull an upper heightwise of a last at the opposite sides of the last respectively, said grippers being movable lengthwise of the last to pull the upper also in that direction, controlling devices arranged respectively at the outer sides of the different grippers and mounted for swinging movements lengthwise of the last to impart to the grippers their upper-pulling movements in that direction, automatic means for thus operating said controlling devices, and manually-operated members for imparting respectively to said different controlling devices movements to adjust the grippers lengthwise of the last while the upper is held under tension.

144. In a machine for shaping uppers over lasts, grippers arranged to pull an upper heightwise of a last at the opposite sides of the last respectively, said grippers being movable lengthwise of the last to pull the upper also in that direction, levers connected respectively to said different grippers and mounted for swinging movements to impart to the grippers their upper-pulling movements lengthwise of the last, automatic means for operating said levers yieldingly, and manually-operated members connected to said different levers for moving them each independently of the other to adjust the grippers lengthwise of the last while the upper is held under tension.

145. In a machine for shaping uppers over lasts, different grippers for pulling an upper heightwise of a last respectively in different locations along each of the opposite sides of the last, said grippers being movable lengthwise of the last to pull the upper also in that direction, controlling devices, one for each of said grippers, for imparting to them their upper-pulling movements lengthwise of the last, and automatic means for operating said controlling devices.

146. In a machine for shaping uppers over lasts, different grippers for pulling an upper heightwise of a last respectively in different locations along each of the opposite sides of the last, said grippers being movable lengthwise of the last to pull the upper also in that direction, controlling devices arranged respectively at the outer sides of the different grippers and mounted for swinging movements lengthwise of the last to impart to the grippers their upper-pulling movements in that direction, and automatic means for operating said controlling devices.

147. In a machine for shaping uppers over lasts, a pair of grippers for pulling an upper heightwise of a last respectively in different locations along each of the opposite sides of the last, said grippers being movable lengthwise of the last to pull the upper also in that direction, a pair of lever arms connected to each pair of grippers for moving them lengthwise of the last, each pair of lever arms being connected together to swing simultaneously in the same direction, and power-operated means connected to one of the lever arms of each pair to operate them.

148. In a machine for shaping uppers over lasts, a pair of grippers for pulling an upper heightwise of a last respectively in different locations along each of the opposite sides of the last, said grippers being movable lengthwise of the last to pull the upper also in that direction, a pair of lever arms connected to each pair of grippers for moving them lengthwise of the last, means connecting the lever arms of each pair together for simultaneous swinging movements in the same direction, said means being adjustable to vary the distances between the grippers lengthwise of the last, and power-operated means connected to one of the lever arms of each pair for operating them.

149. In a machine for shaping uppers over lasts, a pair of grippers for pulling an upper heightwise of a last respectively in different locations along each of the opposite sides of the last, said grippers being movable lengthwise of the last to pull the upper also in that direction, a pair of lever arms connected to each pair of grippers for moving them lengthwise of the last, means connecting the lever arms of each pair for simultaneous swinging movements in the same direction, power-operated means yieldingly connected to one of the lever arms of each pair for operating them, and manually-operated means connected to said last-named lever arms for moving each pair of grippers lengthwise of the last while the upper is held under tension.

150. In a machine for shaping uppers over lasts, a pair of grippers for pulling an upper heightwise of a last respectively in different locations along each of the opposite sides of the last, said grippers being movable lengthwise of the last to pull the upper also in that direction, automatic means for imparting to the grippers their movements lengthwise of the last, and connections between the different grippers of each pair for relatively adjusting said different grippers lengthwise of the last.

151. In a machine for shaping uppers over lasts, a pair of grippers for pulling an upper heightwise of a last respectively in different locations along each of the opposite sides of the last, said grippers being movable lengthwise of the last to pull the upper also in that direction, connections between the different grippers of each pair for relatively adjusting said different grippers lengthwise of the last, and automatic means for imparting to the different pairs of grippers their movements lengthwise of the last, said automatic means being adjustable to vary the positions of the several grippers lengthwise of the last.

152. In a machine for shaping uppers over lasts, a pair of grippers for pulling an upper heightwise of a last respectively in different locations along each of the opposite sides of the last, said grippers being movable lengthwise of the last to pull the upper also in that direction, connections between the different grippers of each pair for relatively adjusting said different grippers lengthwise of the last, and automatic means comprising different connections to the different respective pairs of grippers for imparting to them their movements lengthwise of the last, said different connections being separately adjustable to vary the positions of the different pairs of grippers lengthwise of the last.

153. In a machine for shaping uppers over lasts, a front side gripper and a rear side gripper for pulling an upper heightwise of a last at each of the opposite sides of the last, said grippers being movable lengthwise of the last to pull the upper also in that direction, automatic means for imparting to said grippers their upper-pulling movements lengthwise of the last, and connections between said front and rear side grippers for adjusting the rear side grippers toward or from the front side grippers each independently of the other.

154. In a machine for shaping uppers over lasts, a front side gripper and a rear side gripper for pulling an upper heightwise of a last at each of the opposite sides of the last, said grippers being movable lengthwise of the last to pull the upper also in that direction, lever arms connected to the different respective grippers for moving them lengthwise of the last, means connecting the lever arm of each front side gripper to the lever arm of the corresponding rear side gripper, said means being movable to adjust the rear side gripper toward or from the front side gripper, and automatic means connected to the lever arms of the front side grippers for moving the several grippers lengthwise of the last.

155. In a machine for shaping uppers over lasts, different grippers for pulling an upper heightwise of a last respectively in different locations along each of the opposite sides of the last, said grippers being movable lengthwise of the last to pull the upper also in that direction, and automatic means for imparting to said grippers movements simultaneously in the same direction lengthwise of the last to pull the upper and for also moving the grippers at each side of the last relatively to each other in that direction.

156. In a machine for shaping uppers over lasts, different grippers for pulling an upper heightwise of a last respectively in different locations along each of the opposite sides of the last, said grippers being mounted for foredrawing movements lengthwise of the last to pull the upper forwardly toward the toe end of the last, and automatic means for imparting to said grippers their foredrawing movements and for also moving the different grippers at each side of the last relatively to each other lengthwise of the last in that operation.

157. In a machine for shaping uppers over lasts, a front side gripper and a rear side gripper for pulling an upper heightwise of a last at each of the opposite sides of the last, said grippers being mounted for foredrawing movements lengthwise of the last to pull the upper forwardly toward the toe end of the last, and automatic means for thus operating the grippers and for imparting to the rear side grippers foredrawing movements of different extent than the movements imparted to the front side grippers.

158. In a machine for shaping uppers over lasts, a front side gripper and a rear side gripper for pulling an upper heightwise of a last at each of the opposite sides of the last, said grippers being mounted for foredrawing movements lengthwise of the last to pull the upper forwardly toward the toe end of the last, and automatic means for thus operating the grippers and for imparting to the rear side grippers foredrawing movements of different extent than the movements imparted to the front side grippers, said means being adjustable to vary the extent of the foredrawing movement of the rear side grippers relatively to that of the front side grippers.

159. In a machine for shaping uppers over lasts, a gripper for pulling an upper over a last, said gripper comprising a pair of jaws relatively movable to grip the upper and also comprising a member rotatable to effect relative closing movement of the jaws, a shaft arranged to extend heightwise of the last and connected at one end to said rotatable member for turning it, means for turning said shaft, and means connected to the other end of said shaft for moving it lengthwise to impart to the gripper upper-pulling movement.

160. In a machine for shaping uppers over lasts, a gripper for pulling an upper over a last, said gripper comprising a pair of jaws relatively movable to grip the upper and also comprising a member rotatable to effect relative closing movement of the jaws, a shaft arranged to extend heightwise of the last and connected at one end to said rotatable member for turning it, said shaft having gear teeth thereon, mechanism engaging said gear teeth to turn the shaft, and lever mechanism connected to the other end of said shaft for moving it lengthwise to impart to the gripper upper-pulling movement.

161. In a machine for shaping uppers over lasts, a plurality of grippers arranged to pull an upper over a last at the toe end of the last, each of said grippers comprising a pair of jaws relatively movable to grip the upper and also comprising a member rotatable about an axis extending heightwise of the last to effect relative closing movement of the jaws, each gripper having also associated therewith a rotatable shaft arranged to extend heightwise of the last and connected at one end to said rotatable member for turning it, and a member common to the several grippers and connected to the other ends of said shafts for moving the shafts and the grippers heightwise of the last to pull the upper.

162. In a machine for shaping uppers over lasts, a plurality of grippers arranged to pull an upper over a last at the toe end of the last, each of said grippers comprising a pair of jaws relatively movable to grip the upper and also comprising a member rotatable about an axis extending heightwise of the last to effect relative closing movement of the jaws, each gripper having also associated therewith a rotatable shaft arranged to extend heightwise of the last and connected at one end to said rotatable member for turning it, a member connected to the other ends of said shafts and relatively to which the shafts are rotatable, and a lever for operating said member to move the shafts and the grippers heightwise of the last to pull the upper.

163. In a machine for shaping uppers over lasts, a pair of grippers for pulling an upper over a last at each of the opposite sides of the last, each of said grippers comprising a pair of jaws relatively movable to grip the upper and also comprising a member rotatable about an axis extending heightwise of the last to effect relative closing movement of the jaws, each of said grippers having also associated therewith a rotatable shaft arranged to extend heightwise of the last and connected at one end to said rotatable member for turning it, and two updraw levers connected respectively to the other ends of the shafts associated with the different respective pairs of grippers for moving said shafts and the grippers heightwise of the last to pull the upper.

164. In a machine for shaping uppers over lasts, a pair of grippers for pulling an upper over a last at each of the opposite sides of the last, each of said grippers comprising a pair of jaws relatively movable to grip the upper and also comprising a member rotatable to effect relative closing movement of the jaws, each of said grippers having also associated therewith a rotatable shaft arranged to extend heightwise of the last and connected at one end to said rotatable member for turning it, an equalizer for each pair of grippers connected to the other ends of the rotatable shafts for moving the shafts and the grippers heightwise of the last to pull the upper while permitting relative movements of the grippers in accordance with differences in the resistance of different portions of the upper to the force of the pull, and members connected respectively to the different equalizers for operating them.

165. In a machine for shaping uppers over lasts, a pair of grippers for pulling an upper over a last at each of the opposite sides of the last, means for closing said grippers on the upper, and additional means for moving the grippers heightwise of the last to pull the upper, said additional means comprising, for each of the opposite pairs of grippers, a member mounted for rocking movement to permit the grippers to move relatively to each other in accordance with differences in the resistance of different portions of the upper to the force of the pull.

166. In a machine for shaping uppers over lasts, the combination with a gripper for pulling an upper over a last, of an updraw lever for operating said gripper to pull the upper, another lever mounted independently of said updraw lever to swing about a different axis, and a spring for operating the updraw lever yieldingly by the movement of said other lever.

167. In a machine for shaping uppers over lasts, the combination with a gripper for pulling an upper over a last, of an updraw lever for operating said gripper to pull the upper, another lever mounted to move relatively to said updraw lever, and a spring for operating the updraw lever yieldingly by the movement of said other lever.

168. In a machine for shaping uppers over lasts, the combination with a gripper for pulling an upper over a last, of an updraw lever for operating said gripper to pull the upper, another lever for operating said updraw lever, a spring arranged to be subjected to stress by the movement of said other lever, a member arranged to be operated through said spring, and a link connection between said member and the updraw lever.

169. In a machine for shaping uppers over lasts, the combination with a gripper for pulling an upper over a last, of an updraw lever for operating said gripper to pull the upper, another lever for operating said updraw lever, a coil spring arranged to be compressed by the movement of said other lever, a rod on which said spring is mounted and relatively to which said other lever is movable to compress the spring, a member mounted on the rod and arranged to be operated through the spring, and a connection between said member and the updraw lever.

170. In a machine for shaping uppers over lasts, the combination with a gripper for pulling an upper over a last, of an updraw lever for operating said gripper to pull the upper, another lever for operating said updraw lever, a coil spring arranged to be compressed by the movement of said other lever, a rod on which said spring is mounted and relatively to which said other lever is movable to compress the spring, a member on said rod connected to the updraw lever, a member carried by said other lever and arranged to be turned by said rod to vary the initial compression of the spring, and manually operated means for turning said rod.

171. In a machine for shaping uppers over lasts, the combination with a gripper for pulling an upper over a last, of an updraw lever for operating said gripper to pull the upper, another lever for operating said updraw lever, a coil spring arranged to be compressed by the movement of said other lever, a rod on which said spring is mounted and relatively to which said other lever is movable to compress the spring, a member on said rod connected to the updraw lever, a member carried by said other lever and arranged to be turned by said rod to vary the initial compression of the spring, and a manually operated member for turning the rod and relatively to which the rod is movable lengthwise in the upper-pulling operation.

172. In a machine for shaping uppers over lasts, the combination with a gripper for pulling an upper over a last, of an updraw lever for operating said gripper to pull the upper, another lever for operating said updraw lever, a coil spring arranged to be compressed by the movement of said other lever, a rod on which said spring is mounted and relatively to which said other lever is movable to compress the spring, a member slidingly mounted on said rod and arranged to be operated through the spring, a positive connection between said member and the updraw lever, the rod having means thereon arranged to act on said member to return the updraw lever to starting position, and positive means for thus operating the rod by reverse movement of said other lever.

173. In a machine for shaping uppers over lasts, the combination with a gripper for pulling an upper over a last, of an updraw lever for operating said gripper to pull the upper, another lever for operating said updraw lever, a coil spring arranged to be compressed by the movement of said other lever, a rod on which said spring is mounted and relatively to which said other lever is movable to compress the spring, a member slidingly mounted on said rod and arranged to be operated through the spring, a positive connection between said member and the updraw lever, and means movable by the operator and arranged to act through said member to move the updraw lever to vary the force of the pull on the upper.

174. In a machine for shaping uppers over lasts, the combination with a gripper for pulling an upper over a last, of an updraw lever for operating said gripper to pull the upper, another lever for operating said updraw lever, a coil spring arranged to be compressed by the movement of said other lever, a rod on which said spring is mounted and relatively to which said other lever is movable to compress the spring, a member slidingly mounted on said rod and arranged to be operated through the spring, a positive connection between said member and the updraw lever, and a lever connected to said member and movable by the operator to vary the force of the pull on the upper.

175. In a machine for shaping uppers over lasts, the combination with a gripper for pulling an upper over a last, of an updraw lever for operating said gripper to pull the upper, another lever for operating said updraw lever, a coil spring arranged to be compressed by the movement of said other lever, a rod on which said spring is mounted and relatively to which said other lever is movable to compress the spring, a member slidingly mounted on said rod and arranged to be operated through the spring, a positive connection between said member and the updraw lever, a lever connected to said member for moving it to vary the force of the pull on the upper, and a manually operated lever connected to said last-named lever for operating it.

176. In a machine for shaping uppers over lasts, the combination with a gripper for pulling an upper over a last, of a lever for operating said gripper to pull the upper, a member movable to operate said lever, a spring for transmitting the force of said member to the lever, another member arranged to be operated through said spring, and a link connection between said other member and the lever.

177. In a machine for shaping uppers over lasts, the combination with a gripper for pulling an upper over a last, of a lever for operating said gripper to pull the upper, a member movable to operate said lever, a spring for transmitting the force of said member to the lever, another member to which said spring applies its force, a link connection between said other member and the lever, and means movable by the operator and connected to said other member for moving the lever to alter the force of the pull on the upper.

178. In a machine for shaping uppers over lasts, the combination with a gripper for pulling the upper over a last, of a lever for operating said gripper to pull the upper, a coil spring through which to operate said lever yieldingly, a rod extending through said spring, a device movable along said rod to compress the spring in the upper-pulling operation, said device including a screw-threaded member mounted for turning movement to vary the compression of the spring, a connection between said member and the rod for turning the member by turning movement of the rod, and manually operated means for turning the rod.

179. In a machine for shaping uppers over lasts, the combination with a gripper for pulling an upper over a last, of a lever for operating said gripper to pull the upper, a coil spring through which to operate said lever yieldingly, a rod extending through said spring, a device movable along said rod to compress the spring in the upper-pulling operation, said device including a screw-threaded member mounted for turning movement to vary the compression of the spring, a connection between said member and the rod for turning the member by turning movement of the rod, the rod being movable lengthwise in the upper-pulling operation, and a device mounted for turning movement by the operator to turn the rod and relatively to which the rod is thus movable lengthwise.

180. In a machine for shaping uppers over lasts, the combination with a gripper for pulling an upper over a last, of a lever for operating said gripper to pull the upper, a coil spring through which to operate said lever yieldingly, a rod extending through said spring, means movable along the rod to compress the spring in the upper-pulling operation, a device on the rod connected to said lever for transmitting the force of the spring to the lever, and manually operated means connected to said device for moving the lever to alter the force of the pull on the upper.

181. In a machine for shaping uppers over lasts, the combination with a gripper for pulling an upper over a last, of a lever for operating said gripper to pull the upper, a coil spring through which to operate said lever yieldingly, a rod extending through said spring, a member on said rod connected to said lever for transmitting the force of the spring to the lever, the rod being movable with said member in the upper-pulling operation, and a device movable along the rod to operate said member through the spring, said device being arranged to act on the rod positively to return the lever to starting position.

182. In a machine for shaping uppers over lasts, the combination with a gripper for pulling an upper over a last positioned bottom downward, of a lever for operating said gripper, a coil spring through which to operate said lever, a rod extending upwardly through said spring at the front portion of the machine, a member movable by turning movement of said rod to vary the compression of the spring, and a manually-operated device at the upper end of said rod for turning it.

183. In a machine for shaping uppers over lasts, grippers for pulling an upper over a last positioned bottom downward at the toe end and at the opposite sides of the last respectively, levers for operating the different respective grippers to pull the upper, springs through which to operate said levers yieldingly, and devices accessible to the operator at the front of the machine for varying the stresses of said different springs.

184. In a machine for shaping uppers over lasts, grippers for pulling an upper over a last positioned bottom downward at the toe end and at the opposite sides of the last respectively, mechanism for operating said grippers yieldingly to pull the upper including springs compressible in the upper-pulling operation, rods extending upwardly at the front of the machine and arranged for turning movements to adjust the compression of the different respective springs, and manually-operated members at the upper ends of said rods for turning them.

185. In a machine for shaping uppers over lasts, grippers for pulling an upper respectively at the toe end and at the opposite sides of a last positioned bottom downward, levers having rearwardly extending arms connected to the different respective grippers and also having arms extending forwardly toward the front of the machine, power-operated means arranged to act yieldingly on said forwardly extending arms to operate said levers, and members accessible to the operator at the front of the machine and connected to said forwardly extending arms to enable the operator to move the different levers to vary the force of the pull of the different respective grippers on the upper.

186. In a machine for shaping uppers over lasts, grippers for pulling an upper respectively at the toe end and at the opposite sides of a last, levers for operating the different respective grippers to pull the upper, means for closing the toe gripper on the upper independently of its operating lever while the side grippers remain open, and automatic means for thereafter closing the side grippers on the upper and for operating the several levers to pull the upper.

187. In a machine for shaping uppers over lasts, grippers for pulling an upper respectively at the toe end and at the opposite sides of a last, levers for operating the different respective grippers to pull the upper, a spring-operated device arranged to be released by the operator to close the toe gripper on the upper independently of its operating lever while the side grippers remain open, and power-operated means for thereafter closing the side grippers on the upper and for operating the several levers to pull the upper.

188. In a power-operated machine for shaping uppers over lasts, grippers for pulling an upper respectively at the toe end and at the opposite sides of a last, levers for operating the different respective grippers to pull the upper power-operated means for closing the side grippers on the upper and for operating the several levers to impart to the toe and side grippers their upper-pulling movements, and a device movable at the will of the operator to close the toe gripper on the upper independently of its operating lever prior to the starting of the power operation of the machine.

189. In a power-operated machine for shaping uppers over lasts, grippers for pulling an upper respectively at the toe end and at the opposite sides of a last, levers for operating the different respective grippers to pull the upper, and power-operated means for closing the toe and side grippers on the upper and for operating the several levers to pull the upper, said power-operated means including a device movable at the will of the operator prior to the starting of the power operation of the machine to close the toe gripper on the upper independently of its operating lever while the side grippers remain open.

190. In a power-operated machine for shaping uppers over lasts, grippers for pulling an upper respectively at the toe end and at the opposite sides of a last, levers for operating the different respective grippers to pull the upper, power-operated means for closing the side grippers on the upper and for operating the several levers to pull the upper, a spring-operated device arranged to be released by the operator prior to the starting of the power operation of the machine to close the toe gripper on the upper independently of its operating lever while the side grippers remain open, and means to enable the operator to move said device reversely to open the toe gripper.

191. In a machine for shaping uppers over lasts, a central toe gripper and corner toe grippers for pulling an upper over a last respectively at the end of the toe and at the corners of the toe, a lever common to said grippers for operating them to pull the upper, means for closing the central toe gripper on the upper while the corner toe grippers remain open, and means for thereafter closing the corner toe grippers and for operating said lever to pull the upper.

192. In a machine for shaping uppers over lasts, a central toe gripper and corner toe grippers for pulling an upper over a last respectively at the end of the toe and at the corners of the toe, a lever common to said grippers for operating them to pull the upper, a spring-operated device arranged to be released by the operator to close the central toe gripper on the upper while the corner toe grippers remain open, and power-operated means for thereafter automatically closing the corner toe grippers and for operating said lever to pull the upper.

193. In a machine for shaping uppers over lasts, means for pulling an upper over a last comprising a toe gripper and opposite side grippers each having jaws relatively moveable to grip the upper and each having a jaw-closing member rotatable about an axis extending in the general direction of the pull on the upper to effect relative closing movement of the jaws, means for operating the jaw-closing member of the toe gripper to close the jaws of that gripper on the upper while the other gripper jaws remain open, and means for thereafter operating the other jaw-closing members and for effecting the upper-pulling operation.

194. In a power-operated machine for shaping uppers over lasts, means for pulling an upper over a last comprising a toe gripper and opposite side grippers each having jaws relatively movable to grip the upper and each having a jaw-closing member rotatable about an axis extending in the general direction of the pull on the upper to effect relative closing movement of the jaws, power-operated means for operating the side gripper jaw-closing members and for effecting the upper-pulling operation, and means for operating the toe gripper jaw-closing member to close the jaws of that gripper on the upper prior to the starting of the power operation of the machine.

195. In a power-operated machine for shaping uppers over lasts, means for pulling an upper over a last comprising a toe gripper and opposite side grippers each having jaws relatively movable to grip the upper and each having a jaw-closing member rotatable about an axis extending in the general direction of the pull on the upper to effect relative closing movement of the jaws, power-operated means for operating the side gripper jaw-closing members and for effecting the upper-pulling operation, and a spring-operated device arranged to be released by the operator for operating the toe gripper jaw-closing member to close the jaws of that gripper on the upper prior to the starting of the power operation of the machine.

196. In a power-operated machine for shaping uppers over lasts, means for pulling an upper over a last comprising a toe gripper and opposite side grippers each having jaws relatively movable to grip the upper and each having a jaw-closing member rotatable about an axis extending in the general direction of the pull on the upper to effect relative closing movement of the jaws, power-operated means for operating the side gripper jaw-closing members and for effecting the upper-pulling operation, spring-operated means for operating the toe gripper jaw-closing member to close the jaws of that gripper on the upper prior to the starting of the power operation of the machine, and means to enable the operator at will to open the toe gripper jaws after they have thus been closed and before the machine is started.

197. In a machine for shaping uppers over lasts, means for pulling an upper over a last comprising a toe gripper and opposite side grippers each having jaws relatively movable to grip the upper and each having a jaw-closing member rotatable about an axis extending in the general direction of the pull on the upper to effect relative closing movement of the jaws, a rack bar for turning the toe gripper jaw-closing member, and means for operating said rack bar to close the toe gripper jaws while the other gripper jaws remain open.

198. In a machine for shaping uppers over lasts, means for pulling an upper over a last comprising a toe gripper and opposite side grippers each having jaws relatively movable to grip the upper and each having a jaw-closing member rotatable about an axis extending in the general direction of the pull on the upper to effect relative closing movement of the jaws, a rack bar for turning the toe gripper jaw-closing member, a spring for operating said rack bar, and a device movable at the will of the operator to release said rack bar to the action of its spring for closing the toe gripper jaws while the other gripper jaws remain open.

199. In a machine for shaping uppers over lasts, means for pulling an upper over a last comprising a toe gripper and opposite side grippers each having jaws relatively movable to grip the upper and each having a jaw-closing member rotatable about an axis extending in the general direction of the pull on the upper to effect relative closing movement of the jaws, a rack bar for turning the toe gripper jaw-closing member, a member movable with said rack bar to operate it, a latch for holding the rack bar in fixed relation to said member, said latch being movable at the will of the operator to release the rack bar, and a spring for moving the rack bar to close the toe gripper jaws when the rack bar is thus released.

200. In a machine for shaping uppers over lasts, means for pulling an upper over a last comprising a toe gripper and opposite side grippers each having jaws relatively movable to grip the upper and each having a jaw-closing member rotatable about an axis extending in the general direction of the pull on the upper to effect relative closing movement of the jaws, a rack bar for turning the toe gripper jaw-closing member, a member movable with said rack bar to operate it, a latch for holding the rack bar in fixed relation to said member, said latch being movable at the will of the operator to release the rack bar, a spring for moving the rack bar to close the toe gripper jaws when it is thus released, and means to enable the operator to return the rack bar into position to be held by said latch and thus to open the toe gripper jaws.

201. In a machine for shaping uppers over lasts, means for pulling an upper over a last comprising a toe gripper and opposite side grippers each having jaws relatively movable to grip the upper and each having a jaw-closing member rotatable about an axis extending in the general direction of the pull on the upper to effect relative closing movement of the jaws, a rack bar for turning the toe gripper jaw-closing member, a member movable with said rack bar to operate it, a latch for holding the rack bar in fixed relation to said member, said latch being movable at the will of the operator to release the rack bar, a spring for moving said rack bar to close the toe gripper jaws when it is thus released, and means for thereafter moving said member into position to latch it again to the rack bar and for returning it with the rack bar to open the toe gripper jaws.

202. In a machine for shaping uppers over lasts, a plurality of grippers for pulling an upper over a last comprising a central toe gripper, corner toe grippers, and side grippers, each of said grippers comprising a pair of jaws relatively movable to grip the upper and also comprising a member rotatable about an axis extending heightwise of the last to effect relative closing movement of the jaws, each gripper having also associated therewith a rotatable shaft arranged to extend heightwise of the last for turning said rotatable member and having gear teeth thereon for operating it, two rack bars arranged to operate respectively the shafts associated with the opposite side grippers, each of said rack bars being arranged to operate also one of the corner toe gripper shafts, and additional means for operating the shaft associated with the central toe gripper.

203. In a machine for shaping uppers over lasts, a gripper for pulling an upper over a last, said gripper comprising a pair of jaws relatively movable to grip the upper and a member movable to effect relative closing movement of said jaws, said member being provided with wedge faces extending respectively in different angular relations to the direction of its movement and arranged to act successively to effect the relative jaw-closing movement.

204. In a machine for shaping uppers over lasts, a gripper for pulling an upper over a last, said gripper comprising a pair of jaws relatively movable to grip the upper and a member mounted for rectilinear movement to effect relative closing movement of said jaws, said member having thereon a wedge face arranged to effect initial jaw-closing movement and another wedge face arranged to act thereafter with increased mechanical advantage to increase the gripping pressure of the jaws on the upper.

205. In a machine for shaping uppers over lasts, a gripper for pulling an upper over a last, said gripper comprising a casing, a pair of jaws one of which is fixed on the casing and the other mounted for movement toward and from the fixed jaw, and a member in the casing mounted for rectilinear movement to impart to the movable jaw its upper-gripping movement, said member having thereon a wedge face arranged to impart initial gripping movement to said jaw and another wedge face extending more nearly parallel to the direction of its movement than said first-named wedge face to force the jaw more firmly against the upper.

206. In a machine for shaping uppers over lasts, a gripper for pulling an upper over a last, said gripper comprising a casing, a pair of jaws one of which is fixed on the casing and the other movable toward and from the fixed jaw, and a wedge member mounted for rectilinear movement in said casing toward the pair of jaws to impart to the movable jaw its upper-gripping movement, said member being so formed as to impart a comparatively quick initial movement to the movable jaw and thereafter to act with increased mechanical advantage to wedge the jaw more firmly against the upper.

207. In a machine for shaping uppers over lasts, a gripper for pulling an upper over a last, said gripper comprising a pair of jaws relatively movable to grip the upper and also a jaw-closing member movable to effect relative closing movement of the jaws, another member included in the gripper and movable to operate said jaw-closing member, and a spring for transmitting movement yieldingly to the jaw-closing member from said other member, said spring being yieldable in response to further movement of said other member after movement of said jaw-closing member is stopped by resistance of the upper.

208. In a machine for shaping uppers over lasts, a gripper for pulling an upper over a last, said gripper comprising a pair of jaws relatively movable to grip the upper and also a jaw-closing member movable to effect relative closing movement of the jaws, another member included in the gripper and movable in the same direction as said jaw-closing member to operate the latter, and a spring between said members for operating the jaw-closing member yieldingly by the movement of said other member, said spring being yieldable in response to further movement of said other member after movement of said jaw-closing member is stopped by resistance of the upper.

209. In a machine for shaping uppers over lasts, a gripper for pulling an upper over a last, said gripper comprising a pair of jaws relatively movable to grip the upper and also a jaw-closing member movable to effect relative closing movement of the jaws, another member included in the gripper and movable to operate said jaw-closing member, a spring for transmitting movement yieldingly to the jaw-closing member from said other member, said spring being compressible by movement of said other member toward the jaw-closing member, and means for limiting relative separating movement of said members to maintain the spring initially under compression.

210. In a machine for shaping uppers over lasts, a gripper for pulling an upper over a last, said gripper comprising a pair of jaws relatively movable to grip the upper and also a jaw-closing member movable bodily toward both said jaws to effect relative closing movement of the jaws, another member included in the gripper and movable toward said jaws to operate the jaw-closing member, and a spring for transmitting movement yieldingly to the jaw-closing member from said other member.

211. In a machine for shaping uppers over lasts, a gripper for pulling an upper over a last, said gripper comprising a casing, a pair of jaws supported on said casing and relatively movable to grip the upper, a jaw-closing member in said casing mounted for rectilinear movement relatively to both said jaws to effect relative closing movement of the jaws, another member in the casing mounted for movement in the same direction as said jaw-closing member to operate the latter, and a spring for transmitting movement yieldingly to the jaw-closing member from said other member.

212. In a machine for shaping uppers over lasts, a gripper for pulling an upper over a last, said gripper comprising a casing, a pair of jaws supported on said casing and relatively movable to grip the upper, a jaw-closing member in said casing mounted for rectilinear movement to effect relative closing movement of the jaws, another member in the casing mounted for movement in the same direction as said jaw-closing member to operate the latter, a spring for transmitting movement yieldingly to the jaw-closing member from said other member, and positive means for imparting to said jaw-closing member retractive movement by the movement of the other member.

213. In a machine for shaping uppers over lasts, a gripper for pulling an upper over a last, said gripper comprising a pair of jaws relatively movable to grip the upper and also a jaw-closing member mounted for rectilinear movement to effect relative closing movement of the jaws, another member included in the gripper and movable in the same direction as said jaw-closing member to operate the latter, a spring for transmitting movement yieldingly to the jaw-closing member from said other member, and a member also included in the gripper and mounted for turning movement about an axis extending in the direction of the movement of said other member for imparting to the latter its movement.

214. In a machine for shaping uppers over lasts, a gripper for pulling an upper over a last, said gripper comprising a pair of jaws relatively movable to grip the upper and also a jaw-closing member movable toward said jaws to effect relative closing movement of the jaws, another member included in the gripper and movable in the same direction as said jaw-closing member to operate the latter, a spring between said members for operating the jaw-closing member yieldingly by the movement of said other member, and a member rotatable in the gripper about an axis extending in the direction of the movement of said other member for imparting to the latter its movement.

215. In a machine for shaping uppers over lasts, a gripper for pulling an upper over a last, said gripper comprising a casing, a pair of jaws supported on said casing and relatively movable to grip the upper, a jaw-closing member in said casing movable to effect relative closing movement of the jaws, another member in the casing movable to operate said jaw-closing member, a spring for transmitting movement yieldingly to the jaw-closing member from said other member, and a device having screw-threaded connection with said other member and rotatable to impart to said member its operative movement.

216. In a machine for shaping uppers over lasts, a gripper for pulling an upper over a last, said gripper comprising a pair of jaws relatively movable to grip the upper and also a member mounted for rectilinear movement to effect relative closing movement of the jaws, another member in the gripper mounted for turning movement and provided with means for thereby operating said first-named member, and means constructed to act on said other member in its turning movement to move it bodily in a direction to accelerate the closing of the jaws.

217. In a machine for shaping uppers over lasts, a gripper for pulling an upper over a last, said gripper comprising a pair of jaws relatively movable to grip the upper and also a member movable to effect relative closing movement of the jaws, another member included in the gripper and mounted for turning movement about an axis extending substantially in the direction of the movement of said first-named member to operate the latter, and means for imparting to said other member in response to its turning movement bodily movement in the direction of its axis to accelerate the closing of the jaws.

218. In a machine for shaping uppers over lasts, a gripper for pulling an upper over a last, said gripper comprising a pair of jaws relatively movable to grip the upper, a rotatable member having oppositely inclined faces extending about its axis, and different members operatively engaged respectively by said different faces, one of said last-named members being movable rectilinearly by the turning of said rotatable member to effect relative closing movement of the jaws, and the other member being arranged to effect rectilinear movement of said rotatable member in response to the turning movement of the latter to accelerate the closing of the jaws.

219. In a machine for shaping uppers over lasts, a gripper for pulling an upper over a last, said gripper comprising a casing, a pair of jaws on said casing relatively movable to grip the upper, a member mounted for rectilinear movement in said casing to effect relative closing movement of the jaws, a rotatable member in screw-threaded engagement with said first-named member for operating the latter by its turning movement, and a nut mounted in substantially fixed relation to said casing and having screw-threaded engagement with said rotatable member for moving the latter rectilinearly in response to its turning movement to accelerate the closing of the jaws.

220. In a machine for shaping uppers over lasts, a gripper for pulling an upper over a last, said gripper comprising a casing, a pair of jaws on said casing relatively movable to grip the upper, a member rotatab'e in said casing and having oppositely inclined screw threads thereon, different members engaged respectively by the different screw threads, one of said last-named members being movable by the turning of said rotatable member to effect relative closing movement of the jaws, the other member being arranged to impart to the rotatable member bodily movement in the same direction as said first-named member in response to the turning of the rotatable member, and an operating member engaging the rotatable member for turning it and relatively to which it is movable bodily as it is turned.

221. In a machine for shaping uppers over lasts, wipers for wiping the marginal portion of an upper about the toe end of a last inwardly over the bottom of the last, an upwiping device for wiping the upper about the toe heightwise of the last, and a common support for said wipers and upwiping device movable lengthwise of the last to carry said device toward the toe and also to impart thereafter to the wipers wiping movement in that direction.

222. In a machine for shaping uppers over lasts, wipers for wiping the marginal portion of an upper about the toe end of a last inwardly over the bottom of the last, an upwiping device comprising a flexible band for embracing the upper about the toe and for wiping it heightwise of the last, and a common support for said wipers and upwiping device movable lengthwise of the last to carry said band toward the toe and also to impart thereafter to the wipers wiping movement in that direction.

223. In a machine for shaping uppers over lasts, wipers for wiping the marginal portion of an upper about the toe end of a last inwardly over the bottom of the last, an upwiping device for wiping the upper about the toe heightwise of the last, and a common support for said wipers and upwiping device movable lengthwise of the last to carry said device toward the toe and also to impart to the wipers wiping movement in that direction, said support being also movable heightwise of the last to effect the upwiping operation.

224. In a machine for shaping uppers over lasts, wipers for wiping the marginal portion of an upper about the toe end of a last inwardly over the bottom of the last, an upwiping device for wiping the upper about the toe heightwise of the last, a common support for said wipers and upwiping device, and automatic means for moving said support lengthwise of the last to carry said device and the wipers toward the toe and for thereafter further moving it in the same direction to impart to the wipers wiping movement lengthwise of the last.

225. In a machine for shaping uppers over lasts, wipers for wiping the marginal portion of an upper about the toe end of a last inwardly over the bottom of the last, an upwiping device for wiping the upper about the toe heightwise of the last, and a common support for said wipers and upwiping device movable lengthwise of the last to carry said device and the wipers toward the toe and thereafter to impart to the wipers wiping movement in that direction, the upwiping device being also movable lengthwise of the last relatively to said support to apply pressure to the upper.

226. In a machine for shaping uppers over lasts, a wiper carrier, wipers supported on said wiper carrier for wiping the marginal portion of an upper about the toe end of a last inwardly over the bottom of the last, an upwiping device also supported on said wiper carrier for wiping the upper about the toe heightwise of the last, mechanism for moving said wiper carrier lengthwise of the last to carry the wipers and the upwiping device toward the toe and also to impart wiping movement lengthwise of the last to the wipers, and mechanism for also moving said upwiping device lengthwise of the last independently of the wiper carrier.

227. In a machine for shaping uppers over lasts, a wiper carrier, wipers supported on said wiper carrier for closing movements toward each other to wipe the marginal portion of an upper about the toe end of a last inwardly over the bottom of the last, mechanism for moving said wiper carrier lengthwise of the last to impart to the wipers wiping movement in that direction, an upwiping device also supported on said wiper carrier for wiping the upper about the toe heightwise of the last, mechanism movably mounted on said wiper carrier for forcing said upwiping device against the upper both lengthwise and laterally of the last, and means for moving said wiper carrier heightwise of the last to effect the upwiping operation.

228. In a machine for shaping uppers over lasts, a wiper carrier, wipers supported on said wiper carrier for closing movements toward each other to wipe the marginal portion of an upper about the toe end of a last inwardly over the bottom of the last, mechanism for moving said wiper carrier lengthwise of the last to impart to the wipers wiping movement in that direction, a slide supported on said wiper carrier and movable relatively to said carrier lengthwise of the last, an upwiping device carried by said slide for embracing the upper about the toe and wiping it heightwise of the last, mechanism for operating said slide to press the upwiping device against the upper, and mechanism for moving the wiper carrier heightwise of the last to impart to the upwiping device its upwiping movement.

229. In a machine for shaping uppers over lasts, a wiper carrier, wipers supported on said wiper carrier for wiping the marginal portion of an upper about the toe end of a last inwardly over the bottom of the last, an upwiping device also supported on said wiper carrier for wiping the upper about the toe heightwise of the last, mechanism for moving said wiper carrier lengthwise of the last to carry the wipers and the upwiping device toward the toe, a slide supporting said upwiping device on the wiper carrier and movable lengthwise of the last relatively to the carrier to force the device against the upper, and mechanism for operating said slide after the upwiping device has been moved toward the toe by the wiper carrier.

230. In a machine for shaping uppers over lasts, a wiper carrier, wipers supported on said wiper carrier for closing movements toward each other to wipe the marginal portion of an upper about the toe end of a last inwardly over the bottom of the last, mechanism for moving said wiper carrier lengthwise of the last to impart to the wipers wiping movement in that direction, an upwiping device also supported on said wiper carrier for embracing the upper about the toe and wiping it heightwise of the last, said upwiping device being movable toward the toe with the wiper carrier, and mechanism supported on the wiper carrier and movable relatively thereto to force the upwiping device against the toe after it has thus been moved toward the toe.

231. In a machine for shaping uppers over lasts, a wiper carrier, wipers supported on said wiper carrier for closing movements toward each other to wipe the marginal portion of an upper about the toe end of a last inwardly over the bottom of the last, mechanism for moving said wiper carrier lengthwise of the last to impart to the wipers wiping movement in that direction, an upwiping device also supported on said wiper carrier for embracing the upper about the toe and wiping it heightwise of the last, said upwiping device being movable toward the toe with the wiper carrier, lever mechanism supported on the wiper carrier and movable to force the upwiping device against the toe after it has thus been moved toward the toe, and cam means for operating said lever mechanism.

232. In a machine for shaping uppers over lasts, a wiper carrier, wipers supported on said wiper carrier for closing movements toward each other to wipe the marginal portion of an upper about the toe end of a last inwardly over the bottom of the last, an upwiping device also supported on said wiper carrier for embracing the upper about the toe and wiping it heightwise of the last, mechanism for moving said wiper carrier lengthwise of the last to carry the wipers and the upwiping device toward the toe, a slide supporting said upwiping device on the wiper carrier, mechanism supported on the wiper carrier for moving said slide lengthwise of the last toward the toe, and mechanism supported on said slide for closing the upwiping device inwardly against the sides of the toe.

233. In a machine for shaping uppers over lasts, a wiper carrier, wipers supported on said wiper carrier for closing movements toward each other to wipe the marginal portion of an upper about the toe end of a last inwardly over the bottom of the last, an upwiping device also supported on said wiper carrier for embracing the upper about the toe and wiping it heightwise of the last, mechanism for moving said wiper carrier lengthwise of the last to carry the wipers and the upwiping device toward the toe, a slide supporting said upwiping device on the wiper carrier, lever mechanism supported on the wiper carrier for moving said slide lengthwise of the last toward the toe, lever mechanism supported on said slide for closing the upwiping device inwardly against the sides of the toe, and cams for operating said different lever mechanisms.

234. In a machine for shaping uppers over lasts, wipers for wiping the marginal portion of an upper about an end of a last inwardly over the bottom of the last, a device for clamping the upper against the last around the end thereof, a common support for said wipers and clamping device movable lengthwise of the last to carry said device toward the last and also to impart to the wipers wiping movement lengthwise of the last, and additional means for moving said clamping device lengthwise of the last relatively to said support.

235. In a machine for shaping uppers over lasts, wipers for wiping the marginal portion of an upper about an end of a last inwardly over the bottom of the last, a device for clamping the upper against the last around the end thereof, a common support for said wipers and clamping device movable lengthwise of the last to carry said device toward the last and also to impart to the wipers wiping movement lengthwise of the last, mechanism movably mounted on said support for forcing said clamping device forwardly against the upper at the end of the last, and additional mechanism for closing said device against the upper at the sides of the last.

236. In a machine for shaping uppers over lasts, a wiper carrier, wipers supported on said wiper carrier for closing movements toward each other to wipe the marginal portion of an upper about an end of a last inwardly over the bottom of the last, mechanism for moving said wiper carrier lengthwise of the last to impart to the wipers wiping movement in that direction, a device also supported on said wiper carrier and movable therewith toward the last for clamping the upper about the end of the last, a slide on which said clamping device is mounted, and means for moving said slide lengthwise of the last relatively to the wiper carrier to press the clamping device against the upper prior to the wiping operation.

237. In a machine for shaping uppers over lasts, a wiper carrier, wipers supported on said wiper carrier for closing movements toward each other to wipe the marginal portion of an upper about an end of a last inwardly over the bottom of the last, mechanism for moving said wiper carrier lengthwise of the last to impart to the wipers wiping movement in that direction, a device also supported on said wiper carrier and movable therewith toward the last for clamping the upper about the end of the last, a slide on which said clamping device is mounted, mechanism movably supported on the wiper carrier for advancing said slide to force the clamping device against the upper at the end of the last prior to the wiping operation, and mechanism movably supported on said slide for closing the clamping device inwardly against the upper at the sides of the last.

238. In a machine for shaping uppers over lasts, an upwiping device for wiping an upper around the toe end of a last heightwise of the last, said device comprising a flexible band for embracing the upper around the toe, a plurality of coil springs and members controlled thereby for pressing the band yieldingly against the upper in different locations along the band at each of the opposite side portions of the toe, relatively movable members in which said spring-controlled members are slidingly mounted, and means for effecting relative movement of said upwiping device and the last heightwise of the last to effect the upwiping operation.

239. In a machine for shaping uppers over lasts, an upwiping device for wiping an upper around the toe end of a last heightwise of the last, said device comprising a flexible band for embracing the upper around the toe, a plurality of springs arranged to press the band yieldingly against the upper in different locations along the band at each of the opposite side portions of the toe, members mounted for inward movements toward the sides of the last and arranged to act through said springs to press the band against the upper, and means for effecting relative movement of said upwiping device and the last heightwise of the last to effect the upwiping operation.

240. In a machine for shaping uppers over lasts, an upwiping device for wiping an upper around the toe end of a last heightwise of the last, said device comprising a flexible band for embracing the upper around the toe, a pair of members mounted for closing movements inwardly toward the sides of the toe each about an axis extending heightwise of the last, spring-controlled plungers mounted in recesses in said members and arranged to act on the band in different locations about the toe to press the band against the upper, and means for effecting relative movement of said upwiping device and the last heightwise of the last to effect the upwiping operation.

241. In a machine for shaping uppers over lasts, an upwiping device for wiping an upper around the toe end of a last heightwise of the last, said device comprising a flexible band for embracing the upper around the toe, members mounted for closing movements inwardly toward the sides of the toe, a plurality of spring-pressed plungers controlled by said members and arranged to press the band yieldingly against the upper in different locations along the opposite side portions of the toe as the members are closed, an additional spring-controlled plunger mounted independently of said members for pressing the band against the upper at the extreme end of the toe, and means for effecting relative movement of said upwiping device and the last heightwise of the last to effect the upwiping operation.

242. In a machine for shaping uppers over lasts, an upwiping device for wiping an upper around the toe end of a last heightwise of the last, said device comprising a flexible band for embracing the upper around the toe, members mounted for swinging movements laterally of the toe, a plurality of spring-pressed plungers controlled by said members for pressing the band against the upper in response to the closing movements of the members, a support on which said members are mounted for closing movements, means for moving said support lengthwise of the last to assist in pressing the band against the upper, an additional spring-pressed plunger mounted in said support for pressing the band against the upper at the extreme end of the toe, and means for effecting relative movement of said upwiping device and the last heightwise of the last to effect the upwiping operation.

243. In a machine for shaping uppers over lasts, a flexible band for clamping an upper about an end of a last, members mounted for closing movements inwardly about the end of the last, a plurality of yieldable pressers controlled by said members and arranged to press the band against the upper in different locations along the opposite side portions of the last, and an additional yieldable presser mounted independently of said members for pressing the band against the upper at the extreme end of the last.

244. In a machine for shaping uppers over lasts, a flexible band for clamping an upper about an end of a last, members mounted for closing movements inwardly about the end of the last, a plurality of spring-controlled plungers mounted in recesses in said members and arranged to press the band against the upper in different locations along the opposite side portions of the last, a support on which said members are mounted for closing movements, and an additional spring-controlled plunger mounted in said support for pressing the band against the upper at the extreme end of the last.

245. In a machine for shaping uppers over lasts, a flexible band for embracing an upper about an end of a last, members mounted for closing movements inwardly around the end of the last each about an axis extending heightwise of the last, a plurality of spring-pressed plungers controlled by said members for pressing the band against the upper in different locations along the band in response to the closing movements of the members, and an additional spring-pressed plunger mounted independently of said members for pressing the band against the upper at the extreme end of the last.

246. In a machine for shaping uppers over lasts, a flexible band for embracing an upper about an end of a last, members mounted for closing movements inwardly around the end of the last each about an axis extending heightwise of the last, a plurality of spring-pressed plungers controlled by said members for pressing the band against the upper in different locations along the band in response to the closing movements of the members, a support on which said members are mounted for closing movements, and means for moving said support lengthwise of the shoe to assist in pressing the band against the upper.

247. In a machine for shaping uppers over lasts, a flexible band for embracing an upper about an end of a last, members mounted for closing movements inwardly around the end of the last each about an axis extending heightwise of the last, a plurality of spring-pressed plungers controlled by said members for pressing the band against the upper in different locations along the band in response to the closing movements of the members, a support on which said members are mounted for closing movements, mechanism for moving said support lengthwise of the last to assist in pressing the band against the upper, and additional mechanism for closing said members around the end of the last.

248. In a machine for shaping uppers over lasts, a flexible band for embracing an upper about an end of a last, members mounted for closing movements inwardly around the end of the last each about an axis extending heightwise of the last, a plurality of spring-pressed plungers controlled by said members for pressing the band against the upper in different locations along the band in response to the closing movements of the members, a support on which said members are mounted for closing movements, means for moving said support lengthwise of the last to assist in pressing the band against the upper, and an additional spring-pressed plunger mounted in said support for pressing the band against the upper at the extreme end of the last.

249. In a machine for shaping uppers over lasts, a flexible band for embracing an upper about an end of a last, and mechanism comprising a plurality of coil springs and members controlled thereby for applying said band about the end of the last and for pressing it against the upper in different locations along the band at the opposite sides of the last, said band and members being relatively movable lengthwise of the band as the band is thus applied to the upper.

250. In a machine for shaping uppers over lasts, a flexible band for clamping an upper about an end of a last, a spring-controlled plunger to which the band is fastened substantially midway between its opposite ends, said plunger being arranged to press the band against the upper at the extreme end of the last, and mechanism comprising a plurality of additional spring-controlled plungers for applying the band about the end of the last and for pressing it against the upper at the opposite sides of the last, said additional plungers and the band being relatively movable lengthwise of the band as the band is thus applied about the end of the last.

251. In a machine for shaping uppers over lasts, a flexible band for embracing an upper about the toe end of a last and for wiping it heightwise of the toe, a spring-controlled plunger arranged to press said band against the upper at the extreme end of the toe, means for fastening the band to said plunger, and a plurality of additional spring-controlled plungers for applying the band about the toe and for pressing it against the upper at the sides of the toe, said additional plungers and the band being relatively movable lengthwise of the band as the band is thus applied, and means on said additional plungers for engaging an edge of the band to hold it against displacement in wiping the upper heightwise of the toe.

252. In an upper-shaping machine, the combination with means for shaping an upper over a last, of a shoe holder arranged to act on the shoe to support it against pressure applied on its bottom face, said holder being movable by the operator heightwise of the shoe substantially into operative position, and automatic means for thereafter forcing said holder firmly against the shoe.

253. In an upper-shaping machine, the combination with means for shaping an upper over a last, of a shoe holder arranged to act on the shoe to support it against pressure applied on its bottom face, said holder being movable by the operator heightwise of the shoe substantially into operative position, a member for retaining the holder in the position to which it is moved by the operator, and automatic means arranged to act through said member to force the holder firmly against the shoe.

254. In an upper-shaping machine, the combination with means for shaping an upper over a last, of a shoe holder arranged to act on the shoe at the top of the forepart to support it against pressure applied on its bottom face, said holder being movable by the operator heightwise of the shoe substantially into operative position, a latch arranged to act automatically to retain the holder in the position to which it is moved by the operator, and means for imparting to said latch movement to force the holder firmly against the shoe.

255. In an upper-shaping machine, the combination with means for shaping an upper over a last, of a shoe holder arranged to act on the shoe at the top of the forepart to support it against pressure applied on its bottom face, a lever supporting said holder and movable by the operator heightwise of the shoe to carry the holder substantially into operative position, a member for retaining the lever in the position to which it is moved by the operator, and another lever supporting said retaining member and arranged to operate the first-named lever to force the holder firmly against the shoe.

256. In an upper-shaping machine, the combination with means for shaping an upper over the forepart of a last, of a shoe holder arranged to act on the shoe at the top of the forepart to support it against pressure applied on its bottom face, said holder being mounted for swinging movement heightwise of the shoe by the operator substantially into operative position, a latch arranged to act automatically to retain the holder in the position to which it is moved by the operator, a lever arranged to act through said latch to force the holder firmly against the shoe, and means for operating said lever.

257. In an upper-shaping machine, the combination with means for shaping an upper over the forepart of a last, of a shoe holder arranged to act on the shoe at the top of the forepart to support it against pressure applied on its bottom face, said holder being movable by the operator heightwise of the shoe substantially into operative position, a spring against the resistance of which the holder is thus movable, a latch for retaining the holder in the position to which it is moved by the operator, and means arranged to act through said latch to force the holder firmly against the shoe.

258. In an upper-shaping machine, the combination with means for shaping an upper over the forepart of a last, of a shoe holder arranged to act on the shoe at the top of the forepart to support it against pressure applied on its bottom face, a lever supporting said holder and movable by the operator heightwise of the shoe to carry the holder substantially into operative position, a spring against the resistance of which the lever is thus movable, a latch for retaining the lever in the position to which it is moved by the operator, another lever upon which said latch is mounted, and means for operating said other lever to force the holder firmly against the shoe.

259. In an upper-shaping machine, the combination with means for shaping an upper over a last, of a shoe holder arranged to act on the shoe to support it against pressure applied on its bottom face, said holder being movable by the operator heightwise of the shoe substantially into operative position, and means for thereafter forcing said holder firmly but yieldingly against the shoe and for then maintaining it positively in operative position.

260. In an upper-shaping machine, the combination with means for shaping an upper over the forepart of a last, of a shoe holder arranged to act on the shoe at the top of the forepart to support it against pressure applied on its bottom face, said holder being movable by the operator heightwise of the shoe substantially into operative position, and spring-operated mechanism movable thereafter to force the holder firmly against the shoe, said mechanism being arranged to act positively on the holder to maintain it in operative position.

261. In an upper-shaping machine, the combination with means for shaping an upper over the forepart of a last, of a shoe holder arranged to act on the shoe at the top of the forepart to support it against pressure applied on its bottom face, said holder being movable by the operator heightwise of the shoe substantially into operative position, a lever for thereafter forcing said holder firmly against the shoe, and mechanism comprising another lever movable lengthwise of said first-named lever to operate it.

262. In an upper-shaping machine, the combination with means for shaping an upper over the forepart of a last, of a shoe holder arranged to act on the shoe at the top of the forepart to support it against pressure applied on its bottom face, said holder being movable by the operator heightwise of the shoe substantially into operative position, a latch for retaining said holder in the position to which it is moved by the operator, a lever supporting said latch and movable to force the holder firmly against the shoe, said lever having a slot extending lengthwise thereof, a member movable along said slot, and another lever carrying said member and movable lengthwise of said first-named lever to operate it through movement of said member along the slot.

263. In an upper-shaping machine, the combination with means for shaping an upper over a last, of a shoe holder arranged to act on the shoe to support it against pressure applied on its bottom face, a lever for forcing said holder against the shoe, and a second lever mounted for movement lengthwise of said first-named lever and provided with means for operating it by that movement.

264. In an upper-shaping machine, the combination with means for shaping an upper over the forepart of a last, of a shoe holder arranged to act on the shoe at the top of the forepart to support it against pressure applied on its bottom face, a lever for forcing said holder against the shoe, a second lever movable lengthwise of said first-named lever, and a member carried by said second lever and movable in such a path relatively to said first-named lever as to impart to the latter its operative movement.

265. In an upper-shaping machine, the combination with means for shaping an upper over the forepart of a last, of a shoe holder arranged to act on the shoe at the top of the forepart to support it against pressure applied on its bottom face, a lever for forcing said holder against the shoe, a second lever mounted for movement lengthwise of said first-named lever and provided with means for engaging the latter to operate it by that movement, and a spring for operating said second lever, said second lever being movable by the spring into such relation to the first lever as to hold the latter positively against retractive movement.

266. In an upper-shaping machine, the combination with means for shaping an upper over the forepart of a last, of a shoe holder arranged to act on the shoe at the top of the forepart to support it against pressure applied on its bottom face, a lever for forcing said holder against the shoe, said lever having a slot therein, a member movable along said slot, a second lever carrying said member and arranged to operate the first-named lever by moving the member along the slot, and a spring for operating the second lever, the second lever being so arranged in relation to the first lever as to hold it positively against retractive movement.

267. In an upper-shaping machine, the combination with means for shaping an upper over the forepart of a last, of a shoe holder arranged to act on the shoe at the top of the forepart to support it against pressure applied on its bottom face, a lever for forcing said holder against the shoe, said lever having a slot therein, a member movable along said slot, a second lever carrying said member and arranged to operate the first-named lever by moving the member along the slot, a spring for moving the second lever in the direction to impart to the first lever its operative movement, and positive means for moving the second lever in the opposite direction.

268. In an upper-shaping machine, the combination with power-operated means for pulling an upper over a last and for then holding it under tension with the machine at rest, and means for laying the marginal portion of the upper around the toe over the bottom of the last and for fastening it when the machine is again started, of a shoe holder arranged to act on the shoe to support it against pressure applied on its bottom face, said holder being movable by the operator heightwise of the shoe substantially into operative position while the machine is at rest with the upper under tension, and mechanism arranged to act automatically when the machine is again started to force said holder firmly against the shoe.

269. In an upper-shaping machine, the combination with power-operated means for pulling an upper over a last and for then holding it under tension with the machine at rest, and means for laying the marginal portion of the upper around the toe over the bottom of the last and for fastening it when the machine is again started, of a shoe holder arranged to act on the shoe at the top of the forepart to support it against pressure applied on its bottom face, said holder being movable by the operator heightwise of the shoe substantially into operative position while the machine is at rest with the upper under tension, and mechanism arranged to act automatically when the machine is again started to force said holder yieldingly against the shoe and then to maintain it positively in operative position.

270. In an upper-shaping machine, the combination with power-operated means for pulling an upper over a last and for then holding it under tension with the machine at rest, and means for laying the marginal portion of the upper around the toe over the bottom of the last and for fastening it when the machine is again started, of a shoe holder arranged to act on the shoe at the top of the forepart to support it against pressure applied on its bottom face, said holder being movable by the operator heightwise of the shoe substantially into operative position while the machine is at rest with the upper under tension, a latch for retaining the holder in the position to which it is moved by the operator, and mechanism arranged to act through said latch when the machine is again started to force the holder firmly against the shoe.

CHARLES F. PYM.
ARTHUR F. PYM.